March 21, 1944.   H. P. MIXER   2,344,626
MULTIPLYING PUNCH
Filed Aug. 1, 1940   41 Sheets-Sheet 1

INVENTOR
H. P. MIXER
ATTORNEY

March 21, 1944. H. P. MIXER 2,344,626
MULTIPLYING PUNCH
Filed Aug. 1, 1940 41 Sheets-Sheet 3

INVENTOR
H.P. MIXER
BY W.H.Sparks
ATTORNEY

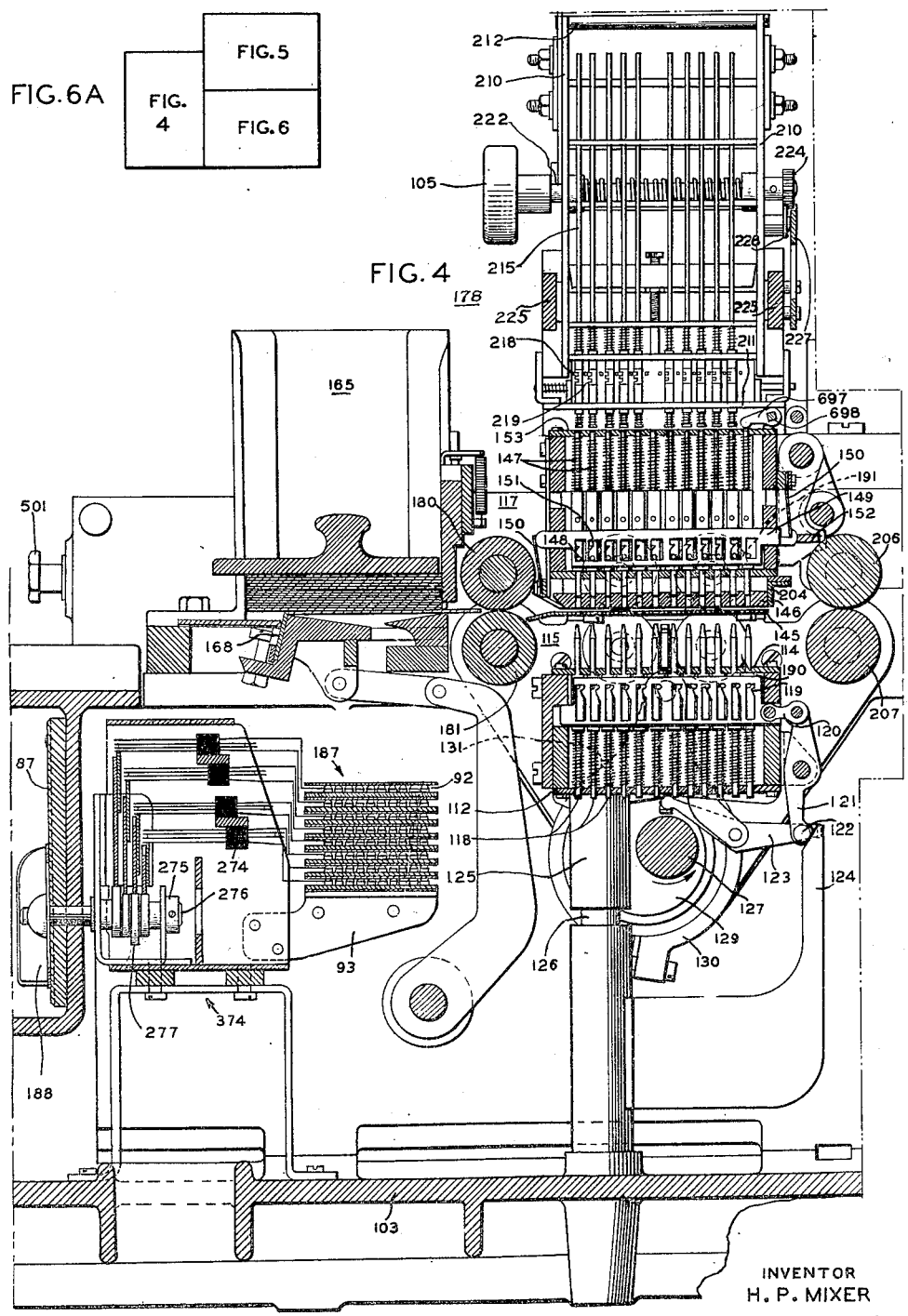

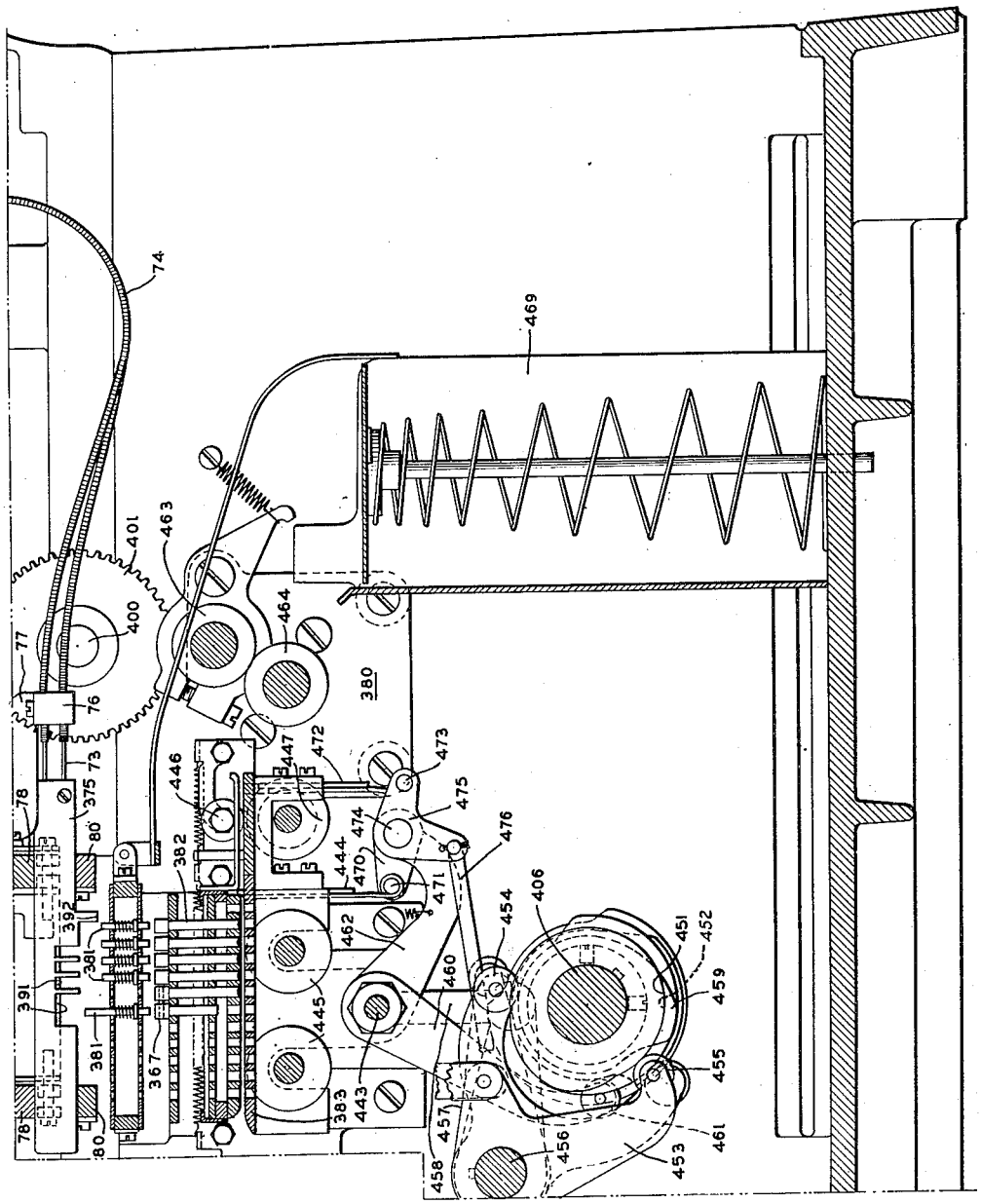

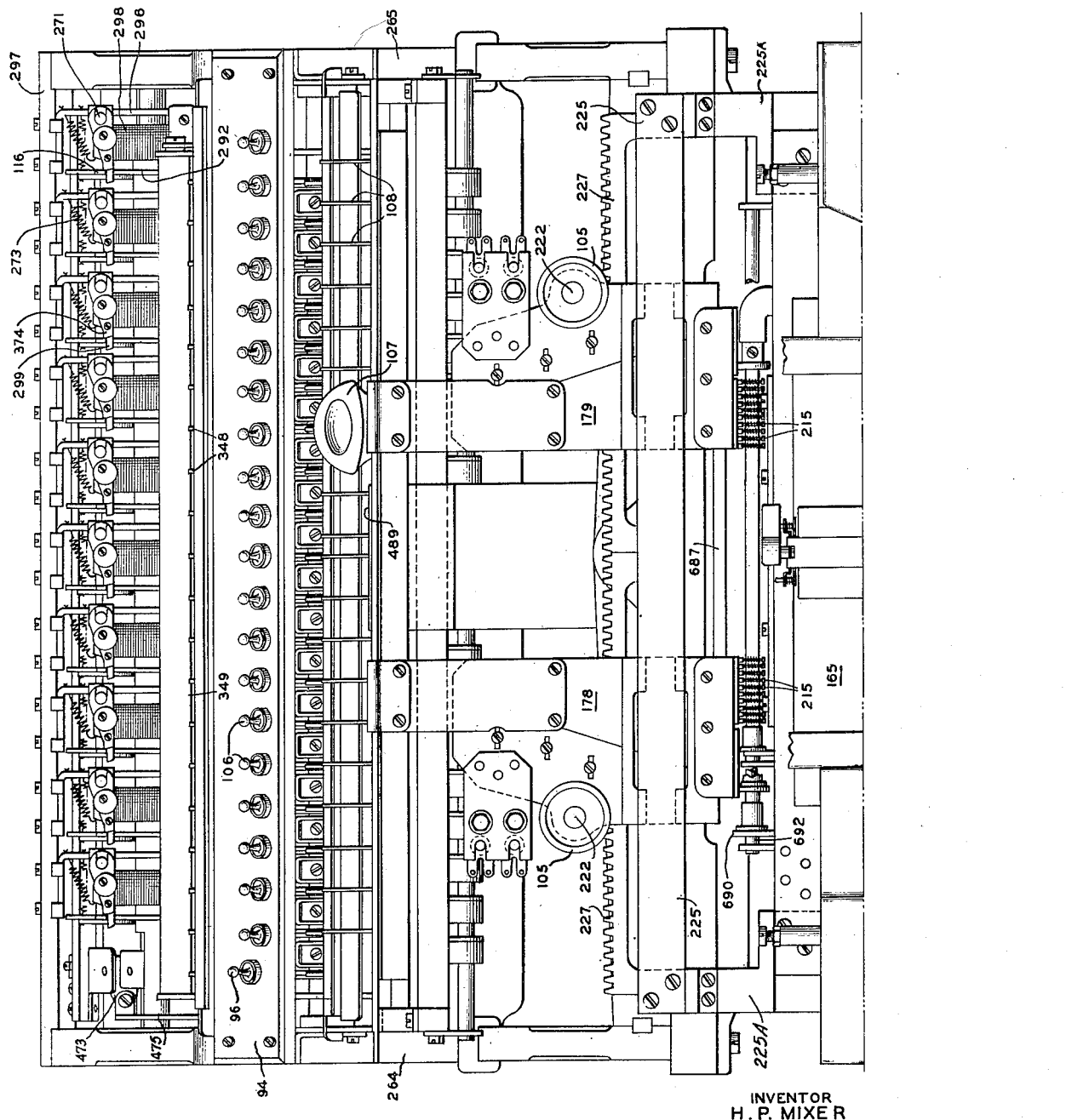

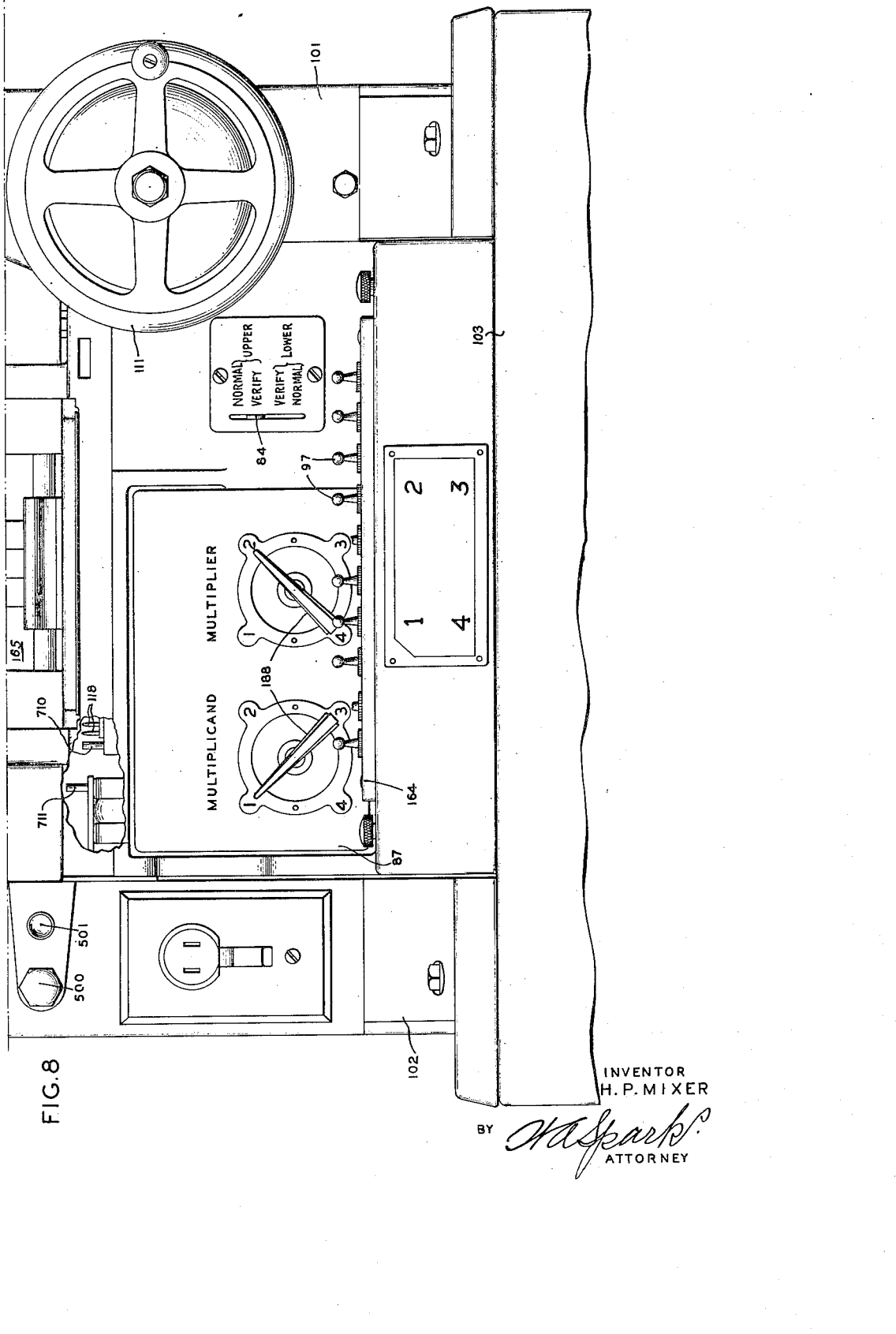

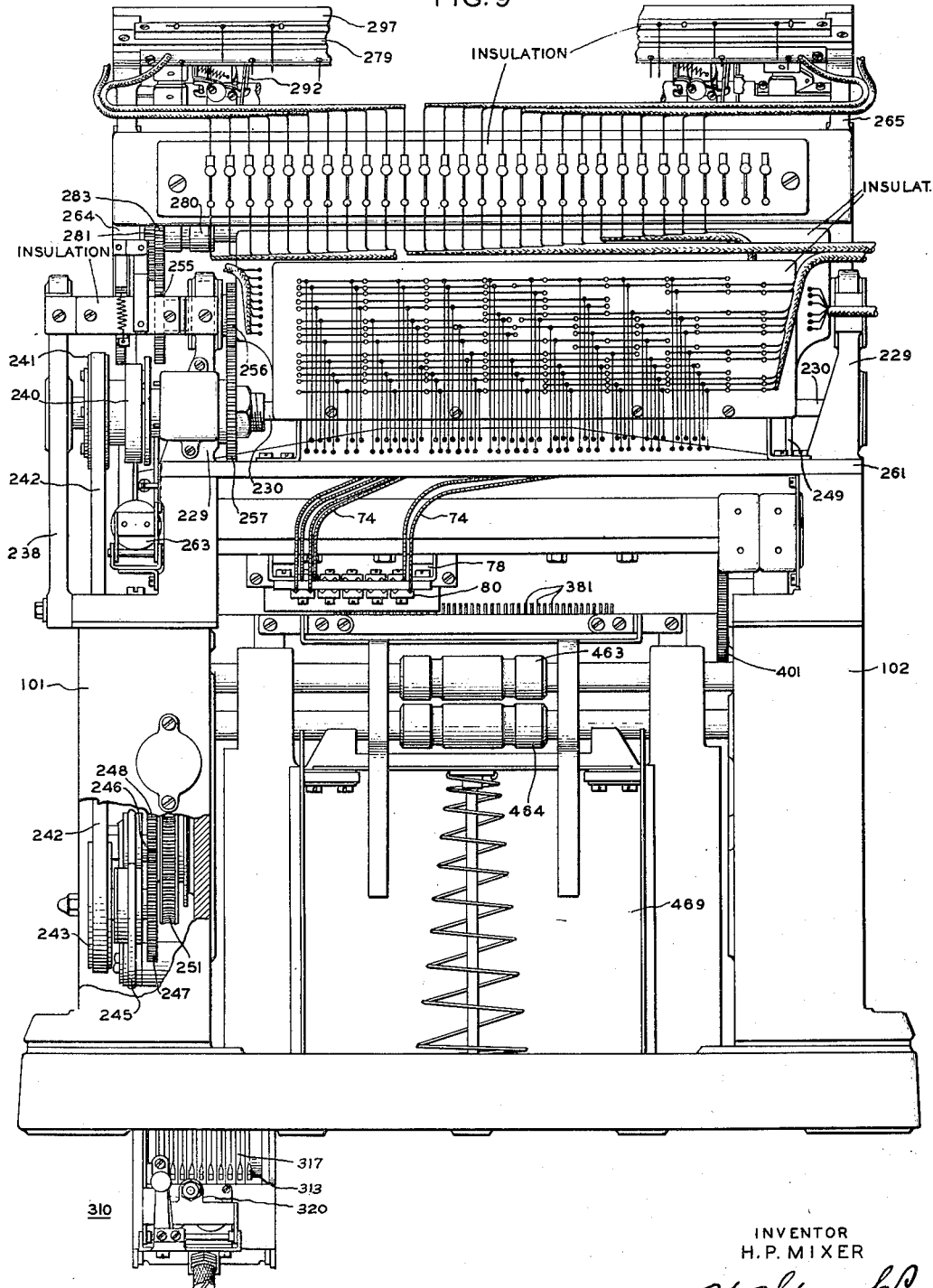

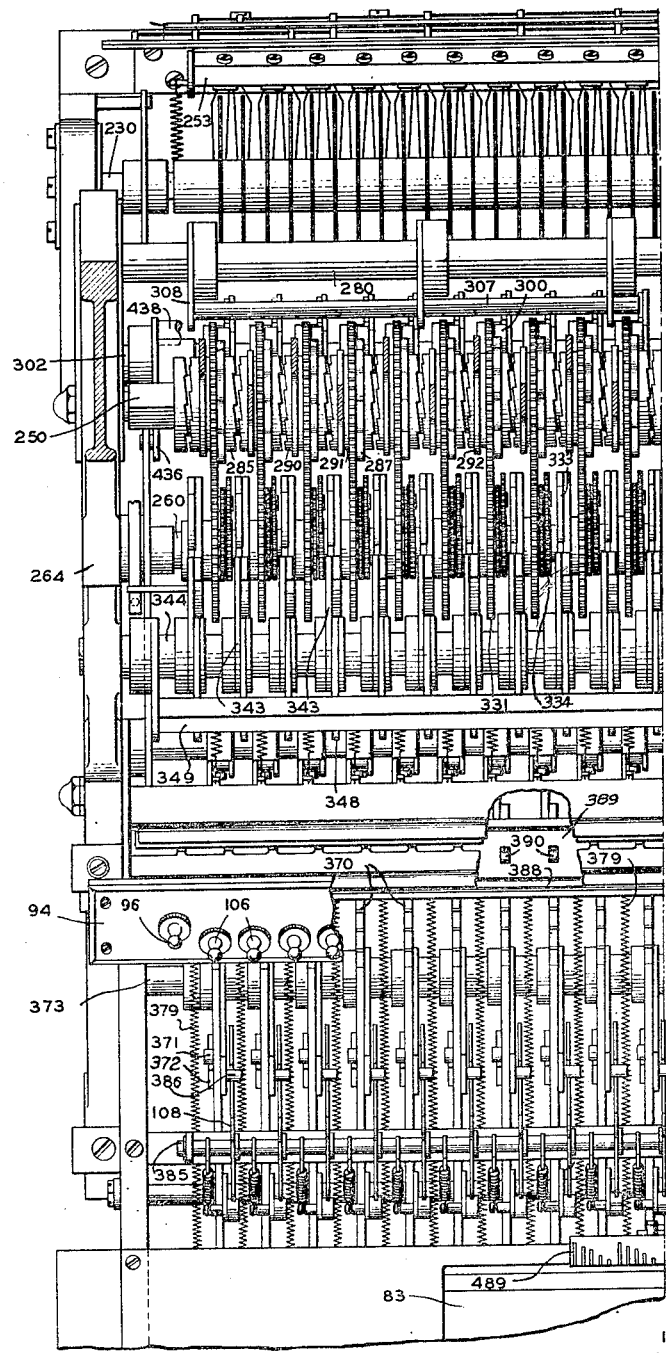

March 21, 1944.    H. P. MIXER    2,344,626
MULTIPLYING PUNCH
Filed Aug. 1, 1940    41 Sheets-Sheet 12

INVENTOR
H. P. MIXER
BY *W A Spack*
ATTORNEY

March 21, 1944. H. P. MIXER 2,344,626
MULTIPLYING PUNCH
Filed Aug. 1, 1940 41 Sheets-Sheet 16

INVENTOR
H. P. MIXER
BY *H. W. Spark*
ATTORNEY

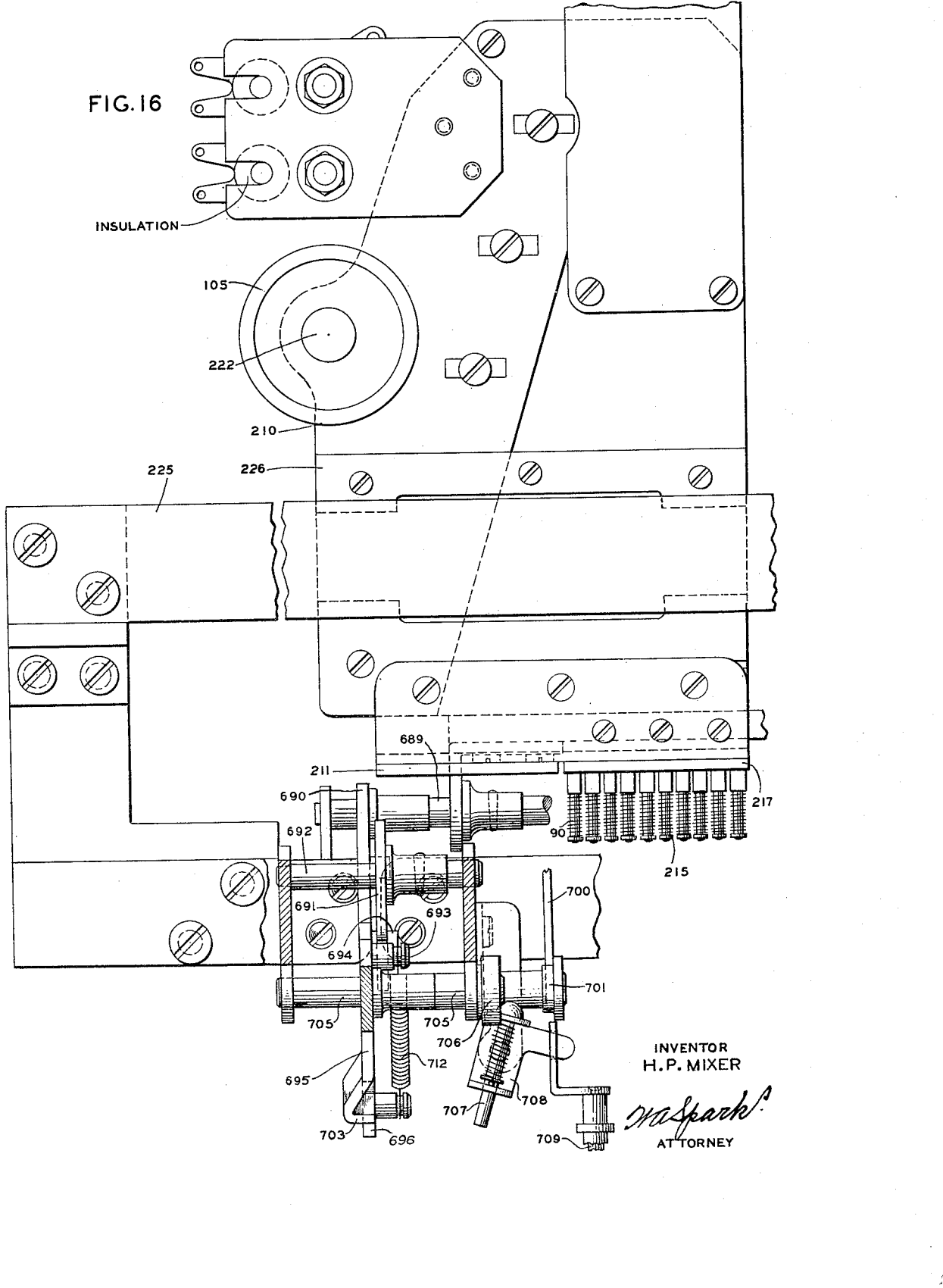

March 21, 1944. H. P. MIXER 2,344,626
MULTIPLYING PUNCH
Filed Aug. 1, 1940 41 Sheets-Sheet 18

INVENTOR
H. P. MIXER
BY
ATTORNEY

March 21, 1944.    H. P. MIXER    2,344,626
MULTIPLYING PUNCH
Filed Aug. 1, 1940    41 Sheets-Sheet 19

INVENTOR
H. P. MIXER
BY *M. Spark*
ATTORNEY

March 21, 1944. H. P. MIXER 2,344,626
MULTIPLYING PUNCH
Filed Aug. 1, 1940 41 Sheets-Sheet 20

INVENTOR
H. P. MIXER
BY *W. Sparks*
ATTORNEY

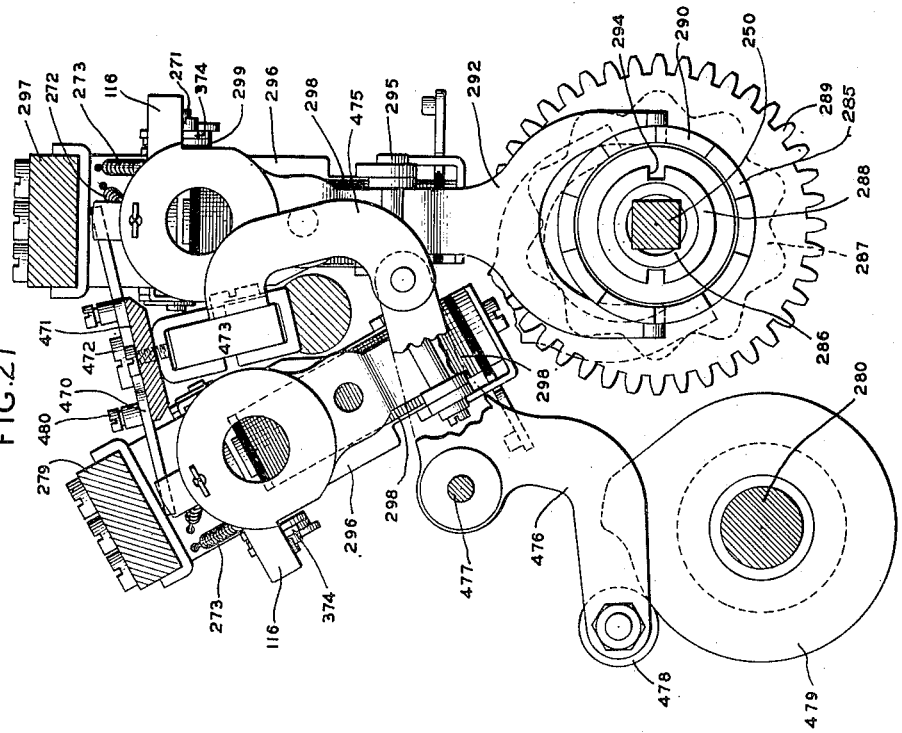
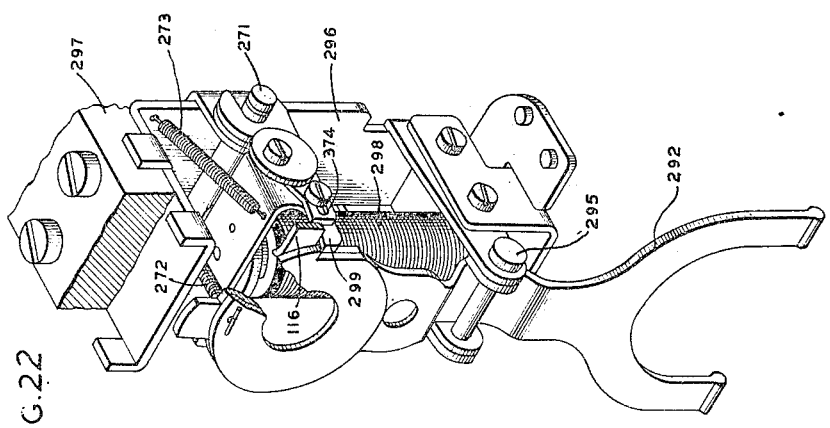

March 21, 1944.     H. P. MIXER     2,344,626
MULTIPLYING PUNCH
Filed Aug. 1, 1940     41 Sheets-Sheet 22

| FIG. 24 | FIG. 25 | FIG. 26 | FIG. 27 |
|---|---|---|---|
| FIG. 28 | FIG. 29 | FIG. 30 | FIG. 31 |
| FIG. 32 | FIG. 33 | FIG. 34 | |
| FIG. 35 | FIG. 36 | FIG. 37 | |
| FIG. 38 | FIG. 39 | FIG. 40 | |
| FIG. 41 | FIG. 42 | | |

INVENTOR
H. P. MIXER
BY W. A. Spark
ATTORNEY

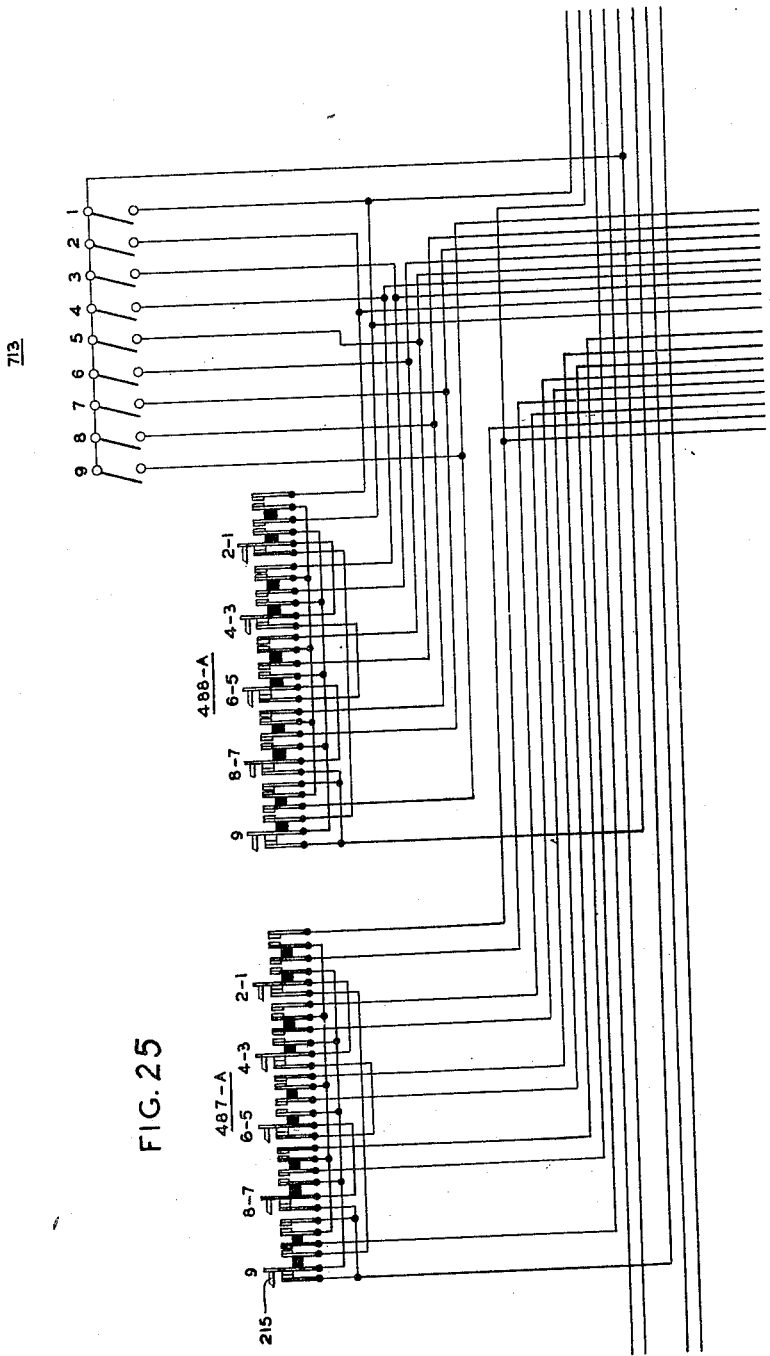

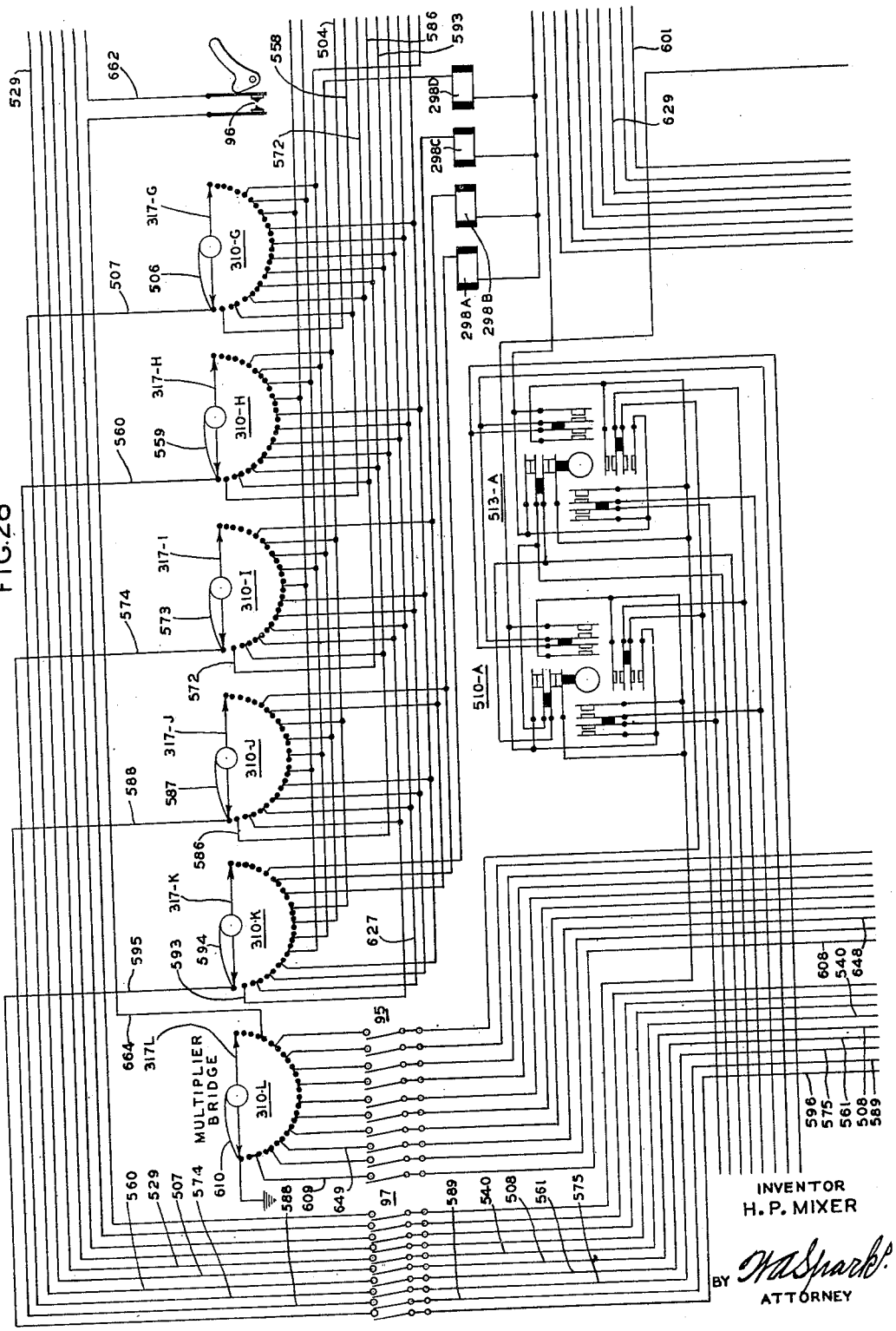

March 21, 1944.    H. P. MIXER    2,344,626
MULTIPLYING PUNCH
Filed Aug. 1, 1940    41 Sheets-Sheet 25

INVENTOR
H. P. MIXER
BY W. M. Spark
ATTORNEY

March 21, 1944. H. P. MIXER 2,344,626
MULTIPLYING PUNCH
Filed Aug. 1, 1940 41 Sheets-Sheet 27

INVENTOR
H.P. MIXER
BY *W. Sparks*
ATTORNEY

March 21, 1944.      H. P. MIXER            2,344,626
               MULTIPLYING PUNCH
        Filed Aug. 1, 1940      41 Sheets-Sheet 30

INVENTOR
H. P. MIXER
BY
ATTORNEY

March 21, 1944. H. P. MIXER 2,344,626
MULTIPLYING PUNCH
Filed Aug. 1, 1940 41 Sheets-Sheet 31

INVENTOR
H.P. MIXER
BY
ATTORNEY

March 21, 1944.   H. P. MIXER   2,344,626
MULTIPLYING PUNCH
Filed Aug. 1, 1940   41 Sheets-Sheet 32

INVENTOR
H. P. MIXER
BY W. M. Sparks
ATTORNEY

March 21, 1944.  H. P. MIXER  2,344,626
MULTIPLYING PUNCH
Filed Aug. 1, 1940   41 Sheets-Sheet 33

INVENTOR
H.P. MIXER
BY
ATTORNEY

March 21, 1944.  H. P. MIXER  2,344,626
MULTIPLYING PUNCH
Filed Aug. 1, 1940  41 Sheets-Sheet 41

INVENTOR
H.P. MIXER
BY *M. Sparks*
ATTORNEY

Patented Mar. 21, 1944

2,344,626

UNITED STATES PATENT OFFICE 2,344,626

MULTIPLYING PUNCH

Harold P. Mixer, Rockville, Centre, N. Y., assignor to Remington Rand Inc., Buffalo, N. Y., a corporation of Delaware Application August 1, 1940, Serial No. 349,101

4 Claims. (Cl. 235—61.6)

The present invention relates to accounting machines, and particularly to accounting machines for performing multiplication. More particularly, it relates to a machine capable of reading two factors, from a punched data card, which are to be multiplied together, multiplying those two factors and punching the product thereof in the same card from which the factors were read, and to improvements in a similar machine disclosed in my Patent No. 2,214,029, issued September 10, 1940, for Calculating machines.

The machine is in many respects similar to known forms of tabulating and accounting machinery, but performs a combination of operations which is not possible in these old machines.

Generally speaking, the machine of the present invention comprises a sensing mechanism, a multiplication mechanism, a totaling mechanism, punching mechanism and coordinated driving means for the various elements mentioned.

The principal object of the invention is to provide an improved machine for sensing a factor from a record card, multiplying this factor by a constant factor sensed from a master card and punching their product in a predetermined area in the record card.

Another object of the invention is to provide improved mechanisms in a multiplying machine for sensing a constant factor from a master card and retaining this factor for subsequent multiplication with other factors sensed from other cards.

A still further object of the invention is to provide an improved machine for sensing a factor from a detail card, multiplying this factor by a constant factor sensed from a master card, simultaneously sensing a digit from another portion of the master card, which digit is added to the product of the two factors, and punching the total in the detail card.

A more clear conception of the further objects, construction, and operation of the invention may be had from the following detailed description taken in conjunction with the accompanying drawings, in which Fig. 1 is an isometric view of the entire machine showing its appearance with the enclosing casings in place as they would be when in commercial use;

Figure 5:
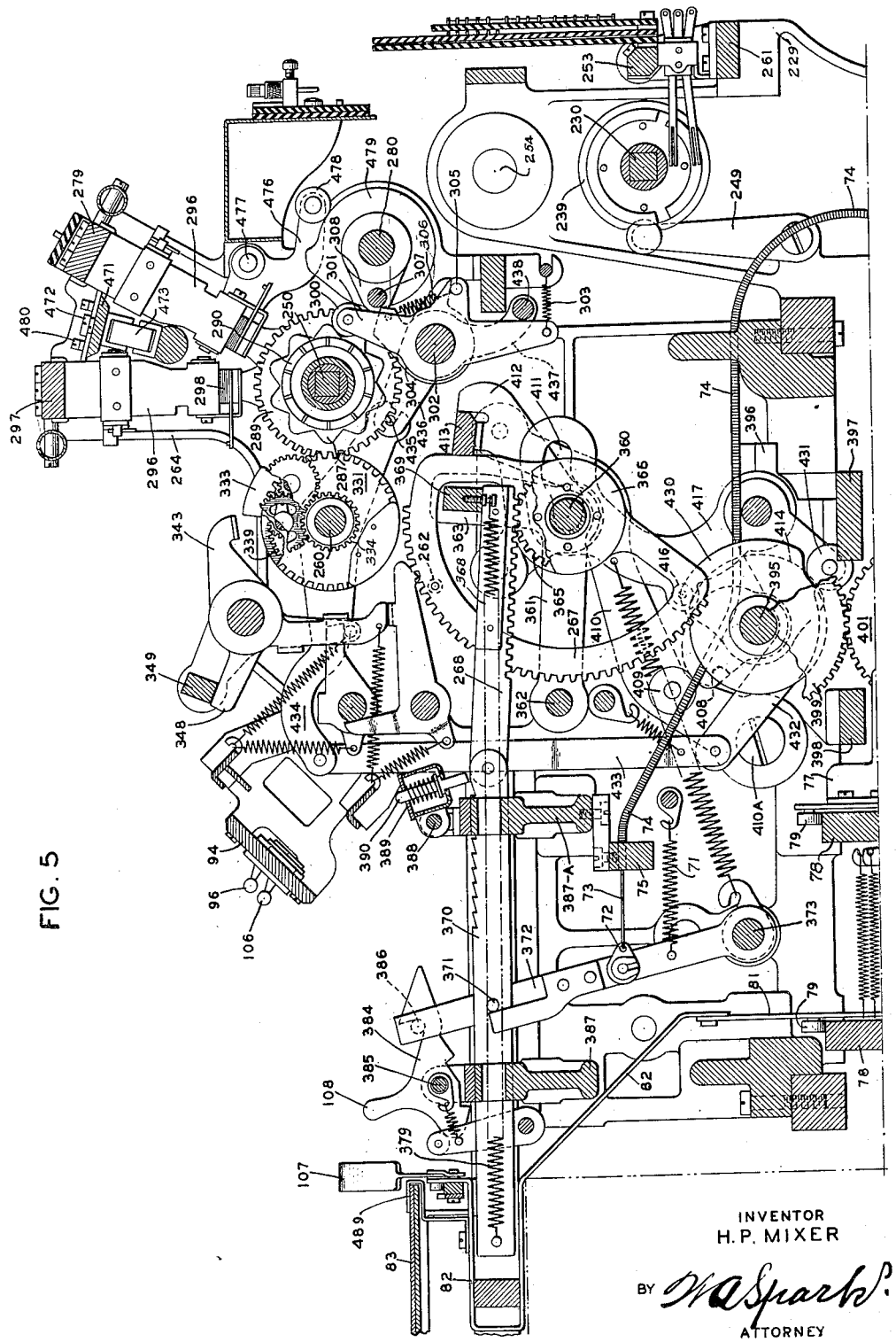
Figure 5A:
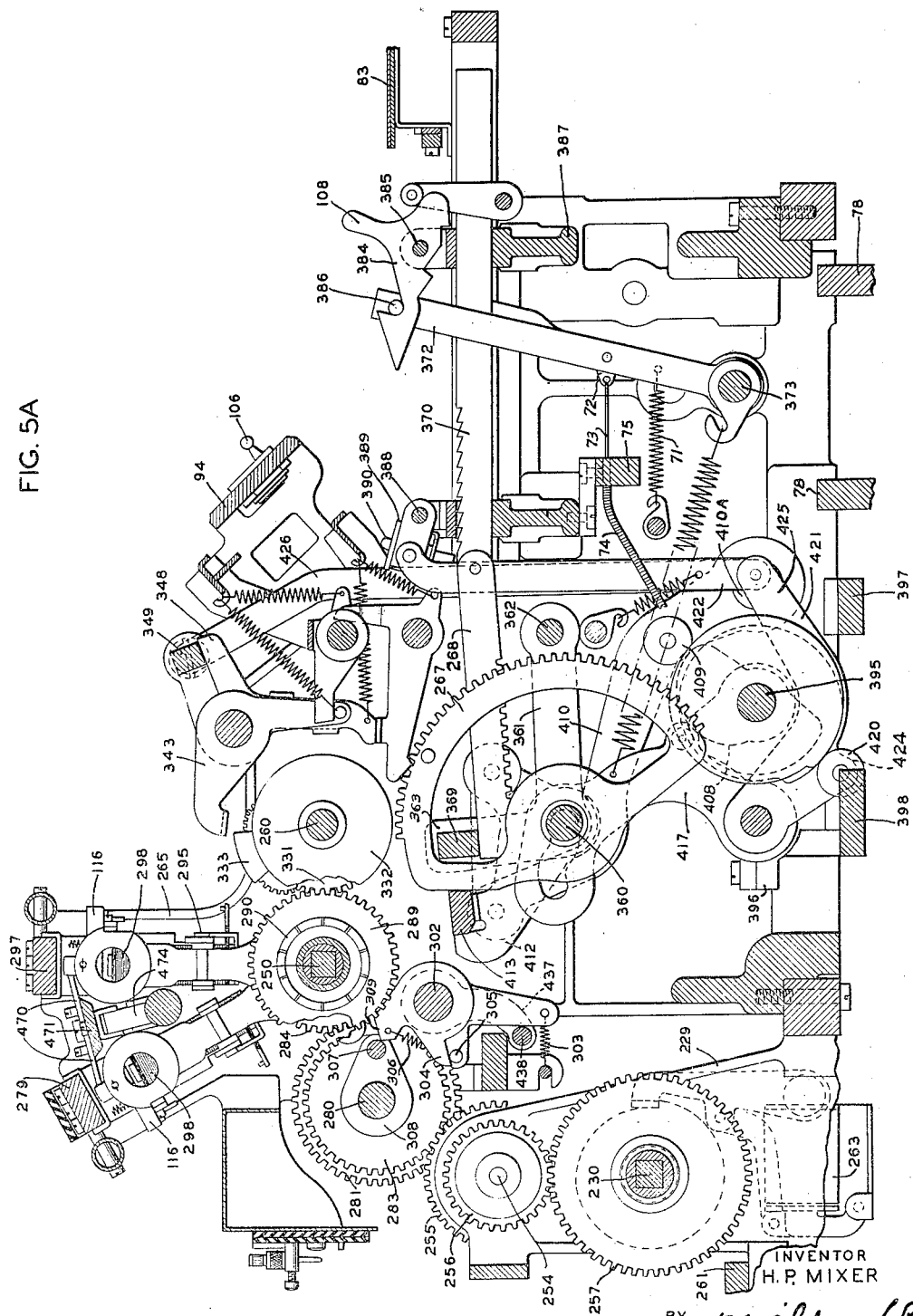
Figure 11:
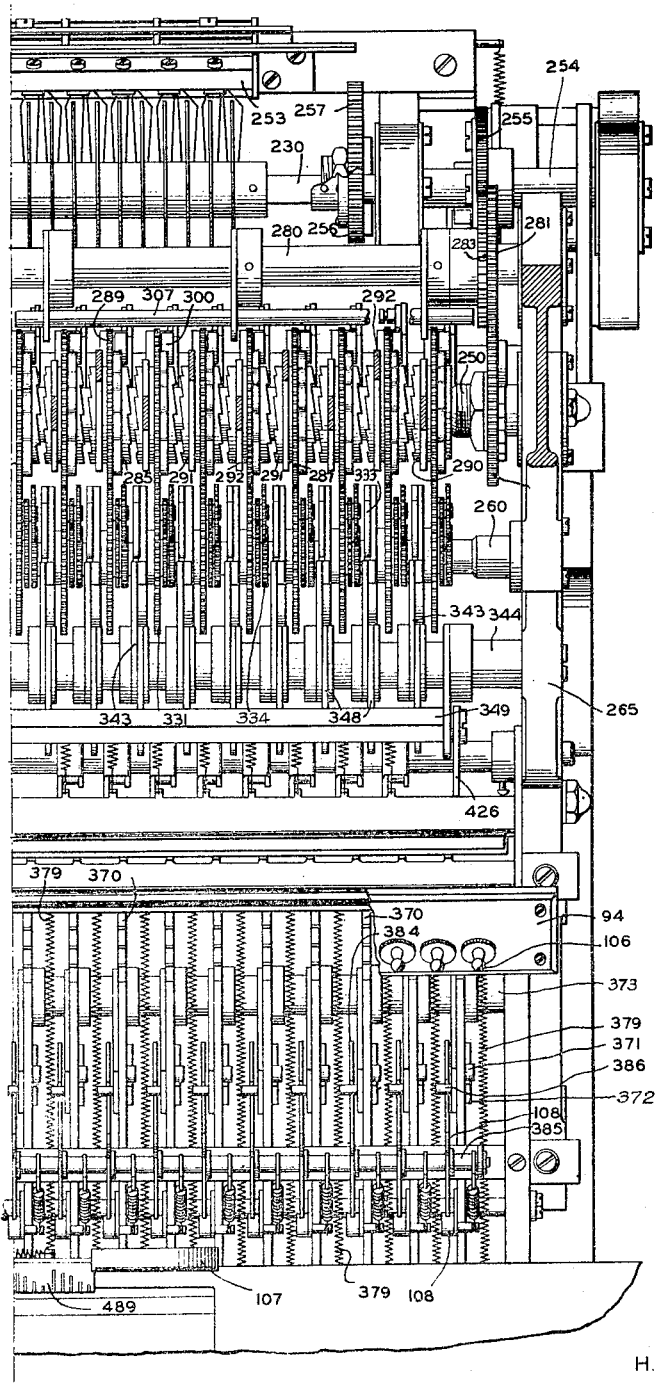
Figure 12:
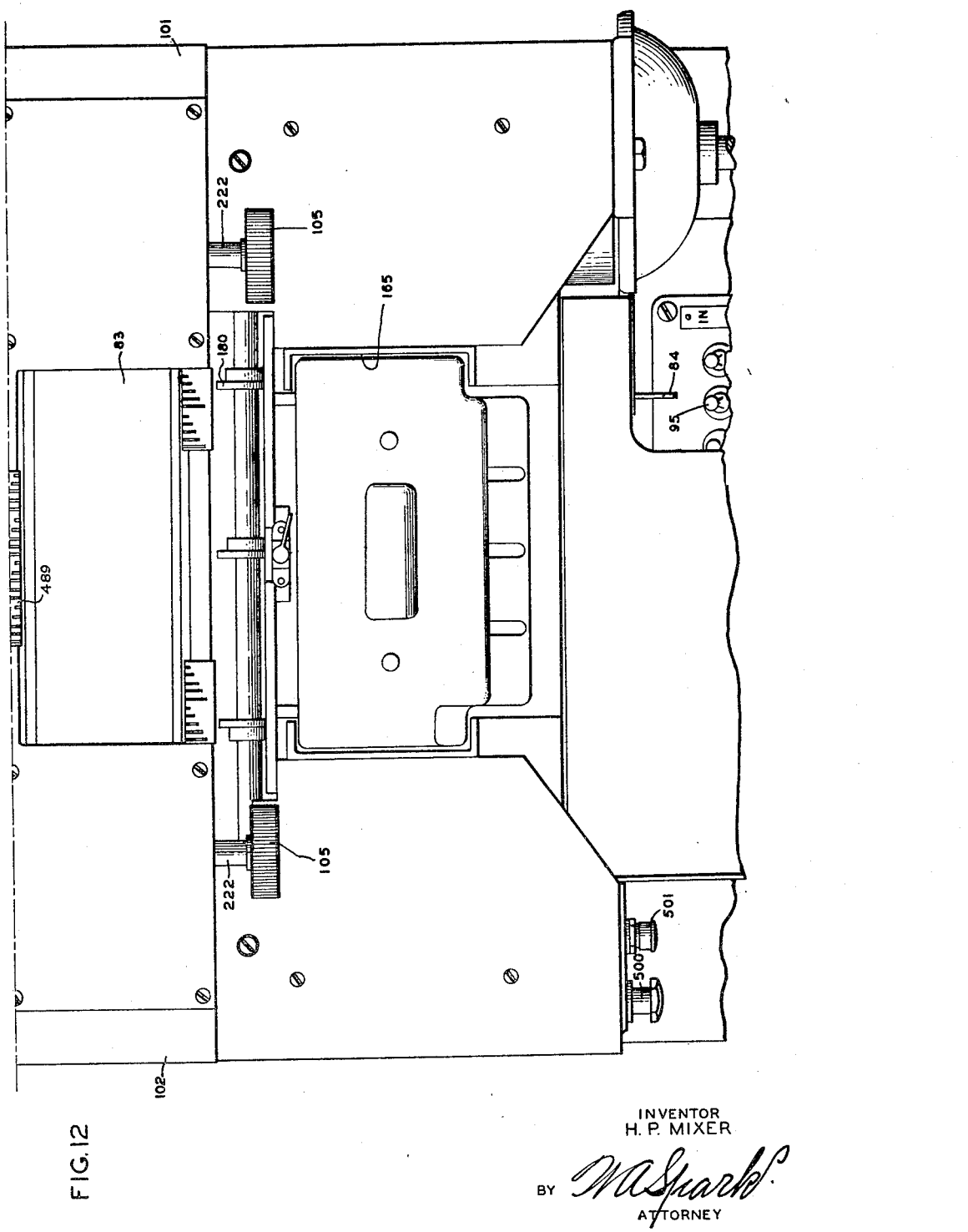
Figure 13:
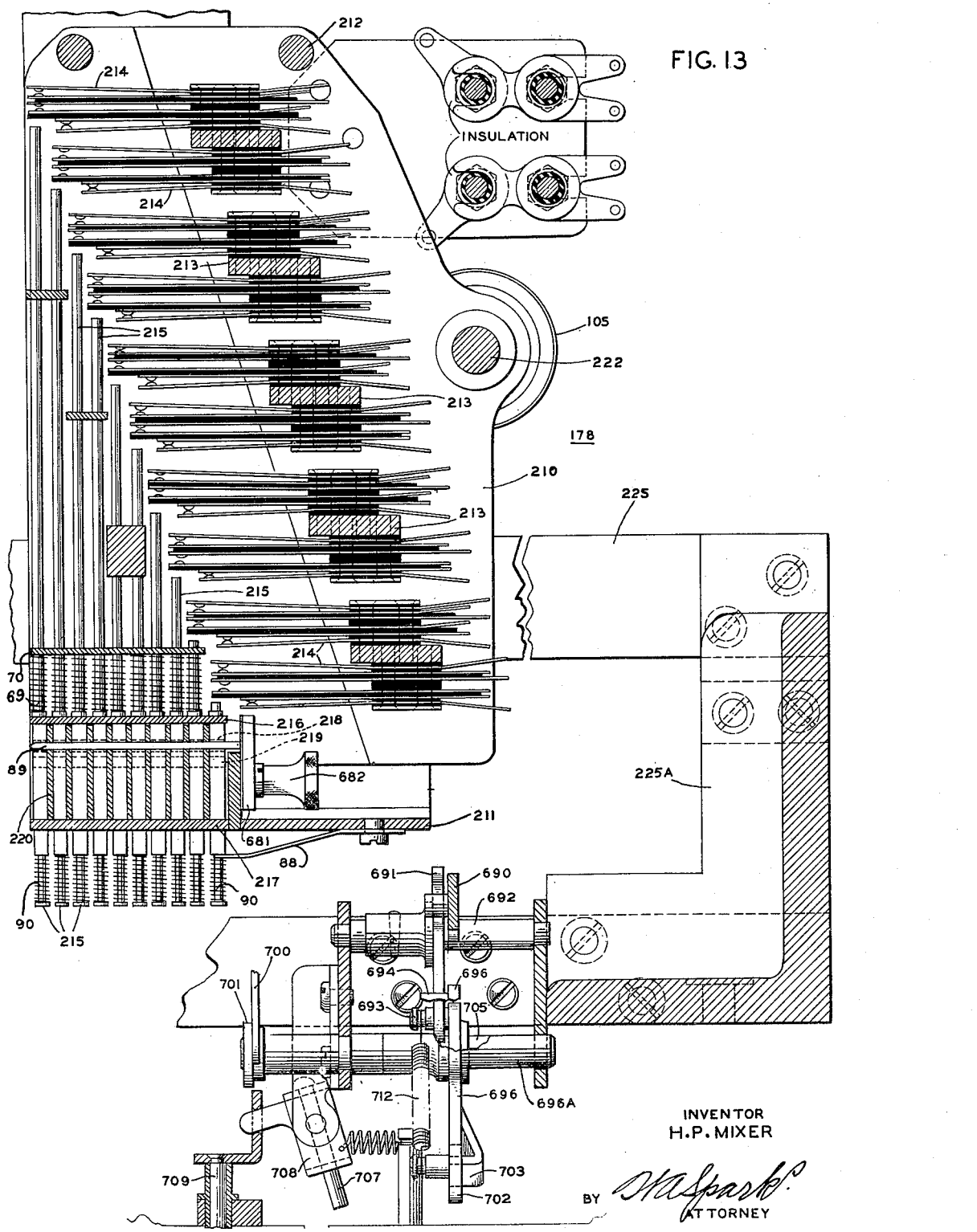
Figure 14:
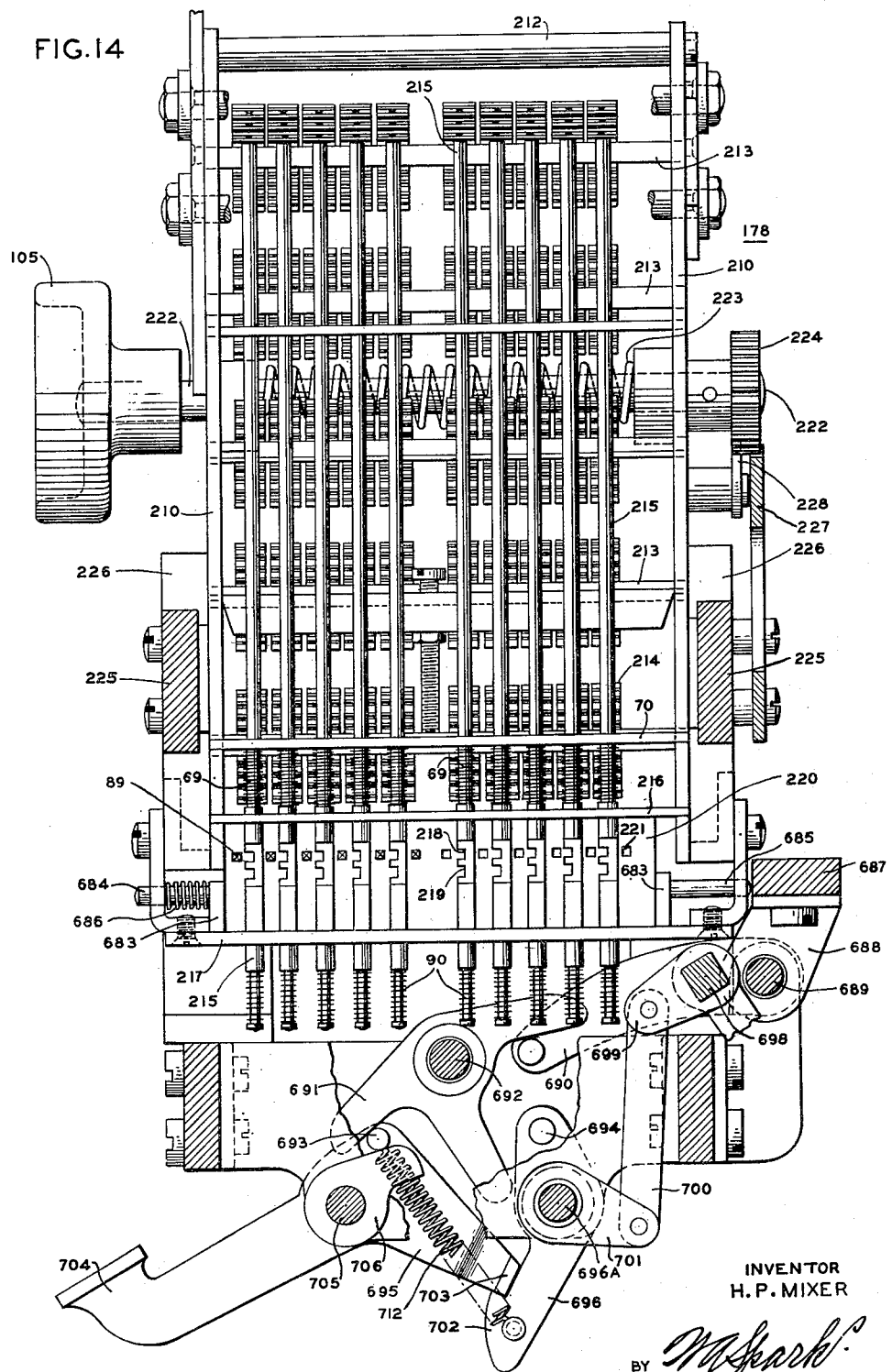
Figure 15:
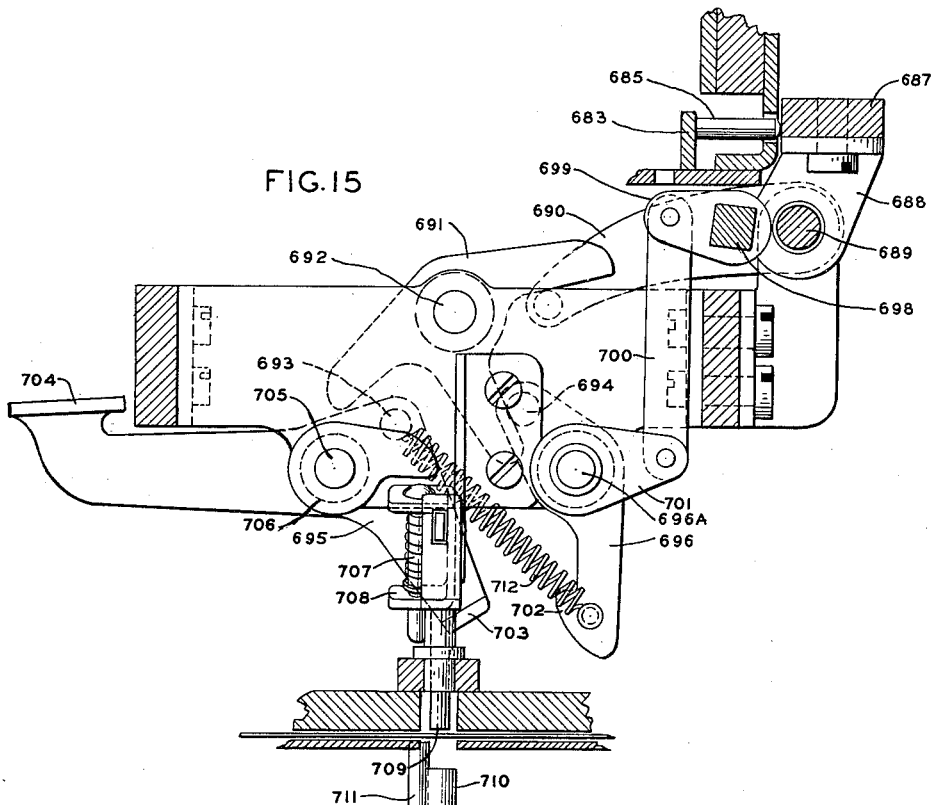
Figure 15A:
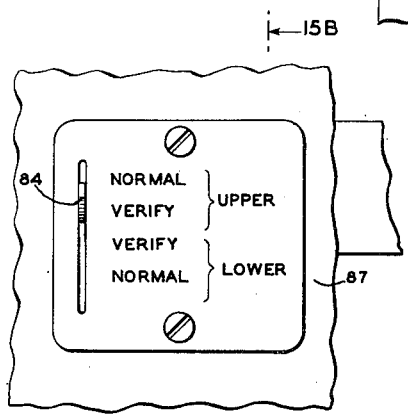
Figure 15B:
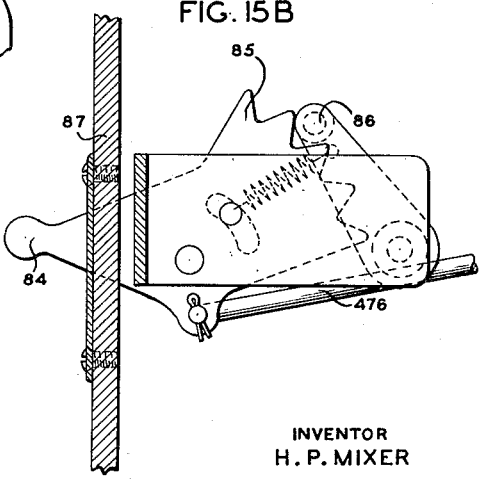
Figure 17:
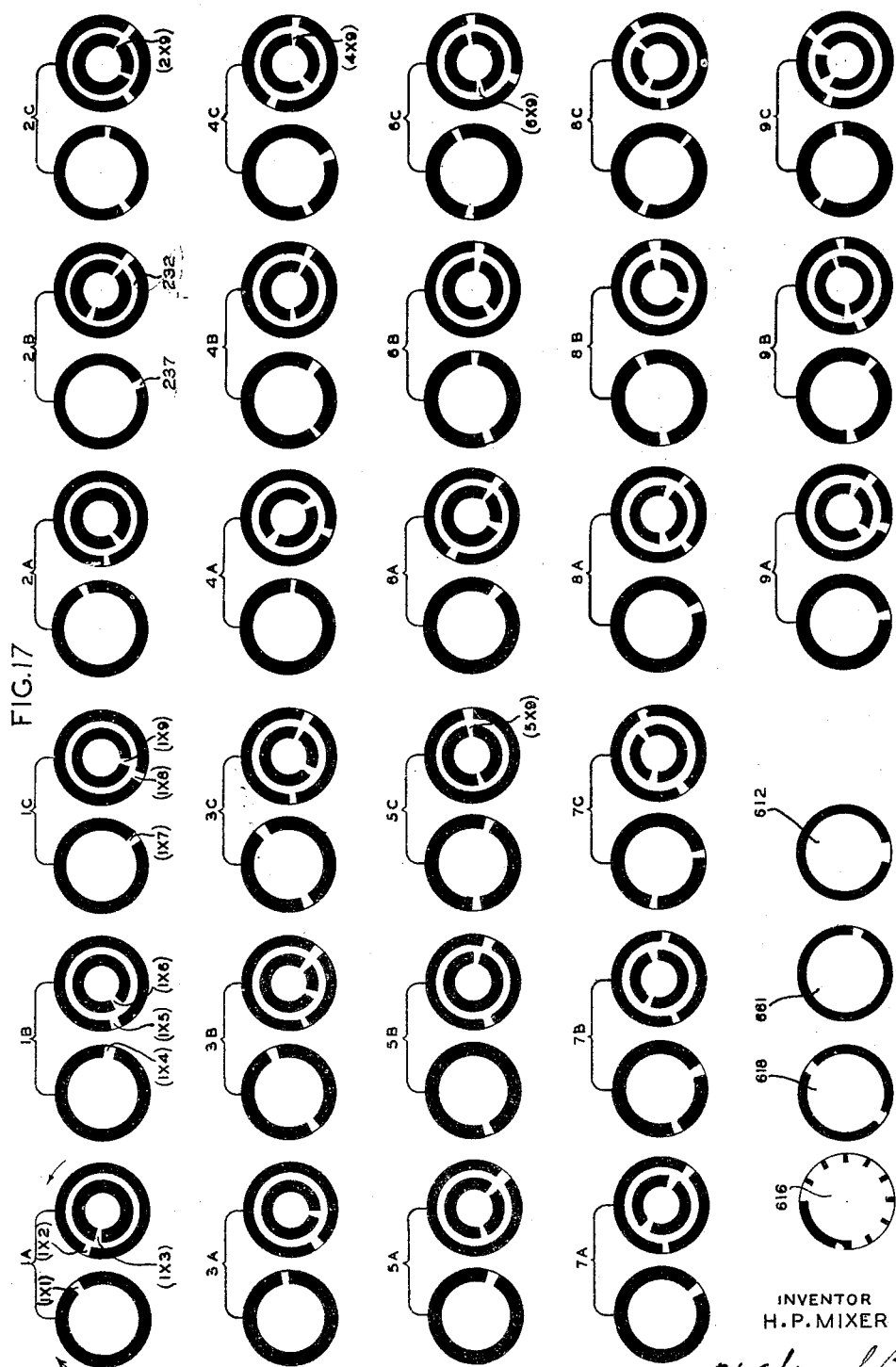
Figure 18:
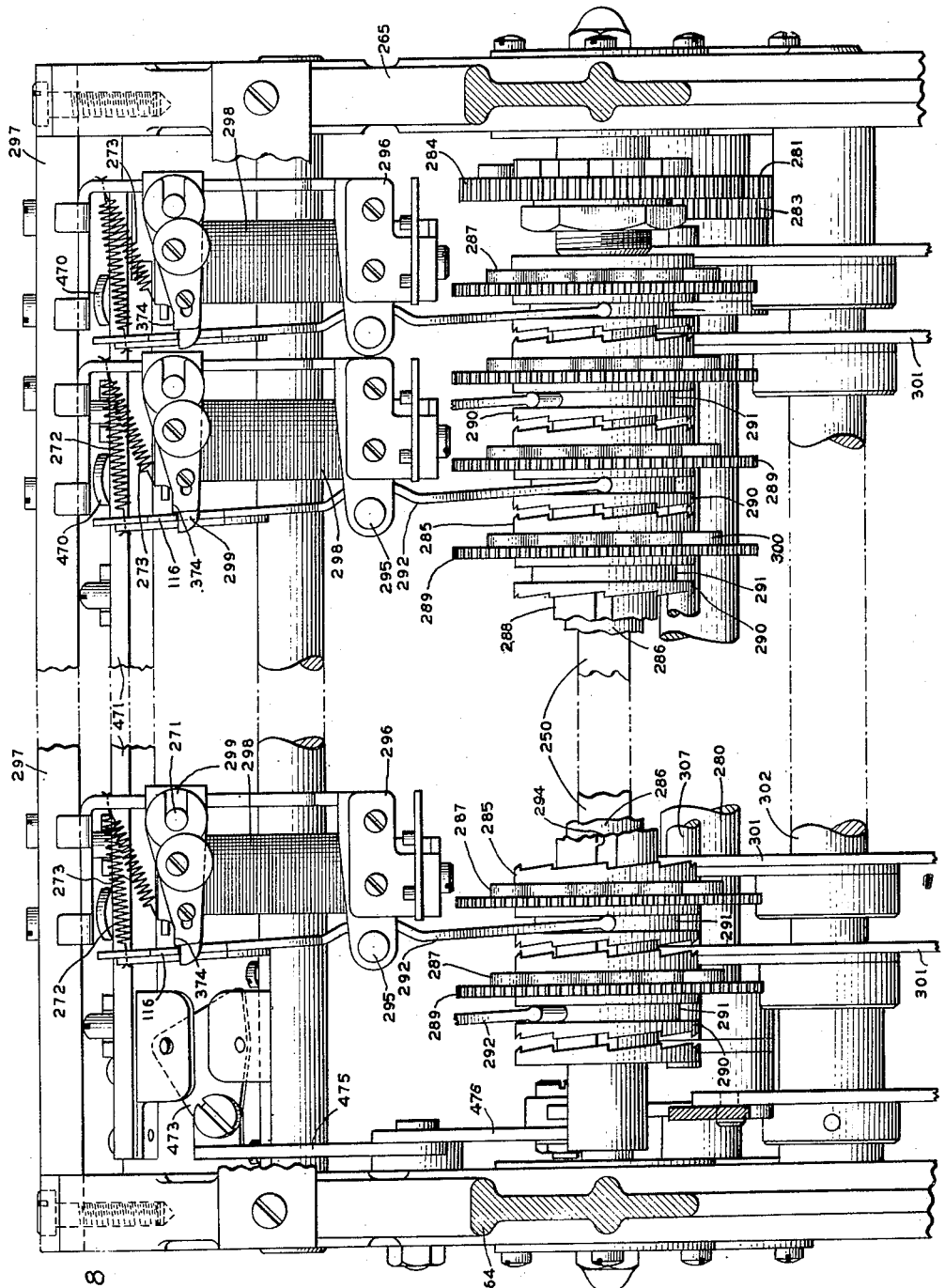
Figure 19:
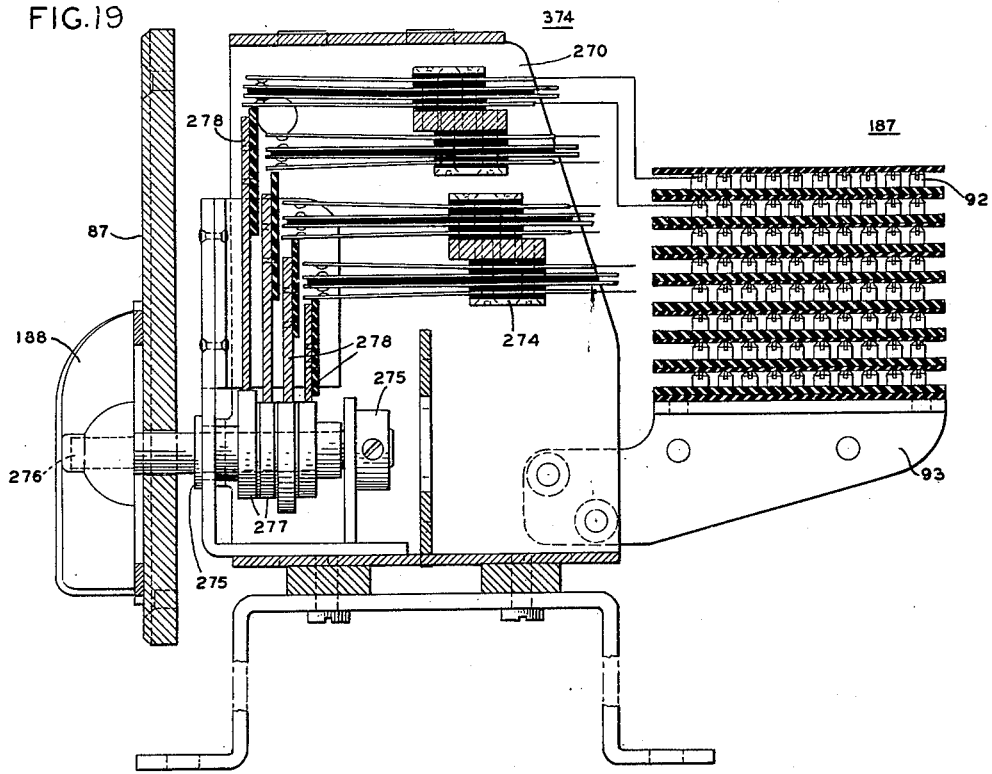
Figure 20:
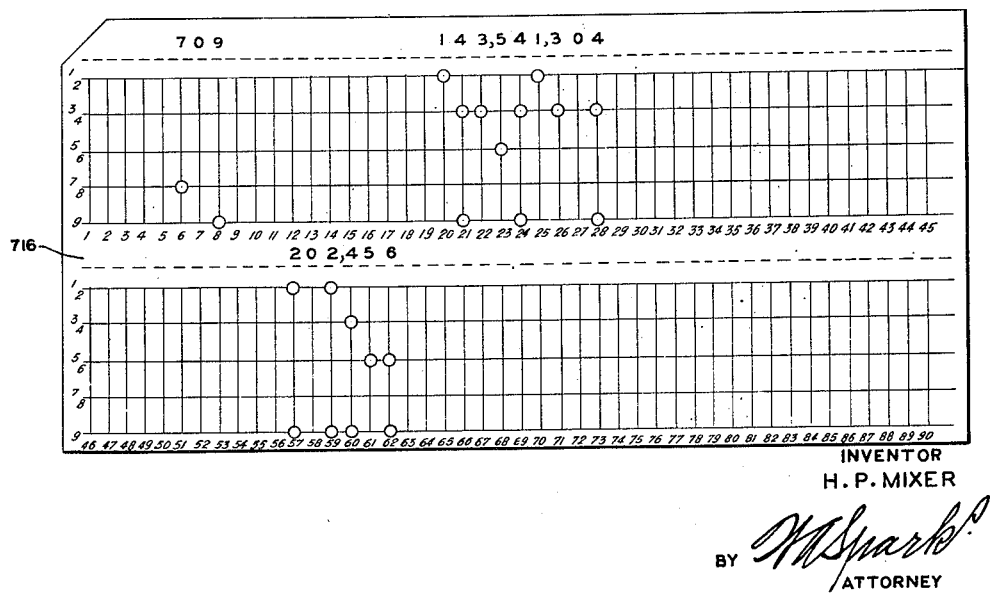
Figure 23:
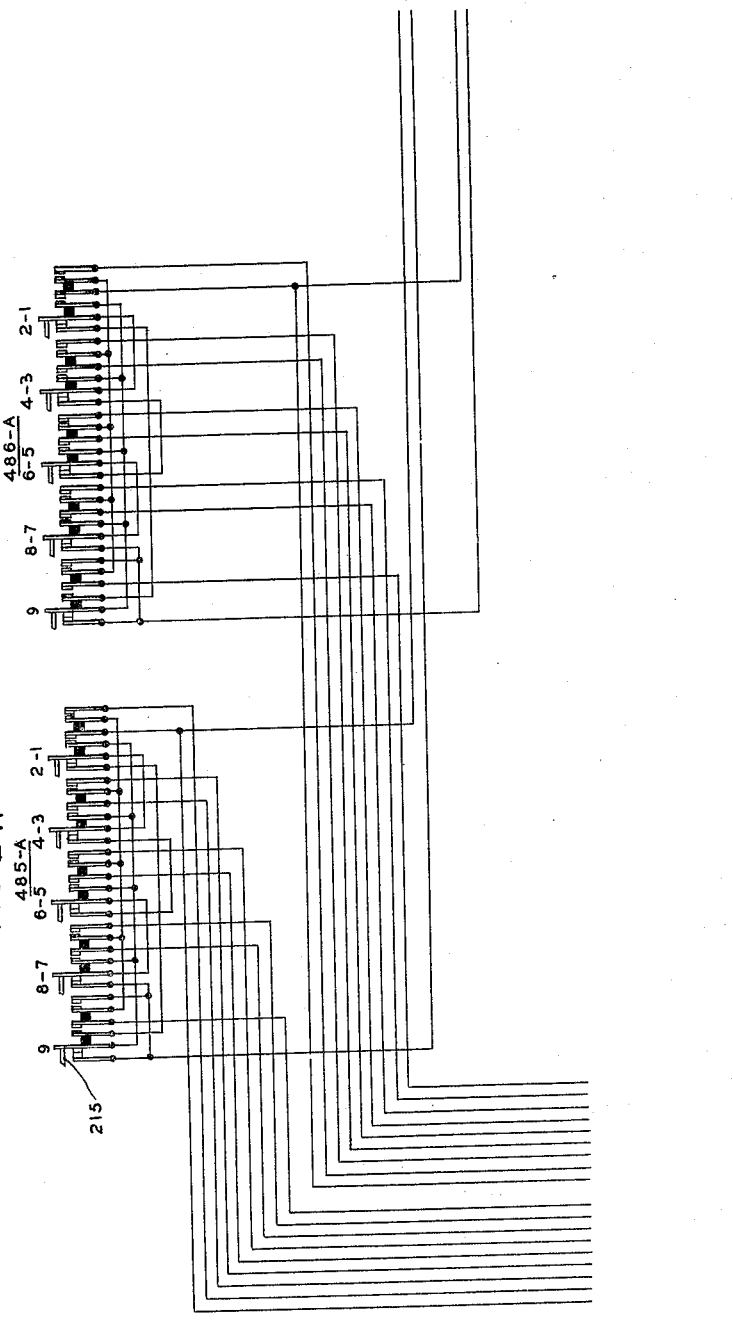
Figure 27:
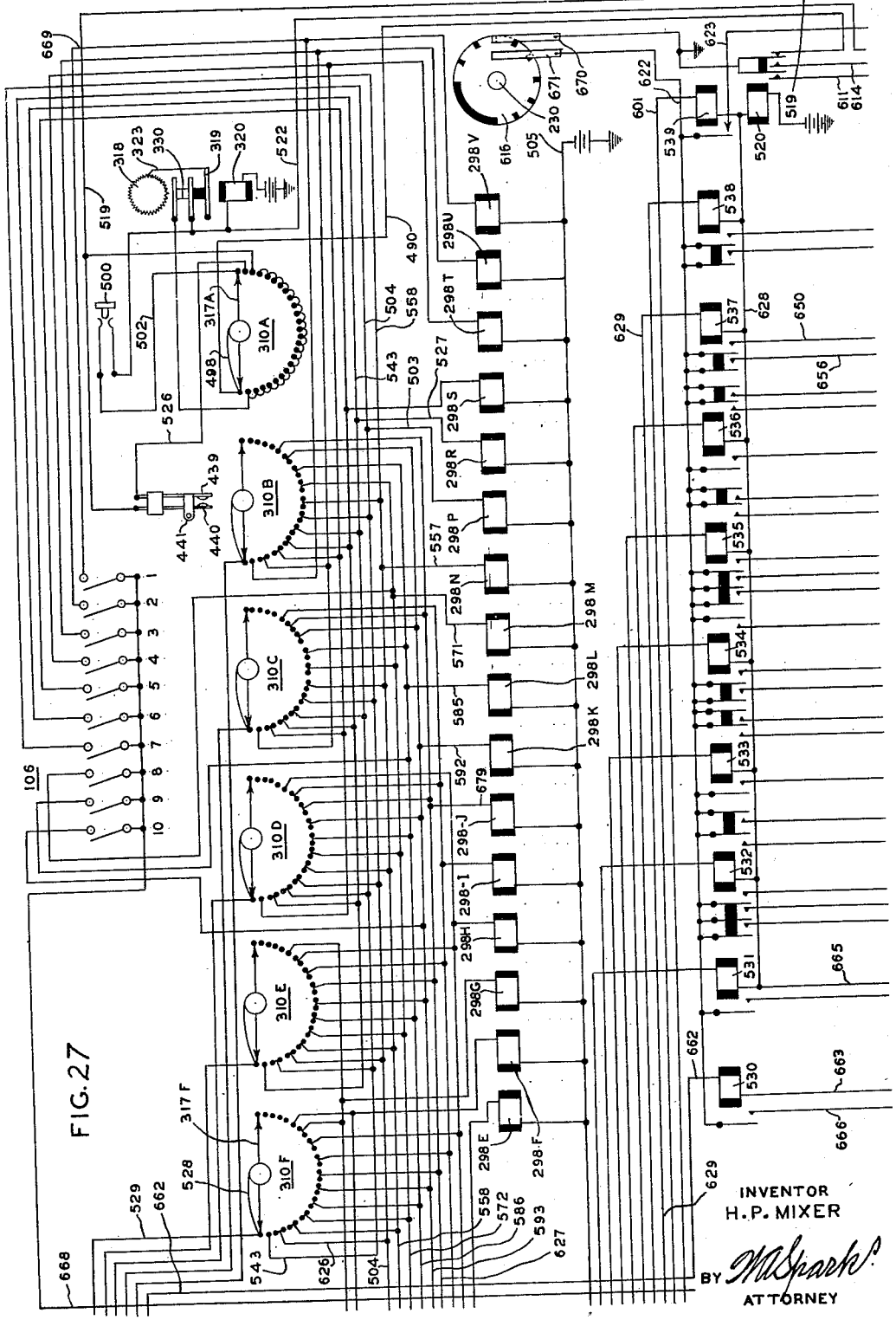
Figure 28:
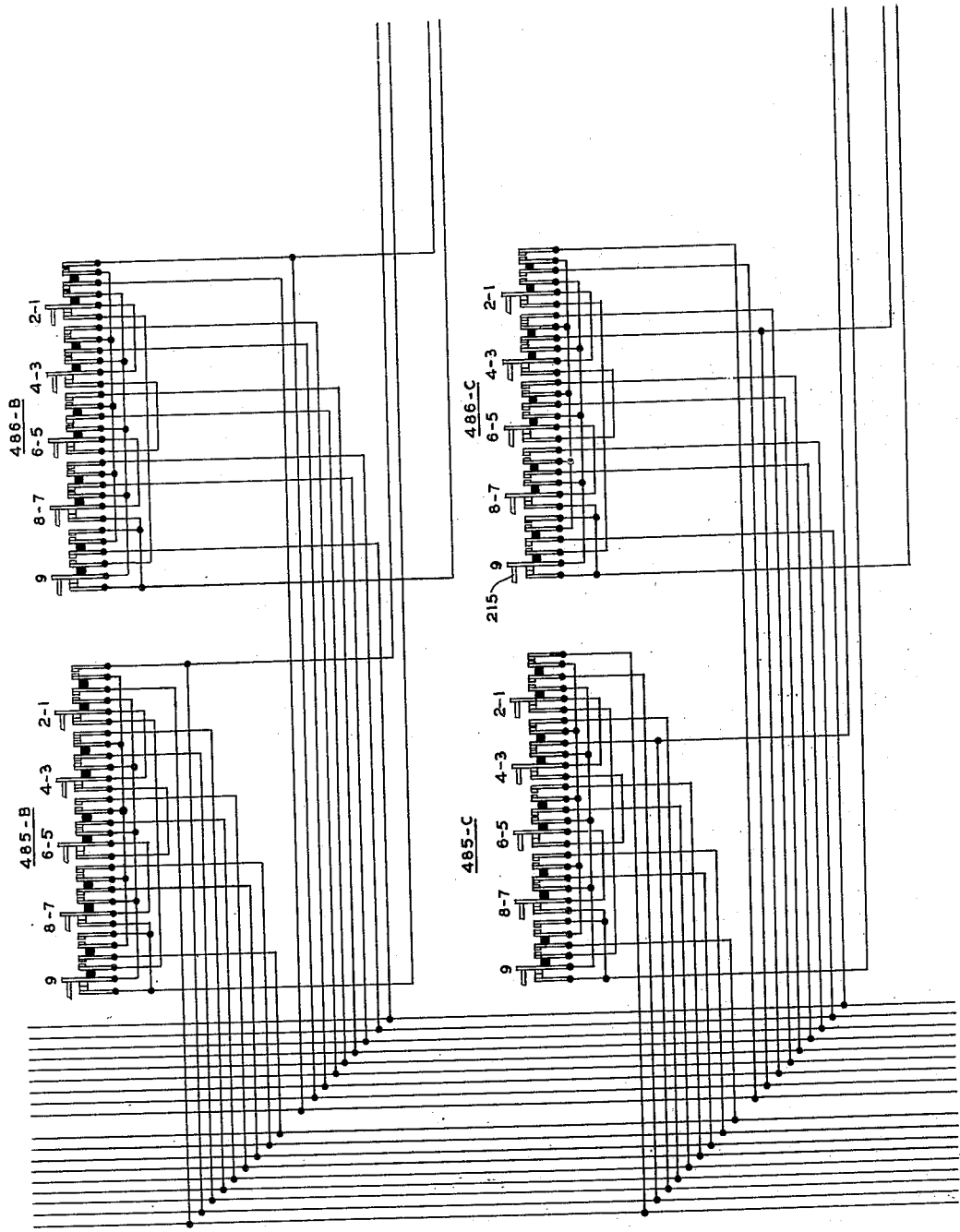
Figure 29:
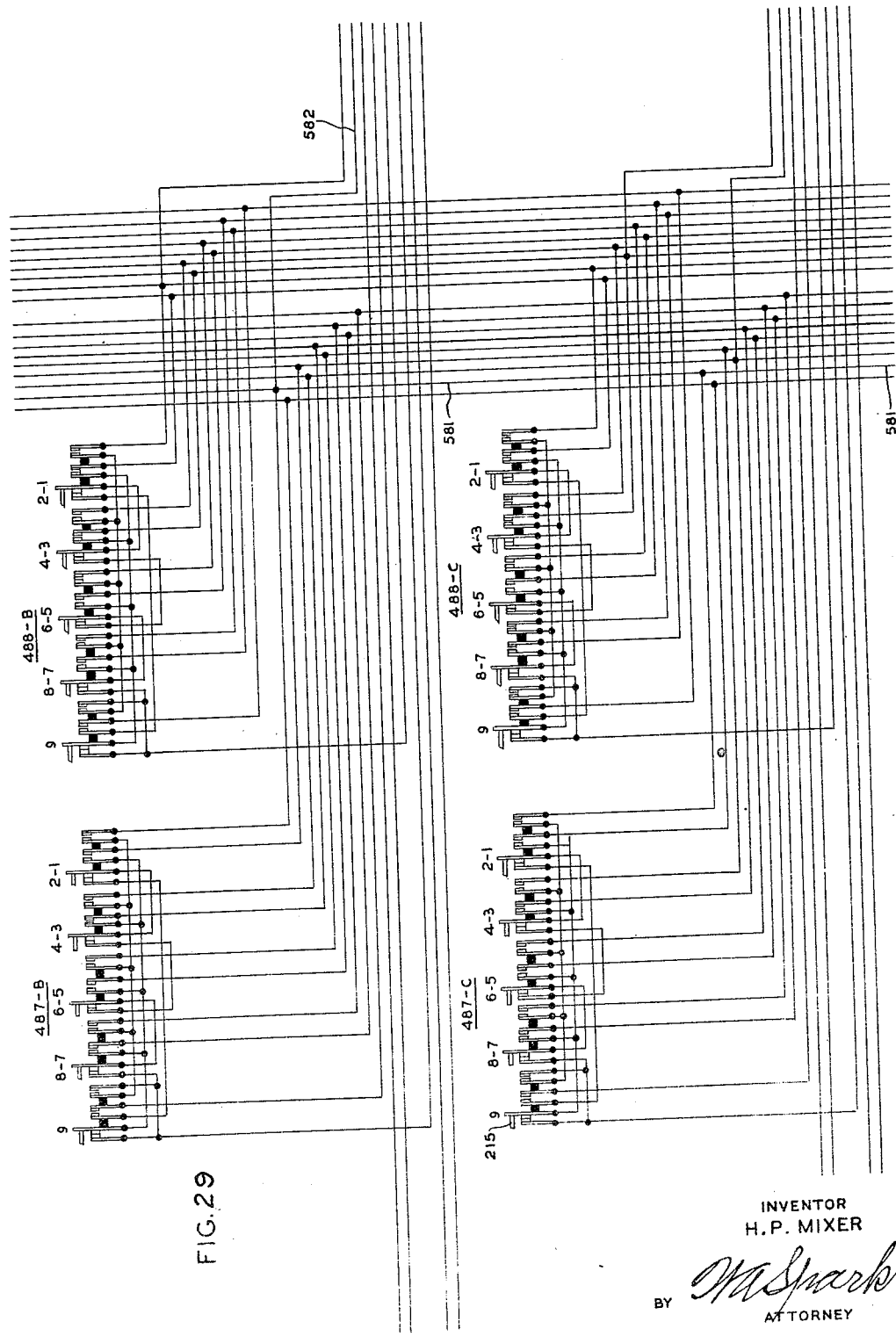
Figure 30:
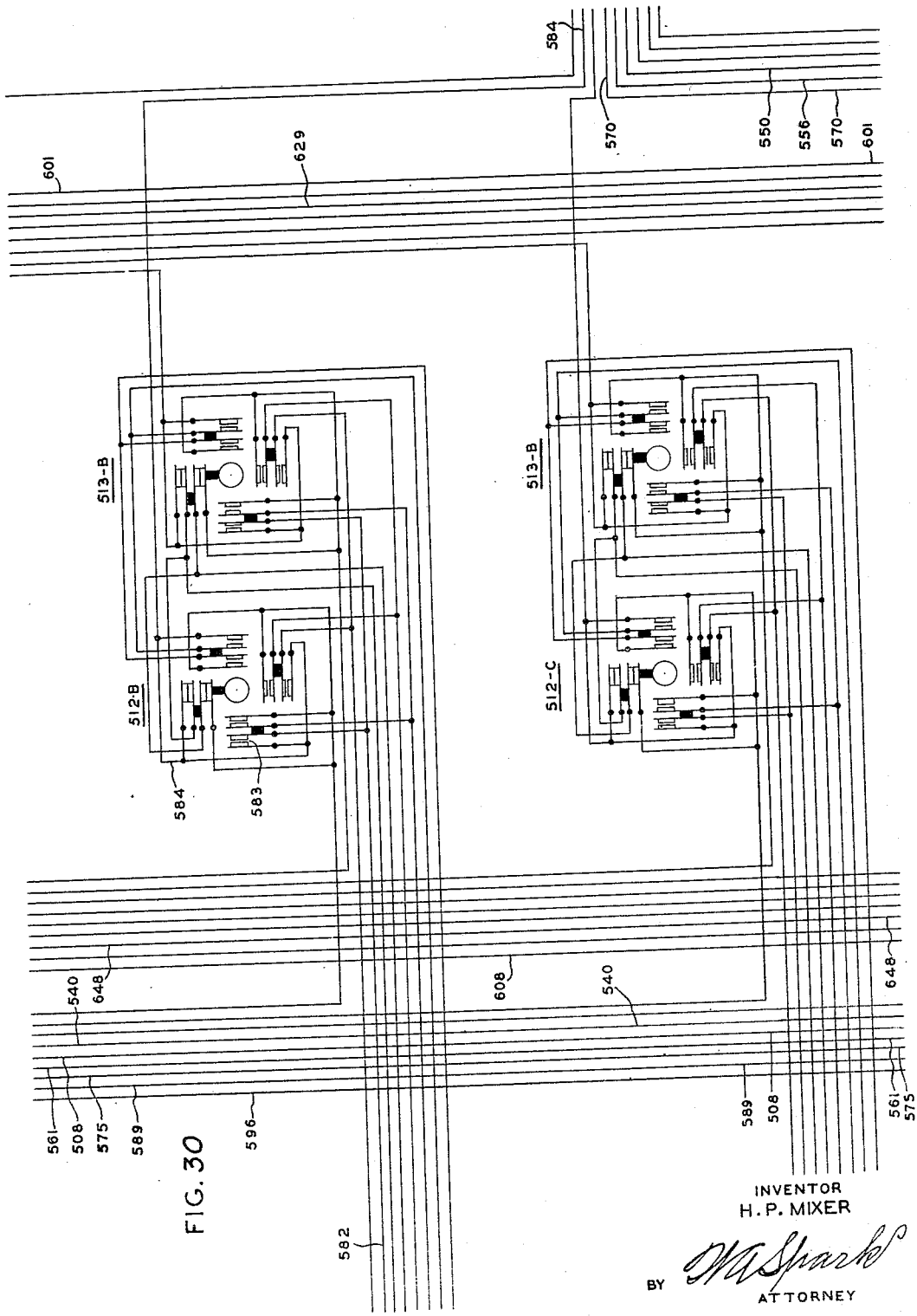
Figure 31:
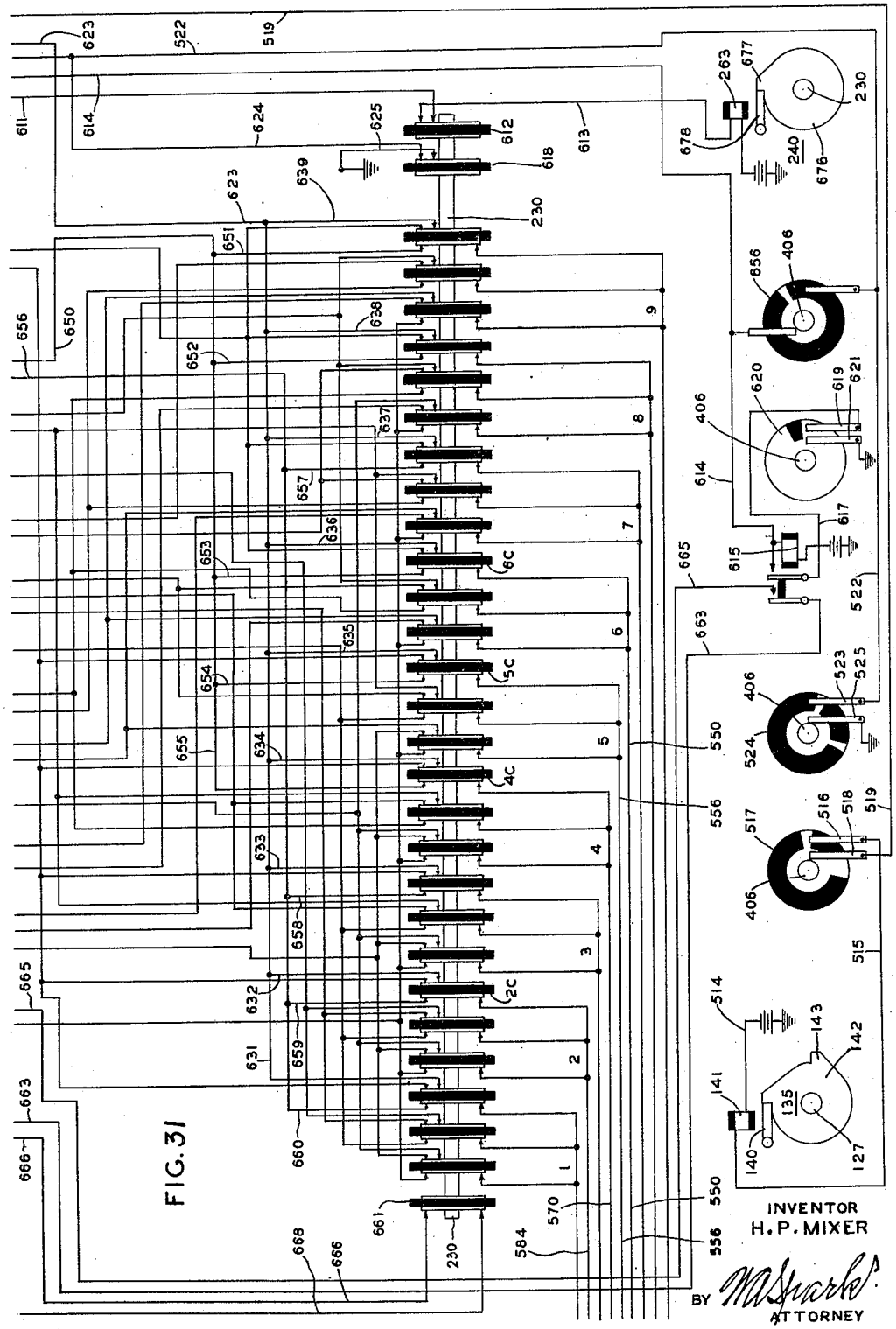
Figure 32:
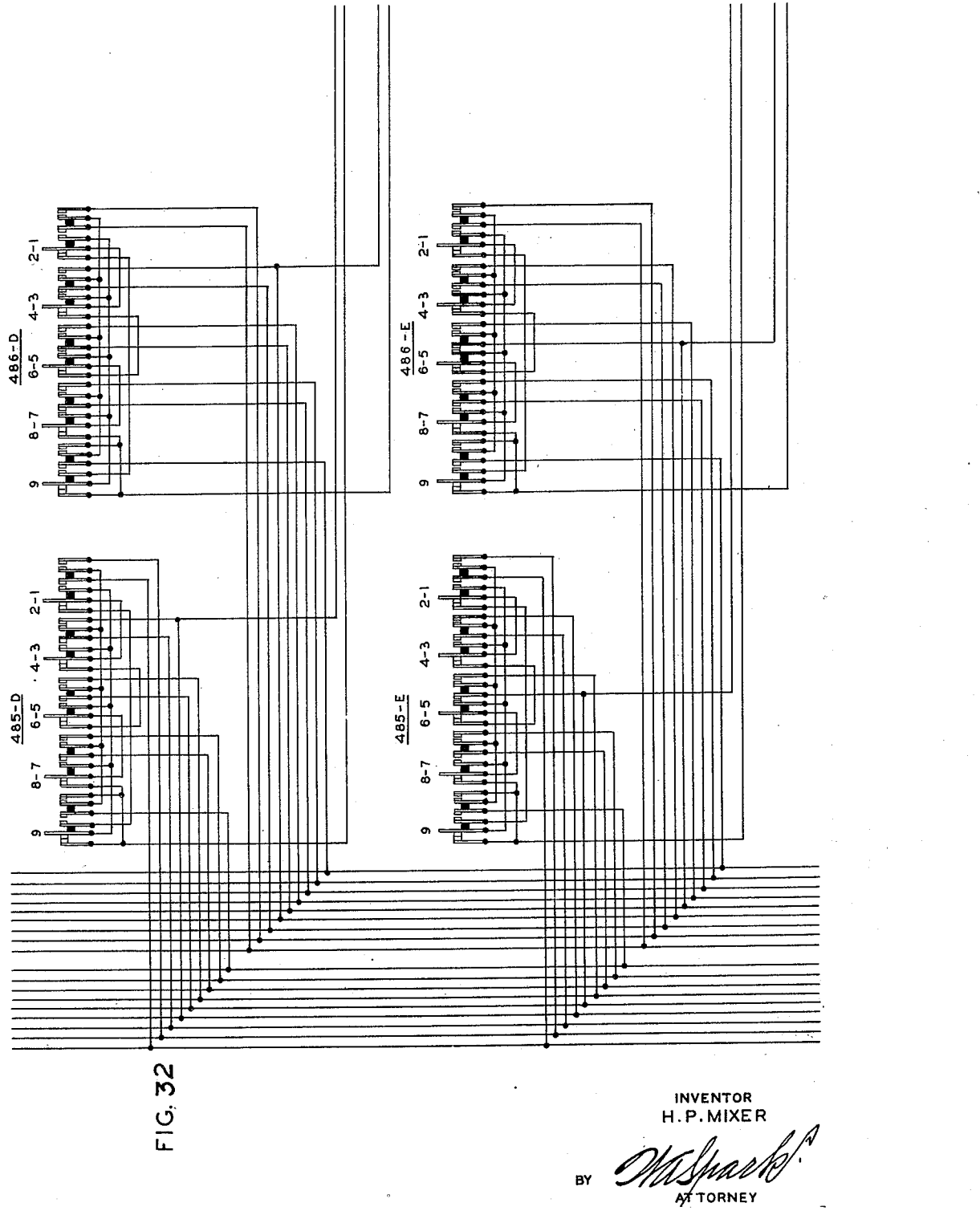
Figure 33:
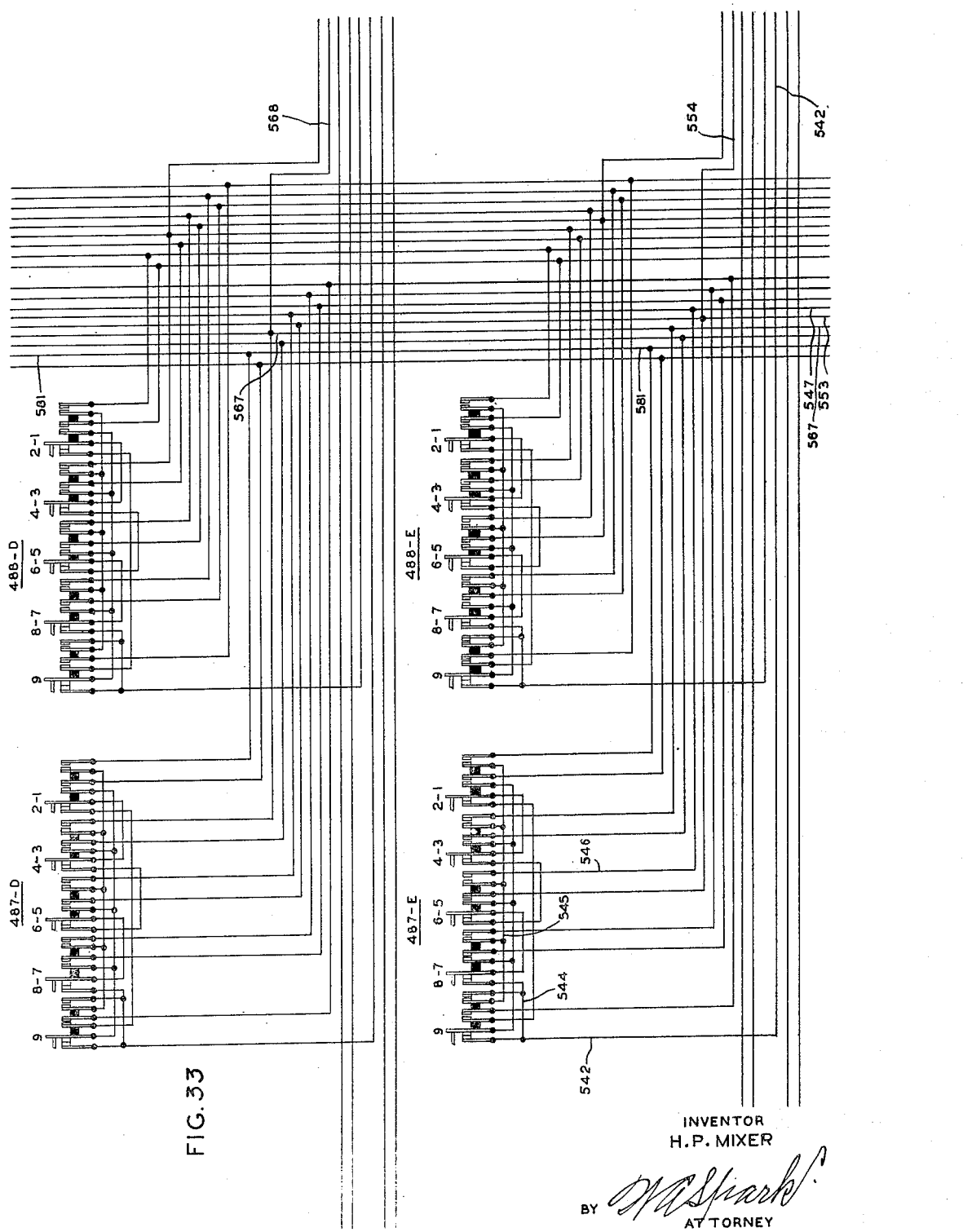
Figure 34:
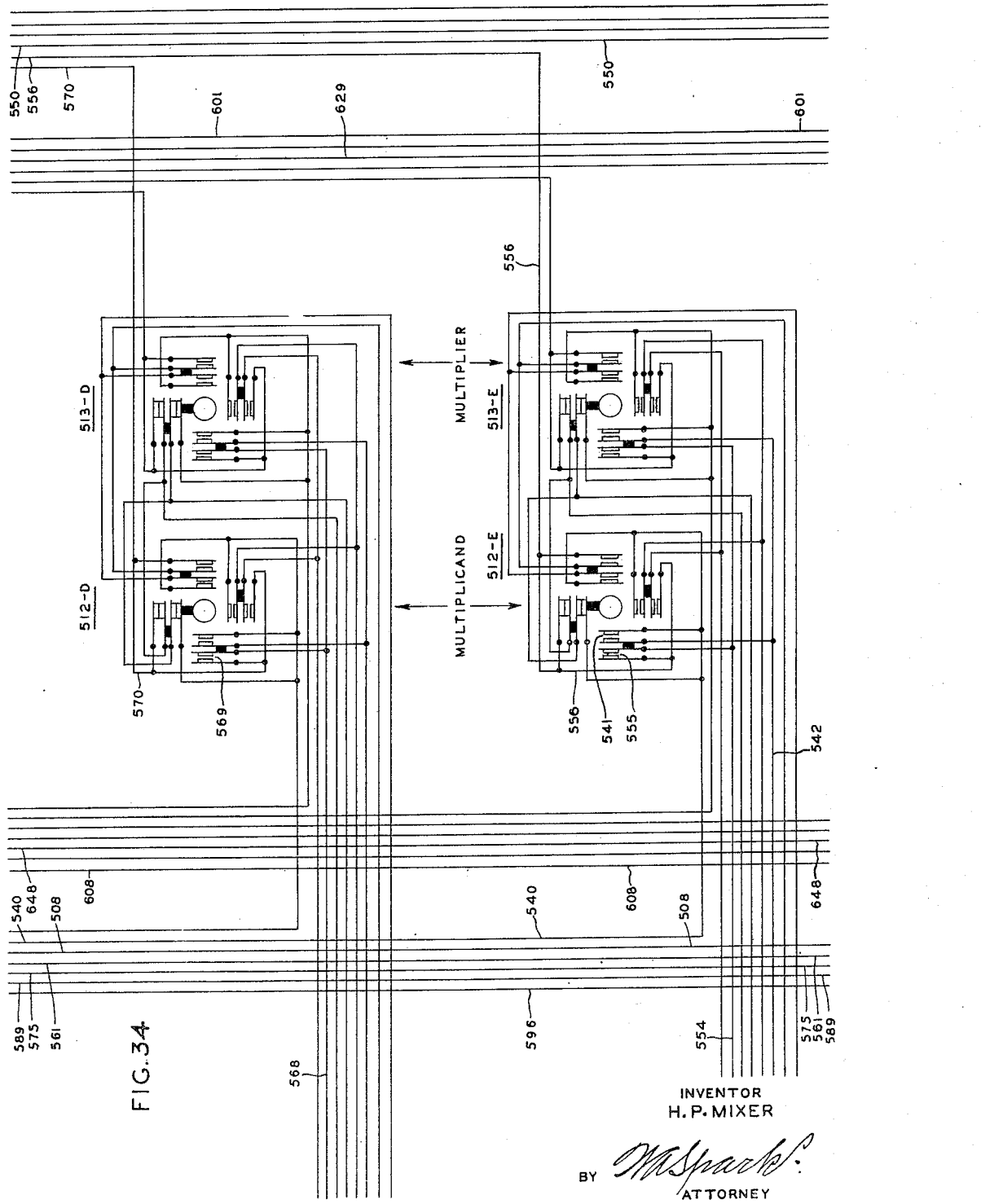
Figure 35:
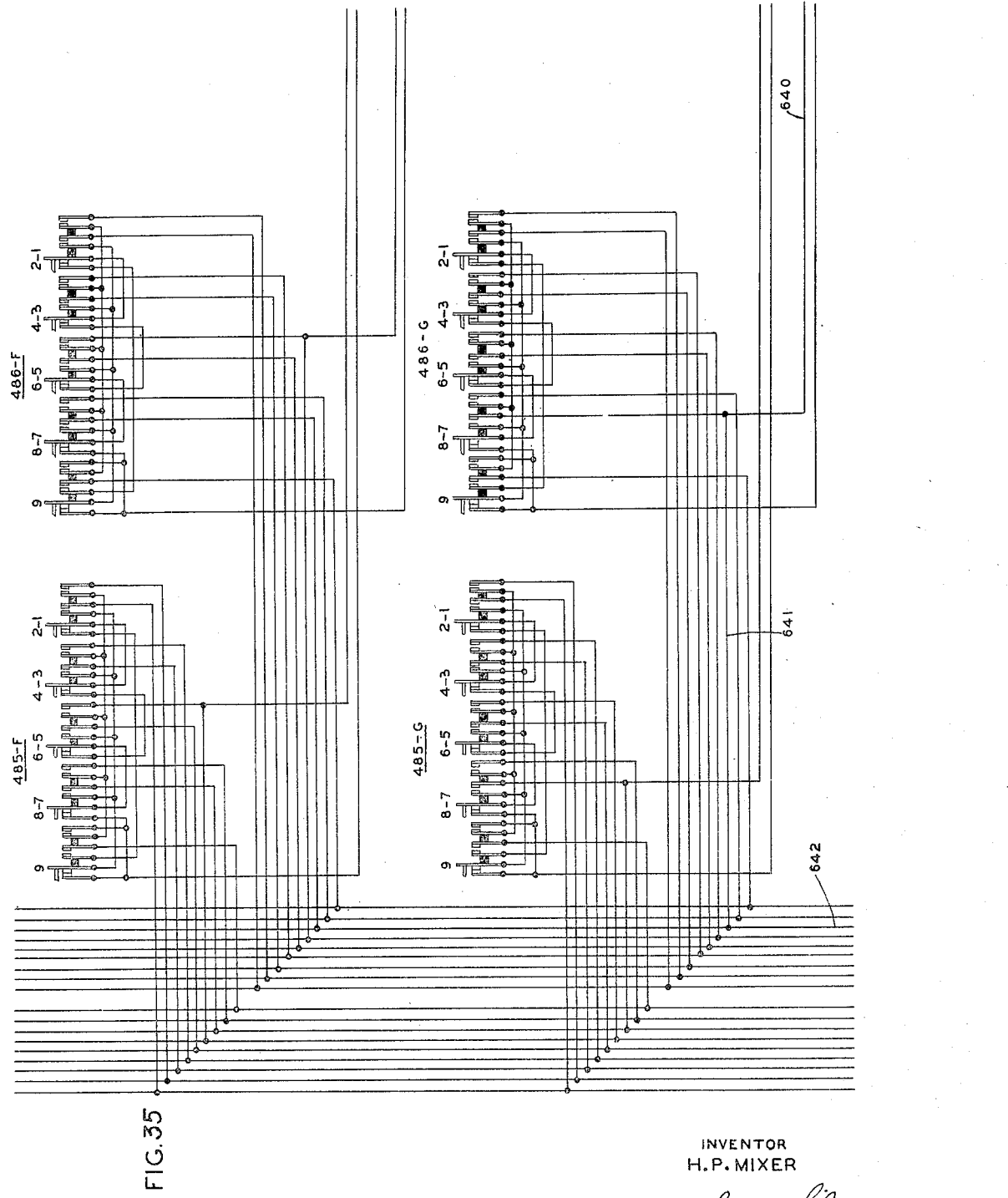
Figure 36:
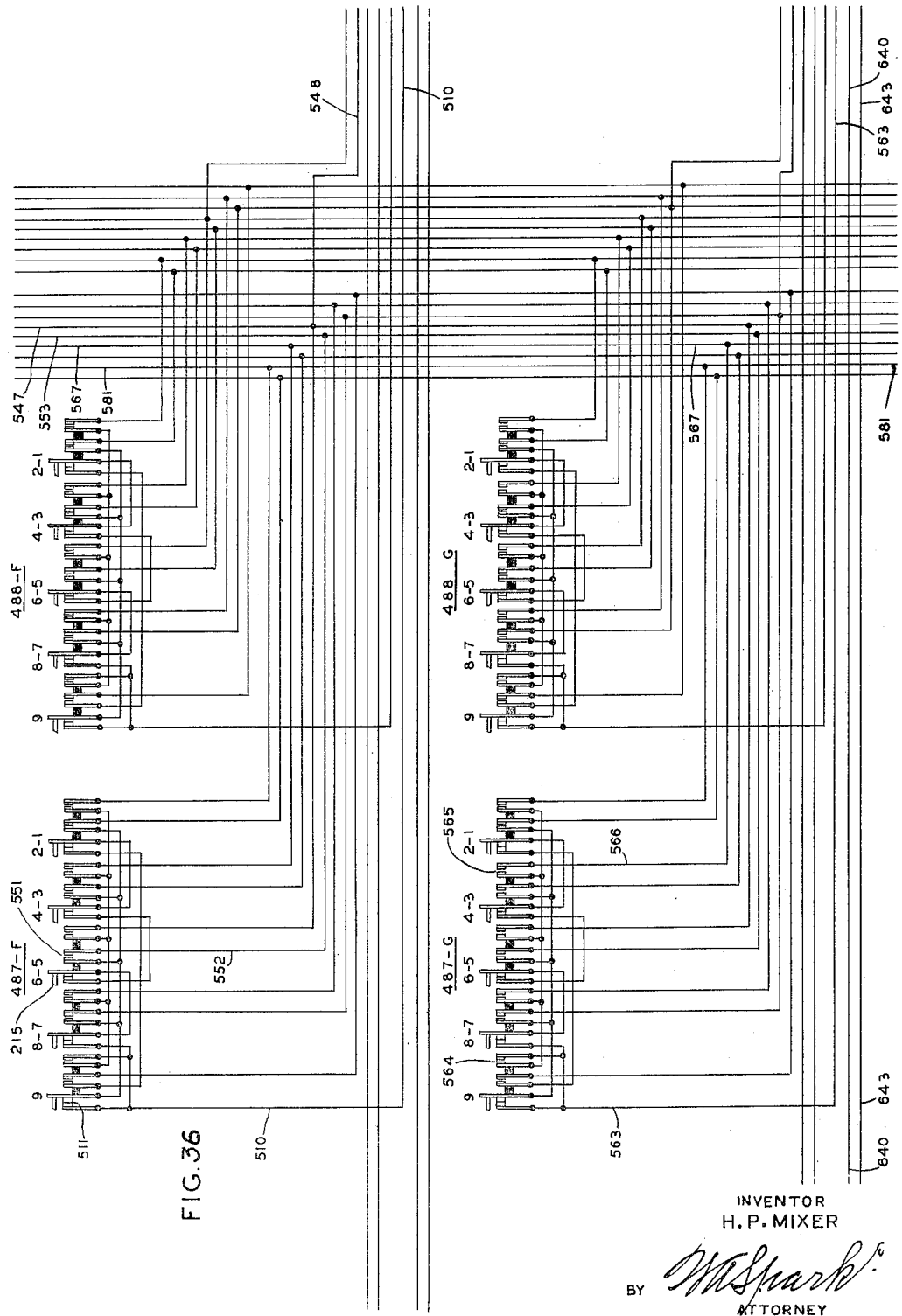
Figure 37:
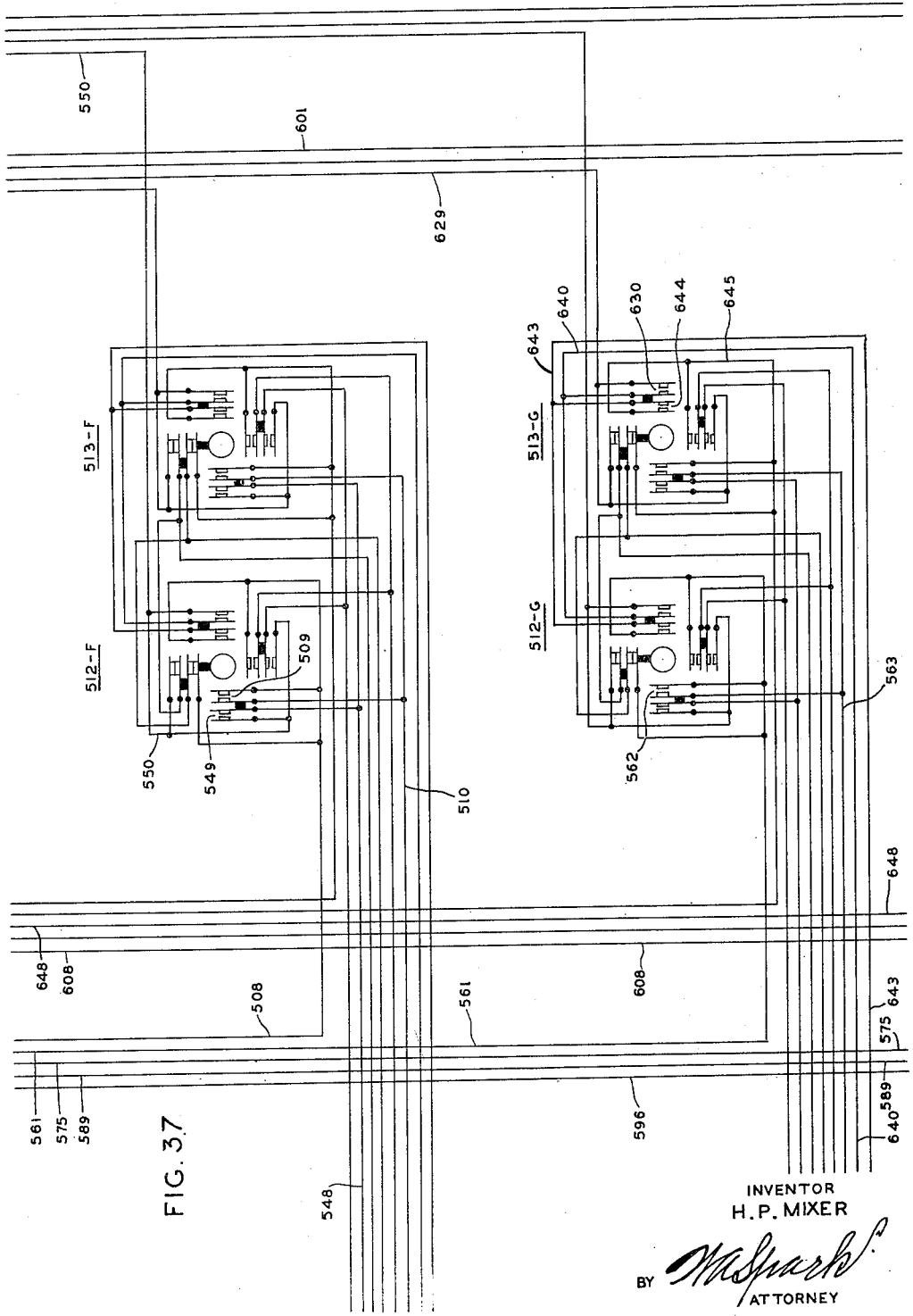
Figure 38:
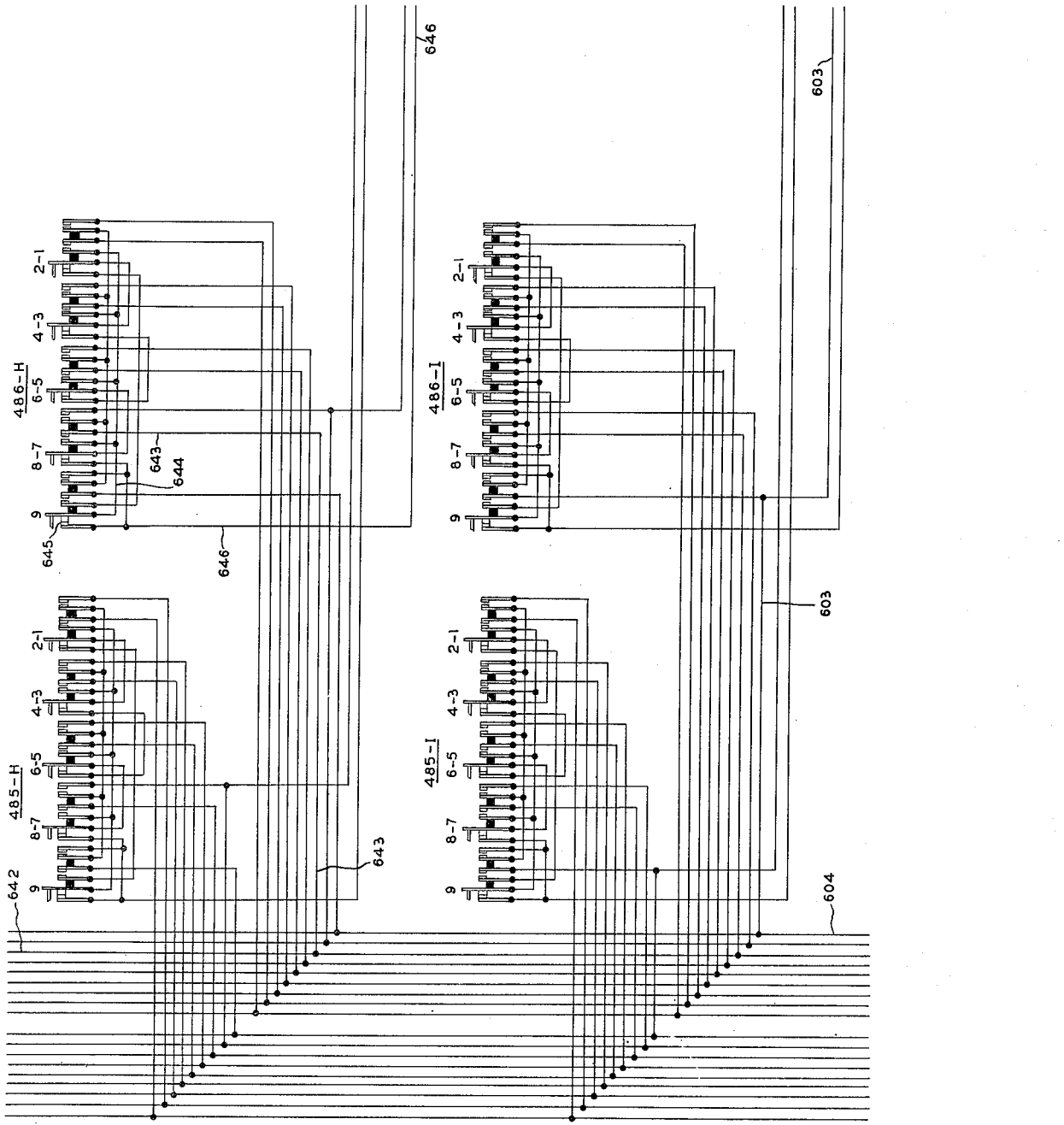
Figure 43:
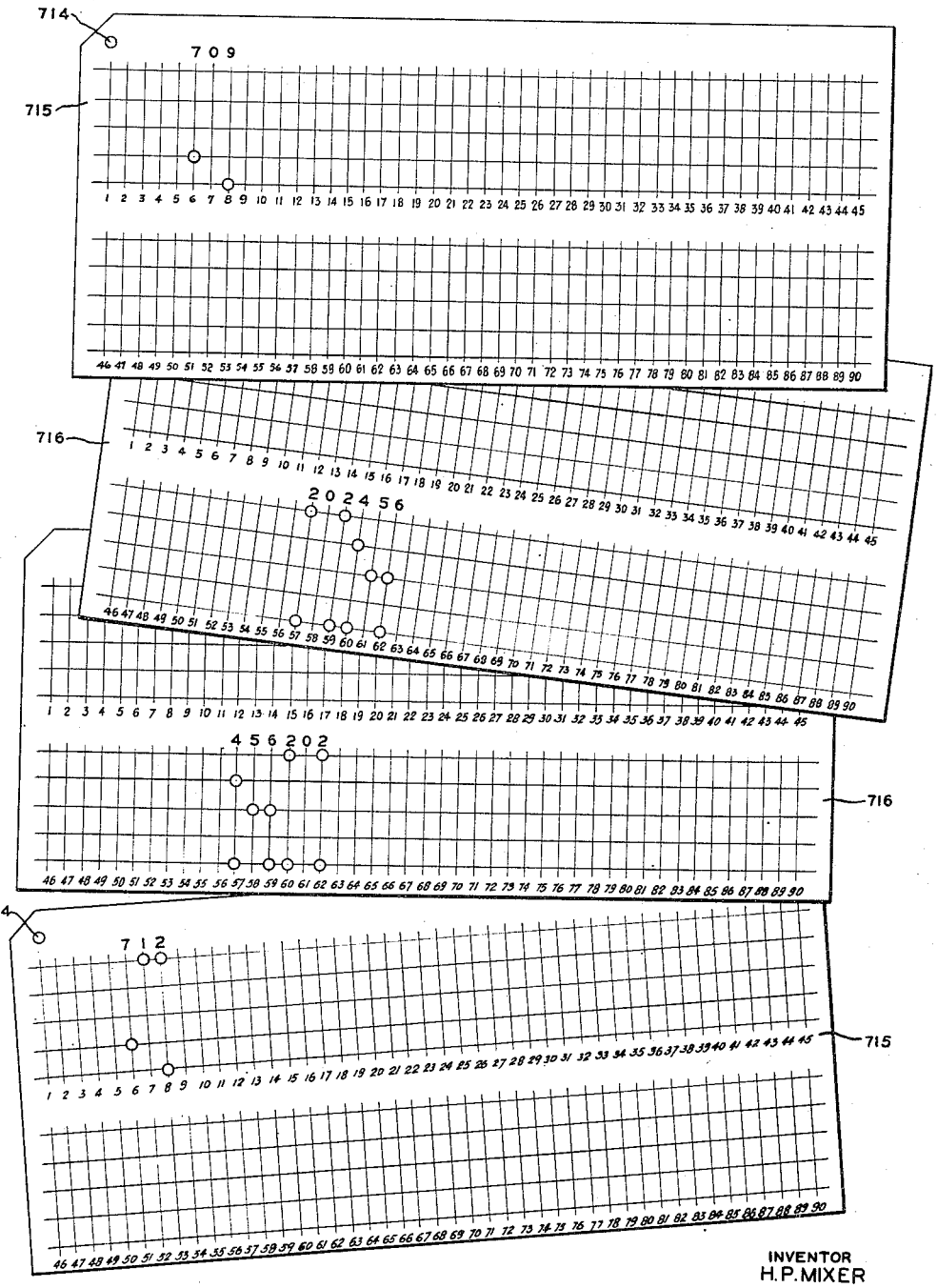

Figs. 4, 5, and 6 taken together comprise an enlarged sectional view of the machine, the section being taken somewhat to the right of the center line of the machine looking toward the left;

Fig. 5A is a sectional view of the machine similar to Fig. 5 but looking toward the right;

Fig. 6A is a diagram for combining Figs. 4, 5, and 6;

Figs. 7 and 8 taken together comprise a front elevation of the machine, showing the various controlling switches;

Fig. 9 is a rear elevation of the machine showing the location of the commutator shaft, connecting panel boards, and various drive shafts;

Figs. 10, 11, and 12 combined form a partial plan view of the machine disclosing the location of the mechanisms;

Fig. 13 is a detail sectional view showing the construction of one of the decoding mechanisms and a portion of the constant factor mechanism;

Fig. 14 is a left-hand side elevation of Fig. 13;

Fig. 15 is a detailed side view showing the mechanism associated with the constant factor control pin;

Fig. 15A is a front elevation of the card stop control mechanism showing the four stop control settings;

Fig. 15B is a sectional view of the mechanism shown in 15A taken along the line 15B—15B of that figure;

Fig. 16 is a front elevation of the decoding and constant factor mechanisms;

Fig. 17 is a schematic diagram illustrating the formation and position of the various commutator segments for multiplying;

Fig. 18 is a partial front elevation of the upper portion of the machine showing details of the clutch mechanism and the clutch operating magnets;

Fig. 19 is a cross section of one of the two multiple contact switches for selecting the field in the data card where the sensing or punching is to be performed;

Fig. 20 is a view of the data card with two factors and the product of these factors punched in the card;

Fig. 21 is a left-hand sectional view showing the clutch magnets and the manner in which they are mounted to cooperate with the clutch gearing together with the normalizing cam and cam levers;

Fig. 22 is an isometric view of the clutch magnet showing the latching mechanism in detail;

Fig. 23 is a diagram for combining Figs. 24 to 42, inclusive;

Figs 24 to 42, inclusive, are schematic wiring diagrams which indicate, when combined according to Fig. 23, the entire electrical wiring of the machine of which specifically Fig. 31 shows the wiring of the commutator segments and Figs. 26 and 27 show the wiring of the cutout switches, stepping switches, and relays; and Fig. 43 is a plan view of a group of cards as used in constant factor operation.

General description

Figure 1:
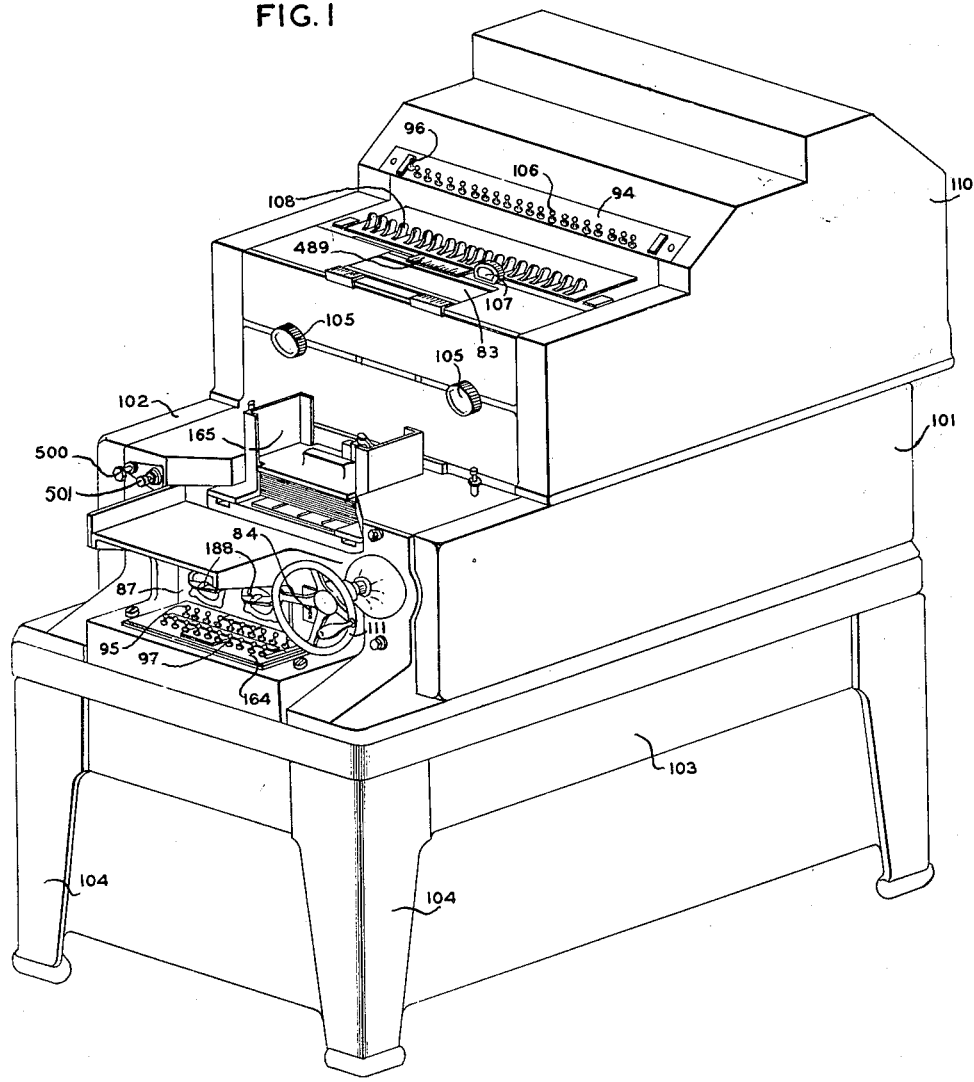

The appearance of the machine, when the various enclosing casings are in place, is shown in Fig. 1. As will be seen from this figure, and from Figs. 2 and 3, the various elements of the mechanism are supported by side castings 101 and 102, which are, in turn, mounted upon a base or bed plate 103 (Fig. 1), the bed plate being supported by legs 104. Castings 101 and 102 are box-like in shape having their bottoms toward the center line of the machine. Casting 101 is at one side of the machine and casting 102 at the other and between them extend various shafts, bars and rods, which support the machine elements.

Decoding mechanisms, similar to those described in Patent No. 2,214,029, are arranged to be moved transversely to align with any desired field in the record card. Control knobs for adjusting these mechanisms are shown in Fig. 1, designated as 105.

Supported on the forward portion of the bed plate 103, and between the forward portions of the castings 101 and 102, are the card magazine 165 and sensing mechanism. To the rear (Fig. 6) of these are the punching chamber and the punch control racks, while still further to the rear is the card receiving magazine 469 and various of the control and timing mechanisms. Above the receiving magazine lies the commutator shaft and the drive shaft for the accumulator units, together with the accumulator units themselves and the mechanism for causing them to yield their totals.

The upper structure is enclosed by a cover 110 which houses the accumulator wheels, the clutches, clutch magnets and the decoding sensing mechanisms. A row of twenty switches 106 is mounted on an insulating panel 94 for effecting a half-cent carry in any of the product circuits. Control of the punching operation is provided in the form of a hand lever 107 which may be manually set to select the columns in which the resulting product will appear in the punched card and a series of twenty disabling levers 108 permit the operator to restrict the punching to certain columns.

Associated with the lower structure is a panel 164 at the front of the machine on which is mounted two banks of ten switches 95 and 97. These switches disconnect the sensing decoding circuits so the operator may confine the sensing of either multiplier or multiplicand to certain columns. Just above the switch panel the handles 188 of two gang switches are mounted on a panel 87. They control the selection of card fields in which sensing is effected.

A starting button 500 and a stop button 501 complete the external operating control units.

Driving mechanism

Suspended beneath the bed plate 103 is an electric motor (not shown) which, through the medium of a belt 98 (see Fig. 2), drives a main shaft 109 which is supported in bearings fastened to the surface of the casting 101. On this shaft are various worms which drive associated worm wheels connected to the card feed and sensing mechanisms. The last worm on shaft 109 drives a worm wheel, which, through a belt drives the commutator and associated accumulator shafts. Likewise mounted on the main drive shaft is a dog clutch (not shown) and a hand wheel 111 for operating the machine by hand should the occasion arise. The various elements of the driving mechanism are similar to corresponding structures on the standard Powers machines.

Sensing mechanism

The sensing mechanism utilized in this machine is in general similar to that used in the Powers type of tabulator, and is well known in the tabulator art. The sensing mechanism (Fig. 4) comprises the sensing head 115, the sensing chamber and the reading-retaining box 117, the elements of which are well known but will be briefly described.

The sensing head 115 is a box-like structure of approximately the size of a record card, having a base plate 112 and an upper plate 114 between which are located 45 columns of sensing pins 118, each column comprising twelve pins. Each pin is held in its uppermost position by means of a spring compressed between a collar on the pin and the lower plate 112. In order to retain any sensing pin which has passed through the card in its uppermost position, relative to the sensing head, latching slides 119 are provided, one slide for each column of pins. These latching slides have cutouts with noses formed therein in a well known manner, and are slidably mounted in the sensing head and operated through the medium of a series of links 120 operated by a bail rod which is oscillated under control of a lever 121, a roller 122 on the lower end of which bears against a stationary cam plate 124. A latch 123 controlled by the well known "card presence" sensing pin is also provided to prevent locking of the sensing pins when there is no card in the sensing chamber.

The sensing head is arranged to reciprocate vertically and is guided by sleeves 125 which project downwardly from the sensing head and slide on rods or posts 126 which are supported upon the bed plate 103. The reciprocation of the sensing head is caused by rotation of the sensing drive shaft 127 (Figs. 2 and 4) which shaft is carried in bearings in castings 101 and 102. This shaft extends across the machine directly under the sensing head 115.

Mounted on shaft 127 (see Fig. 4) are two eccentrics 129 one of which lies under each side of the frame of the sensing head. Each eccentric 129 is provided with an eccentric strap 130 having a link-like extension 131. The extension of each eccentric is pivotally connected to a stud fixed to the side of the sensing head frame and thus, as the shaft 127 revolves, sensing head 115 moves up and down.

Shaft 127 is driven from shaft 109 through gearing and a clutch 135 such that its movement is intermittent and is under control of a clutch tripping lever which is magnetically operated.

Figure 2:
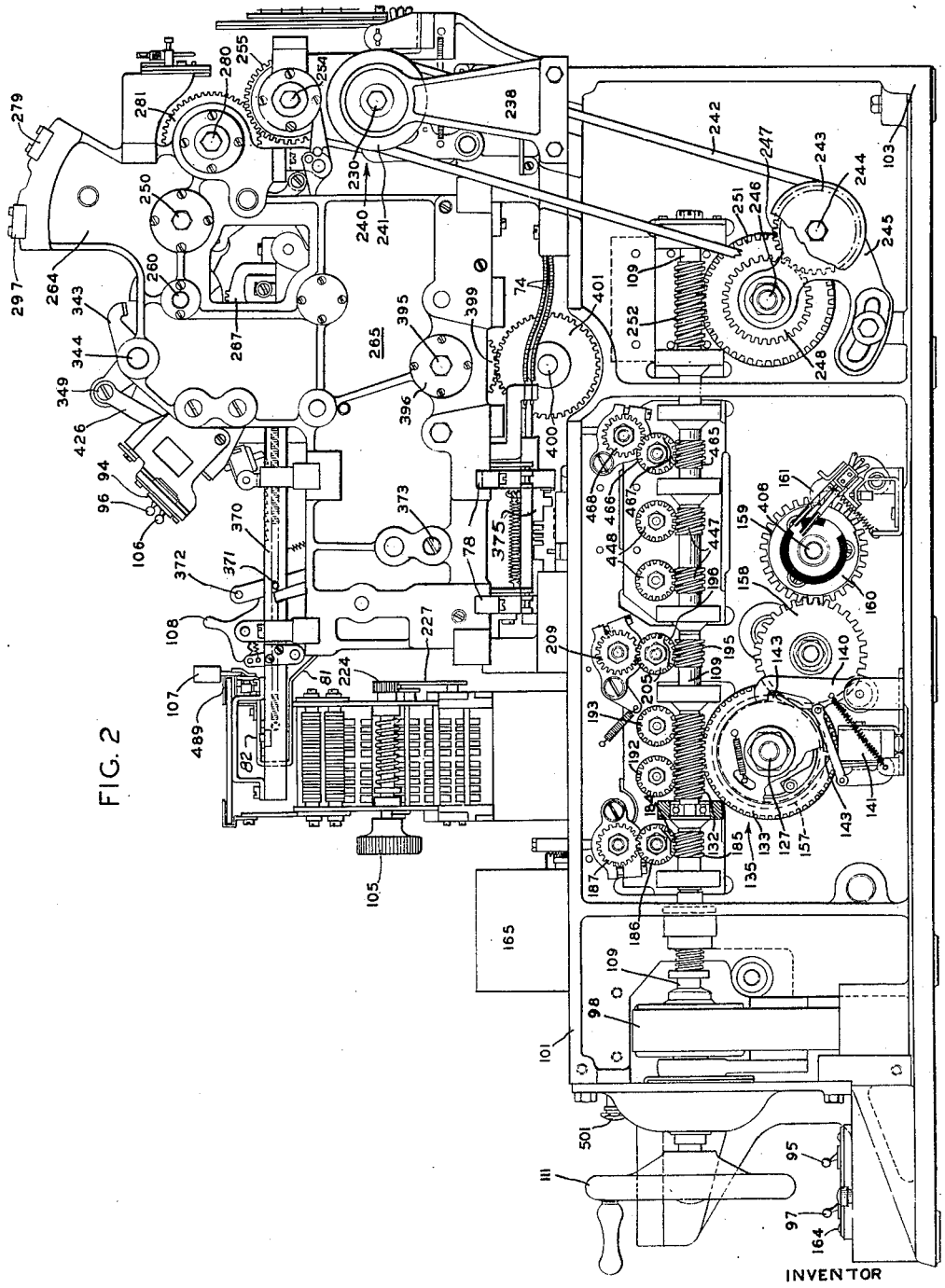
Fig. 2 is a side view of the machine looking from the right with the covers removed, showing in particular the main driving mechanisms and their associated parts.

Fastened to shaft 109 (Fig. 2) is a worm 132 which meshes with and continuously rotates a worm wheel 133 which is free to rotate on shaft 127 (see Fig. 2). Secured to worm wheel 133 is the flat plate clutch 135, the details of which have been described in the above mentioned patent.

Clutch 135 is controlled by a lever 140 which in turn is operated by a tripping magnet 141. When current is sent through the magnet, the lever 140 is pulled away from a projection 143 on the disc 138 and the clutch operates to turn gear 133 and drive the shaft 109.

It will be apparent from the drawings that the projections 143 are so spaced that the shaft 127 rotates in two steps, the first being about 90° and the second about 270°.

Sensing chamber

Immediately above the sensing head is a card sensing chamber (Fig. 4) which is composed of two plates 145 and 146, which are perforated in the same manner as the plates 112 and 114 of the sensing head and between which a card to be sensed is fed in a manner hereinafter described.

Record retaining mechanism

The sensing chamber, record retaining mechanism, and decoding mechanism described in this specification are substantially equivalent to similar structures described in the above mentioned Patent No. 2,214,029.

Supported immediately above the sensing chamber is a record-retaining box 117 which contains a plurality of record-retaining pins 147, which pins are arranged in 45 columns of twelve each to cooperate with the similarly arranged pins in the sensing head. The pins 147 are adapted to be locked in their uppermost positions by the cooperation of extrusions or pins 148 thereon, with latching slides 149. Two latching slides are provided for each column of pins, one of the two slides serving to retain the five pins associated with the upper 90-column zone in their operative position, and the other to retain the six pins associated with the lower 90-column zone. For the 90-column code card only five pins should be operative, but six are provided in order to make an easy adjustment to accommodate 45-column cards. All of the latching slides are normally held in their right-hand positions through the medium of a pair of spring combs 150, one of which bears against projections at the forward (left-hand as seen in Fig. 4) end of the slides, and the other of which engages notches at the rearward (right-hand) end of the slides. The latching slides are moved to the left against the pressure of the spring combs by the action of the extrusions 148 on the pins 147, with cam faces 151 in the cutout portions of the slides. When a pin has passed above the cam 151 the slide is returned to its normal right-hand position by the spring comb 150, and the pin is then held in its raised position. At a predetermined moment in each sensing cycle, a restoring bail 152 is pressed against the right-hand projections of all the slides returning them to the left against their spring tension and thereby releasing all locked pins. The first row of retaining pins is not locked up at any time but returns to normal with the sensing pin box 115.

Sensing operation

Assuming now that a card lies in the sensing chamber, and that the clutch 135 has been operated, the shaft 127 will commence to rotate. As the shaft rotates, the sensing head is lowered under control of eccentrics 129. If at this time the clutch is again tripped, the sensing head rises bringing the pins into contact with the card and any sensing pin 118 which finds a hole in the card continues upwardly as the sensing head rises, while any pin which meets an unpunched portion of the card is forced downwardly (relative to the sensing head) against the tension of its spring. Immediately after those pins which find holes in the card pass through the card, the bail lever 121 is rotated counter-clockwise (as viewed in Fig. 4), and moves the locking slides 119 to the left, thus locking those pins which have passed through the card in their uppermost positions. As the sensing head continues to rise the locked pins press against the corresponding record-retaining pins 147 and move them upwardly against the tension of their associated springs, which are compressed between the upper plate 153 of the reading retaining box and shoulders on the reading-retaining pins.

As the reading-retaining pins move upwardly, the extrusions 148 of eleven rows of pins meet the cam faces 151 in the cutout portions of the cooperating latching slides 149 and force the latching slides to the left. Shortly thereafter the extrusions pass beyond the cams and the slides are returned to the right by the spring combs 150 and lock the elevated pins in their raised positions. The first row of pins is never locked up but returns with the sensing pins as described above. This is because the first row is used as a control position, as will be described later, and does not operate any decoding contacts. Due to the coordination of the cam plate 124 and of the cam which controls the restoring bail 52 for operating the latching slides 149, those slides are moved to the left just prior to the locking of the pins 118 in their uppermost positions. This movement of the bail 152 will release all pins 147 which were locked during the previous cycle and prepare them for re-operation and locking.

Operation of the reading-retaining pins 147 is effective to raise certain decoding rods and close certain contacts within the decoding mechanisms which lie above them. Since the de-coding mechanisms are described in detail hereinafter, description of this action will be deferred.

Card feed

The cards are fed into the machine in a manner well known in the art and similar to that described in U. S. Patent 2,214,029 referred to above. Therefore, only a short description will be given here.

The cards are stacked in a magazine 165 from which they are fed by picker knife 168 to feed rolls 180 and 181, which carry the card into the sensing chamber where the card is picked up by a pair of continuously rotating pressure and skid rolls 190 and 191. These rolls carry the card into contact with a pair of card stops 204, which hold the card during the sensing operation. After sensing is completed, the card stops are raised and the rolls 190 and 191 feed the card into the eject rolls 206 and 207, which, in turn, carry the card to the punch chamber, where it is held as will be described later for punching the product. The worm 185 on the shaft 109 drives the feed rolls 180 and 181 through worm wheel 184, which, in turn, drives gears 186 and 187. The worm 132 drives worm wheels 192 and 193 which drive the rolls 190 and the worm 195 through the medium of worm wheel 196, and gears 205 and 209 drive the eject rolls 206 and 207.

The relative positions of the sensing pins, card stop, and picker knife may be more clearly seen by referring to Fig. 53 of Patent No. 2,214,029 which shows a timing diagram which indicates the actions of these and other important mechanical parts.

Decoding mechanism

The perforated record card used in this machine is well known in the art as the ninety column or double capacity card. This card is divided into two zones, the upper and lower, each of which includes forty-five columns of five rows of sensing holes each. In the code used, each odd digit is represented by a single hole in the card, while each even digit is represented by two holes in the card, one of which is that hole which alone would represent nine and the other of which is that hole which alone would represent the next lower odd digit (i. e., nine and three equals four). Sometimes the uppermost hole in each zone is utilized to designate zero, while at other times, zeros are not punched and the tabulator or other machine with which the card is used is so constructed as to print a zero to the right of a significant numeral when no hole appears in the corresponding column. In the present instance, the latter is true and when there is no hole in the uppermost position of either zone, zeros are automatically registered in the totalizer or, more truly, there is no registration in the totalizer.

As will be obvious from the description, the sensing mechanism, merely determines whether a hole appears in any position of the card and does not serve to translate the card coding into a digital count. It is for the purpose of performing this translation that the decoding mechanisms or units are provided.

The instant machine is adapted to multiply a number of from one to ten denominational orders by another number containing not more than ten denominational orders. There are two decoding units 178 and 179 which are mounted directly above the reading-retaining box 117 and are adjustable transversely of the said box so that the factors to be multiplied may be taken from any field or zone of the card.

A somewhat simplified form of this decoding unit forms the subject matter of a patent application S. N. 335,685, dated May 17, 1940, now Patent 2,323,833, dated July 6, 1943.

Details of one of the two decoding units are shown in Figs. 13, 14, and 15, and the mode of mounting the units is shown in Figs. 4 and 7. Each decoding unit comprises a pair of vertical plates 210 which are secured together at the base by a plate 211 and at the top by a pair of rods 212 having shoulders formed thereon for maintaining the plates in parallel relation to form a unitary structure or carriage.

Mounted between the plates 210, and secured to flat transverse bars 213, is a series of electrical contact springs 214. These assemblies are constructed in echelon array as shown in detail in Fig. 13, with their contact ends directly over a sensing position. There are ten groups of contacts arranged along the length of the decoding unit and ten rows of groups making 100 in all. Each group has six contact springs, two of which are normally in contact and four which are open. The contacts are operated by vertical interponent pins 215 whose bottom face is adapted to be engaged by the top of the record-retaining pins 147. Appropriate springs are employed to return the pins 215 to their normal position after each sensing operation.

When used with ninety column cards the decoding unit is divided in half since only five rows of ten columns are necessary to sense a number in a card. The double capacity decoding unit permits both factors to be sensed from one field of a card and permits easy and convenient switching from one card area to another.

The decoding pins 215 slide in perforations in two supporting plates 216 and 217 and midway between these two bearings the pins are formed with two square shaped slots, 218 and 219 (Fig. 14). Between each column of decoding pins a latch plate 220 is slidably mounted. Each latch plate is provided with a series of square holes 221 which are adjacent to the top slots 218 when the rods are in their normal position but are adjacent to the bottom slots 219 when the pins are in their sensed or operated position. These slots and perforated latch plates cooperate to permit a constant factor to be used as a multiplier and will be described in detail later.

All but one group of the decoding pins 215 are held in their normal position by a set of weak springs 69 which are compressed between a rim on the rods and the plate 70. The extra pin, because of space limitations, uses a flat spring 88 for its return (Fig. 13).

Referring now to Figs. 13, 14, and 16, it will be seen that there extends through the decoding unit, near the midpoint of one side thereof, a shaft 222 which is pressed forwardly by spring 223 and has secured to the forward end thereof a knurled knob 105 and at the other end a pinion 224.

Extending across the machine and supported by brackets 225A fixed to the castings 101 and 102 are two rails 225 on which ride guides 226 which are fixed to the outer faces of plates 210 of the decoding unit. Fixed to the rear rail 225 is a rack bar 227 (Figs. 7 and 14) which extends upwardly and meshes with the pinion 224. Fastened to the rear plate 210 of the decoding unit is a segmental rack bar 228 which when the shaft 222 is in its forward position meshes with the pinion 224 and acts as a stop member.

It will be seen from the above that when it is desirable to move the decoding unit from one position to another to align with a field in the card from which a factor is to be sensed, knurled knob 105 is pushed in causing the pinion 224 to disengage from the segmental rack bar 228, after which the wheel is rotated in either direction and the unit, due to cooperation of the pinion 224 with the rack 227, is moved transversely along the rails 225. Upon release or withdrawal of knob 105, the pinion again engages rack bar 228 and the unit is thus locked in position.

The contact stacks of each horizontal row are wired together in such a manner that the sensing of the card can be translated into a standard digital code. This wiring of the various contact stacks is shown in the general wiring diagram (Figs. 24 to 42, inclusive) which differs considerably from the wiring scheme employed in previous multiplier machines and will be discussed in detail when an illustrative example of the operation of the machine is considered.

The wiring of the decoding contacts 214 is such that whenever a pin in a position associated with an odd digit is operated, a circuit is completed over a wire associated with that digit and lower extremity and no action will result. If, however, there is no card in the sensing chamber, the no-card pin 719 will cause the interponent 711 to be aligned and the rod 711 will engage it and cause the rotation of finger 706, thereby rotating shaft 705 and lever 695 which carries the stud 693 into engagement with the control lever 691 which operates through the combination of lever 690, shaft 689, disengaging block 687, pin 685, and frame 683, to move all the latch plates 220 to the front of the machine and release all decoding pins which may have been locked up. At the same time the lever 696 will again engage the bent-over portion 703 of lever 695 by means of its hook 702 and hold the entire system in the unlatched condition as indicated in Fig. 14. The sensing and decoding mechanisms are now in condition to resume ordinary multiplication again and the various control levers just described will remain as described until another master card is sensed and square shaft 698 is again rotated.

When a master card 715 is sensed, the sensing pin operating through the predetermined control hole 714 elevates the lever 697 (Fig. 4). This rotates the square shaft 698 and by means of lever 699, link 700, lever 701, the two lever members 696 and 694 are rotated counter-clockwise as seen from the right-hand side of the machine. The first result of this action is the release of lever 695 by unlatching member 703 from the hook 702. Lever 695 at once turns in a clockwise direction urged by a spring 712 and in so doing releases the control lever 691 for an instant but as the lever 696 continues its rotation, the lug 694 again rotates the control lever 691 to the unlatch position.

The control elements are now in the position indicated in Fig. 15. As has been previously described, the control sensing pin has attained its uppermost position at this point and latch plates 220 have been moved to the left to free all decoding pins.

When the control sensing pin was elevated, the constant factor in the master card was sensed and the sensed data latched in the interponent field and communicated to the decoding pins. The control sensing pin drops when the sensing head is lowered, but the sensed data is held in the decoding pins for the duration of the multiplying cycle by latch plates 149 (Fig. 4). It is the function of latch plates 220 to hold the sensed data in the decoding stacks for any number of multiplying cycles and as soon as the control sensing pin is lowered, the square shaft 698 again is rotated and lever 699, link 700, lever 701, lever 696, and lug 694 are all moved in unison to allow control lever 691 to rotate counter-clockwise and release lever 690 which through the mechanism already described will move the latch bars 220 to the rear of the machine and retain the data in the decoding pins until released by another master card or the manual depression of key 704.

When a constant factor has been set up in the decoding stack and another master card is sensed, the procedure is the same as described above except that the old constant factor is erased by the movement of plates 220 before the new factor is locked into the decoding pins. When the master card is sensed, the control sensing pin raises the lever 697 and rotates the square bar 698. By means of the linkages described above, lever 695 is unlatched and the control lever 691 swings clockwise pulling down lever 690, moving bail 687 and releasing all the decoding pins which had been locked by the previous master card. At the same time the control sensing pin is unlatching the decoding pins, a new constant factor is sensed and delivered to the decoding stacks. When the control sensing pin is lowered, the control mechanism causes 696 to be rotated clockwise drawing the stud 694 away from the control lever 691. During this operation the lever 695 is still unlatched and, therefore, the stud 693 is rotated clockwise and has no control over the lever 691. Both the studs being out of the way, lever 691 rotates counter-clockwise, releasing lever 690 and allowing the bail 687 to fall back and permit locking pins 89 to move into engagement with either of the notches 218 or 219.

Switches

At the front of the machine and beneath the card magazines (see Figs. 1, 2, and 3) is a small insulated panel board 164 containing a plurality of disabling switches arranged in two rows 95 and 97. One row is marked "Multiplier" and the other "Multiplicand," each switch being a single throw, single pole type with its terminals connected in series with the multiplying network.

There are ten switches in each row, one for each column of the card which lies under either the multiplier or multiplicand decoder unit. Each switch in this group is connected between its respective decoding contact assembly and the digit relays or commutators.

When there is no data to be sensed from several particular columns, the switches may be opened to insure that no reading be taken there, but this precaution is unnecessary since there will be no data sensed from a blank card. The real usefulness of the switches is utilized when a number of say five digits is preceded by other data which should not enter into the multiplication operation. The cutout switches will disable these columns regardless of the amount or nature of the data punched therein.

Above the decoding-sensing units, on top of the machine is an insulated panel board 94 which holds 21 single pole, single throw switches similar to the ones previously described. Twenty of these switches 106 are arranged in a row across the machine and adapted to cause the usual "half-cent carry" operation when their contacts are connected. The extra switch 96 governs all the others and when it is thrown to the "off" or non-conducting position disables the entire group.

A "half-cent carry" is obtained by adding 5 digits in the next lower order and at the same time disabling the punching of that and all lower orders.

Mounted above the disabling switches 95 and 97 on a vertical insulating panel are two dial switches for shifting the circuit connections to different zones of the card (see Figs. 1, 4, 8, and 19). On the outer face the numbers 1, 2, 3, and 4, equally spaced about the central shafts and indicating knobs 188 are provided for showing which zone of the card is connected. Behind the panel, a housing 374 of Fig. 19 is positioned which contains side plates 270 for holding the contact assemblies 274 and bearings 275 for journaling the switch shaft 276. Four eccentric cams 277 are secured to the shaft 276, operatively engaging four cam follower plates 278 which by means of insulated tips open or close the contacts in accordance with the degree of rotation of the knob 188.

whenever the two pins associated with an even digit are operated, a circuit is completed over a single wire associated with that even digit. Each vertical row of contact stacks is associated with the same hole or digit code position for the ten record columns.

Constant factor control mechanism

When it is desired to use a constant factor as a multiplier and a number from each card as a multiplicand, the constant factor is punched in a master card 115 (Fig. 43) with a predetermined control hole 114 and placed below the series of cards 116 containing the multiplicands. Each master card erases the previously set-up data as well as sets up the new factor; hence any number of master card combinations may be stacked together and used in the machine without interruption. The constant factor means is useful in payroll accounting where there may be several classifications of workers, each class receiving a different hourly wage. The cards of each class, containing the working hours, are stacked together after a master card containing the hourly rate. With the proper setting the machine will multiply each factor (hours) by the constant factor (dollars per hour) sensed from its master card and punch the product (weekly wage) in each individual card.

The setting for constant factor operation is as follows: A series of ten bars 89 (Fig. 13) attached to a plate 681 having a knob 682 is inserted in the decoding unit used for the multiplier, the bars cooperating with notches 218 or 219 in pins 215 to lock said pins in either the selected (elevated) or unselected position. The bars 89 fit into square holes 221 (Fig. 14) in latch plates 220. The plates 220 are carried in a frame 683 which surrounds the plates and is guided for lateral movement by two pins 684 and 685. A spring 686 is mounted on pin 684 which tends to hold all latch plates toward the rear of the machine (right in Fig. 14). The pin 685 engages a bail 687 which is controlled by a lever 688 secured to shaft 689. Also secured to shaft 689 is a lever 690 which is engaged by one arm of a control lever 691 pivoted on shaft 692. When the shaft 689 is rocked, the bail 687 moves the frame 683 and the locking plates 220 to the left (Fig. 14), thereby disengaging the rods 89 from the notches 218 or 219. When a multiplier is sensed from a master card, the pins 118, which pass through perforations, elevate retaining pins 147, which, in turn, elevate the pins 215 to a position where the rods 89 will engage the notches 219. After the sensing is completed, the locking slides 220 return to normal, i. e., to the right (Fig. 14) and the pins 215, which have been elevated, are locked up by the engagement of rods 89 with the notches 219, and those pins 215, which have not been raised, are locked down by the engagement of rods 89 with the notches 218. To prevent damage to the pins 215 by data which may occur in similar columns on the detail card, the pins 215 are formed with telescoping ends and a spring 90 is provided to hold the pins in their extended positions. If a pin 215 is locked down, the elevation of the corresponding pin 147 will push the telescoping end up against the action of spring 90. Springs 90, however, are of sufficient strength to cause pin 215 and the telescoping end to act as a unit when the pin is free.

The position of lever 691 is governed by two pins 693 and 694 which are mounted respectively on levers 695 and 696. The combined action of these two levers determines the movement of the latch plates 220 and makes possible the proper set-up and erasing actions as will be shown later when the operation is described.

In order to distinguish master cards 115 (Fig. 43) from ordinary data cards 116, a special control hole 114 is punched in the upper or zero row. This control hole may be in any convenient predetermined column as long as the machine is set to sense in that position.

The interponent pins 147 (Fig. 4) which are in the zero or top row are similar in construction to the other interponent pins but the latch plate 149 which is used to lock the digit pins in position has no cam face 151 in the zero position. Hence when a control hole 114 is sensed in the zero row, the sensing pin moves the interponent pin upward as the sensing basket is raised and lowers it when the basket is lowered. The control interponent pin, therefore, is elevated only long enough to trip lever 697 (Fig. 4) which is adjustably secured to square shaft 698. At the extreme end of shaft 698 and beyond the edge of the sensing pins, another lever 699 (Figs. 14 and 15) is secured to square shaft 698. A vertical link 700 is attached to the end of lever 699 and communicates its motion to another small lever 701 secured to shaft 696A on which lever 696 is secured. From the above it will be seen that each time the unlatched interponent pin is raised in the predetermined position, the lever 696 will be rotated counter-clockwise as viewed from the right-hand side of the machine (Fig. 14).

The lower end of lever 696 is provided with a hook portion 702 which is adapted to engage the lower bent over portion 703 of key lever 695. Key lever 695 is formed with a projection 704 designed for manual operation. It is not necessary to manually reset the key lever during normal operation but there may be times when the controls should be normalized by hand without waiting for the automatic resetting operation, hence the key projection is supplied.

Key lever 695 is secured to a shaft 705 which is journaled in suitable members secured to the frame of the machine. At the right-hand end of shaft 705, a finger 706 is securely mounted. This finger is provided with a flat surface facing downwardly which is adapted to be engaged by an interponent pin 707 (see Figs. 13, 15, and 16). The interponent pin is spring mounted in a rockable frame 708 so that the pin may be aligned for engagement with finger 706 or rocked free. The position of frame 708 is determined by a sensing interponent 709 which is replaced directly above a no-card pin 710 which is generally used in all tabulators and punched card computing machines to sense the absence of a card in the sensing chamber. This no-card pin 710 is the exact equivalent of a similar pin described in Patent No. 2,044,119, issued to W. W. Lasker, June 16, 1936, and is elevated only when all the cards have been fed from the stack through the sensing chamber into the punching die. When the pin 710 is elevated it strikes the interponent 709 and moves upward, engaging a portion of the frame 708 and turning it on its pivoted support. This action rocks the pin 707 and brings it in alignment with the face of lug 706.

Directly under the aligned pin 707 is a rod 711 (Fig. 8) which is rigidly attached to the frame of the sensing assembly. Because of this mounting the rod moves vertically each time the shaft 127 revolves. When the pin 707 is in its normal or unaligned position, the rod 711 will pass by its

Terminal Board

Directly behind the dial switches, a terminal board 187 is mounted (see Figs. 4 and 19). All outgoing wires from the switch assembly are terminated here on one of the small conducting posts 92 provided for that purpose. There is a total of 114 wires leaving the terminal board which connect with decoding contacts, disabling switches or relays as will be explained more in detail hereinafter. Two brackets 93 are used to mount the terminal board to the side frame pieces 270 of the dial switch.

Partial products

In applying the present method of multiplication, the partial products are first produced, properly placed, and then added to form the final product. Each sub-product is the result of multiplying all digits of the multiplicand by a single digit of the multiplier, and is produced by accumulating the digits of a plurality of partial-products in proper registers. The partial-products are, of course, the product of any two of the nine digits of the Arabic system. These partial-products are contained in the machine as conducting segments or commutators and are selected in accordance with the value of the digits of the multiplicand and of a single digit of the multiplier. The partial-products are registered on accumulator wheels selected in accordance with the denominational order of the digital multiplier and with the denominational orders of the multiplicand digits entered into the particular sub-product.

Some of the partial-products have two digits therein and must be registered in two accumulator wheels. In order to assure that this be done, switching means are provided which cause the lower order digit of a partial-product to be registered in an accumulator wheel selected in accordance with the denominational order of the digital multiplier and the higher order digit to be registered in the accumulator wheel of next higher order.

Thus, a product of a three digit multiplicand (not the same digit repeated) and a single digit multiplier would be produced by selecting a group of commutators corresponding to the value of the digital multiplier, connecting those commutators of the group which correspond to the values of the digits of the multiplicand to accumulator wheels in accordance with the denominational order of the digital multiplier and the denominational orders of the digits of the multiplicand (in this case connecting one of the three commutators to the units order accumulator wheel, one to the tens and one to the hundreds), driving the connected accumulator wheels the extent recorded on the lower order digit portions of the connected commutators, switching the connection to connect each commutator to an accumulator wheel of next higher order than that to which it was previously connected and then driving the connected accumulator wheel the extent recorded on the higher order digit portion of the connected commutator.

It will be seen that multiplication by a second multiplier digit requires simply maintenance of the connections to the same registers as at the completion of the first sub-product, during which maintenance the lower order digits of the partial-product of the second sub-product are registered, and then switching of the connections again and registering of the higher order digits of the partial-products.

Another series of switches 713 is shown in Fig. 25. These switches are in parallel with the decoding contacts and are connected directly to the conductors attached to stack 488—A. Closure of any one of these switches is the same as sensing the corresponding code in a sensed card. All nine switches may be used, in the solution of various complex problems but generally only the units switch is used and it is furnished with flexible leads and detachable lugs so that it may be connected to any one of the decoding stacks.

The result of the closure of any one of these switches is the inclusion of a constant factor which can be adjusted only by the operator. These parallel switches are used for special computations of the form $(A \times B)+(C \times D)=E$ and the solution of a problem employing this circuit will be described in detail hereinafter.

Exact details of the electrical connections will be discussed when an illustrative example is considered; description of the mechanical devices involved follows:

Commutators and driving means therefor

The partial-product devices are in the form of electrical commutators, the positions of the conducting segments thereon, with respect to fixed brushes, determining the length of time during which an associated accumulator wheel shall be driven by a synchronized drive shaft. There are eighty-one of these commutators, each of which represents the product of a digit by one of the nine digits, the entire eighty-one thus representing the complete multiplication table. These commutators are arranged in nine groups each containing nine commutator segments, all commutators being mounted on a common shaft 230 (see Figs. 2 and 3).

The structural details of the commutators and their mounting has been described in the above mentioned Patent No. 2,214,029 and also in a patent issued March 27, 1934, to Johnson, No. 1,952,868.

Fig. 17 shows the various commutators used in the invention, in elevation; the elevations are alternately right and left-hand ones, thereby showing both faces of each commutator so that the shape of the various conducting segments and their relation to each other may be clear. The direction of the rotation of the various commutators is indicated thereon and each face comprising a full commutator has been bracketed and designated $1a$, $1b$, and $1c$; $2a$, $2b$, and $2c$, etc. The $1a$, $1b$, and $1c$ commutators have numbers thereon, in parentheses, which correspond to the digits, the multiplication of which will give the partial product controlled by that particular commutator. Only the first three groups have been so designated as the remainder are the same with the exception that the "two" group is designated $2x1$, $2x2$, and $2x3$ and the "three" group is designated $3x1$, $3x2$, etc.

Current is supplied to each commutator group through a brush bearing on the central portion of the conducting member of the first commutator of the group and is transmitted through the rivets and sleeves to all commutators of the group. Additional brushes cooperate with all the radial projections, such as 237, to extend the circuit over conductors (then closed at other points) to the various accumulator driving means.

Each commutator represents both digits of a product, either half representing one of the digits. Since the decimal system is used, each commutator lug is restricted to one-tenth of 180° and, since there is a means for switching connections from one accumulator to another, as the lower and then the higher denominational order of the product is read, time must be provided for this operation. Thus, each commutator lug is restricted to one-twelfth of 180°. Actually, in order that no undesirable circuits be set up due to brushes lying on two segments at the same time, these lugs or sectors are made 12° each, thus providing 3° between sectors.

The commutators control the operation of certain clutches and thus determine when the accumulators shall be engaged with their driving means. An additional control commutator, not yet described, serves to disengage all clutches at once.

The commutator shaft 230 is supported in bearings in brackets 229 (Fig. 9) secured to side frames 101 and 102. Extending between brackets 229 is a bar 261 which acts as a base for a set of angle irons which hold a bar 253 (Fig. 5) positioned parallel to shaft 230. The commutator brushes are mounted in groups and each group is fastened to the bar 253 in such manner that some brushes of each group lie against one side of the commutator disk and others lie against the opposite side.

On the right-hand end of shaft 230 is a clutch 240 similar to clutch 135 already described. The clutch is driven by a pulley 241, on shaft 230, which is connected by a belt 242 to a pulley 243 secured to a stub shaft 244.

On the left-hand end of shaft 230 (Fig. 5) is a detent disk 239 which operates with a spring urged detent arm 249 to prevent reverse rotation of shaft 230 and associated parts.

The stub shaft 244 (Fig. 2) is carried in a bracket 245 pivotally mounted on a stub shaft 246 journalled in frame 101. The bracket 245 is provided with an arcuate slot through which a bolt, secured in the casting 101, extends and by means of which the tension on belt 242 may be regulated.

Fixed to the shaft 244 is a gear 247 (Fig. 9) which meshes with a gear 248 fixed on the stub shaft 246. Also on shaft 246 is a worm wheel 251 which meshes with and is driven by a worm 252 (Fig. 2) on the main shaft 109. It will be obvious that the rotation of the main shaft is transmitted to the driving element of the clutch 240 by means of this train of gearing.

*Connections between the commutator shaft and accumulator driving gears*

It is necessary that the commutator shaft and the various accumulator driving gears rotate fixed amounts in respect to each other in order that the various clutches connect and disconnect the accumulator wheels with the proper interval between operations.

In order to insure proper synchronization, the accumulator drive shaft 250 is connected by a gear train to the commutator shaft 230. Mounted in an upward extension of brackets 229 and 238 is an idler shaft 254 (Fig. 5A). Secured to this shaft is a gear 255. Fastened to the shaft 254 at its left-hand end (right as viewed in Fig. 9) is another gear 256 which meshes with a gear 257 fixed on commutator shaft 230.

The upper framework is formed of two side frames 264 and 265 (see Figs. 2, 3, 5, 5A, 7, 10, and 11) between which are mounted the accumulator shaft 260, the total sectors 267, and associated racks 268 and the magnets for operatively clutching selected accumulator wheels to the drive shaft 250. The side frames are secured together by a plurality of cross rods and bars to form a rigid structure.

Rotatably mounted between the side frames near the rear of the machine is a detent bail shaft 280 (Figs. 5A and 9) carrying two gears 281 and 283 on its right-hand end. Gear 281 is meshed with a gear 284 on shaft 250 while gear 283 meshes with gear 255 on a stub shaft 254 (Fig. 11) which also carries a gear 256. The squared shaft 250 carries all the clutch elements, detent wheels, and accumulator driving gears and is shown in detail in Fig. 18. Shaft 250 is driven by shaft 280 through the above mentioned gears 281 and 284 fixed respectively to the right-hand end of the two shafts. Gear 284 is angularly adjustable with respect to shaft 250.

The shaft 250 is squared at its mid-portion and has mounted on it a plurality of clutch members 285 (Figs. 10, 11, 18, and 21) having sleevelike hubs 286. The clutch members are formed as shown (Figs. 18 and 21) having ratchet teeth cut in the faces thereof. Mounted on the hub of each of the clutch members 285 is a detent wheel 287 which also has a sleevelike hub 288 which slides over and coincides with the hub 286. Mounted on the hub 288 of each detent wheel is an accumulator driving gear 289 which is secured to the detent wheel 287 for rotation therewith. Likewise, mounted on the hub 288 of each wheel 287 is a clutch member 290, the periphery of which contains a groove 291 to receive a forked operating member 292. The clutch member 290 is slidable longitudinally of the hub 288 of the detent wheel 287, but is caused to rotate therewith due to cooperation of lugs projecting internally from the clutch member 290 and cooperating with slots 294 in the sleevelike hub.

Each forked operating member 292 is pivoted at a point 295 on an L-shaped bracket 296 which is secured to and extends downwardly and forwardly from a bar 297 secured between the frame members 264 and 265 of the carriage.

Each bracket 296 also supports a clutch operating magnet 298 and a latching armature 299, which is rockably mounted on a pin 271. Two springs are anchored to frame 296, one 272 is attached to the upper end of the forked levers 292 to urge them into an operating or clutch engaging position. The second spring 273 is attached to the end of the armature structure 299 and tends to rotate the armature in a clockwise direction as viewed in Fig. 18.

When current is applied to the coil 298 the armature is pulled down and a projection plate 374 attached to the armature is lowered, thereby releasing a projection 116 on the forked lever, and permitting it to rotate about its pivot 295 under the force of spring 272, thereby engaging the clutch members 290 and 285.

There are two rows of clutch magnets 298 (Figs. 5 and 21), one row being mounted on bar 279 and the other on bar 297. This is done to permit the magnets to be mounted in staggered relation so that their armatures and associated fork levers 292 may be in line with clutch members 290.

The current impulses which cause the clutch magnets to operate are timed by the commutator segments 232 and occur at different intervals during the multiplying cycle depending on the values to be transferred to the accumulators. At the end of the accumulating operation all the clutches are disengaged at once by a series of mechanically operated arms 470 (Figs. 5, 5A, and 18) which are attached to a bar 471 by clamping screws 472. The bar 471 extends the entire width of the machine and is mounted at each extremity by means of two short rocker links 473 and 474 which permit its transverse movement. The links 473 and 474 are mounted on one of the tie rods of the machine. At one side of link 473, a lever 475 is rockably mounted (see Fig. 21) which, in turn, is pivotally connected to a cam follower 476 which is rotatably mounted to the side frame 264 by a pivot 477. At the lower end of the follower 476 a roller 478 is mounted which bears on the edge of cam 479. This cam is secured to shaft 280 and is so positioned as to elevate the roller 478 once during each accumulator cycle, which action lowers link 475, rotates the rocker link 473 and transversely moves the bar 471 just enough to disengage all the clutches and latch the clutch levers 292 in their normal or disconnected position. Previous to this mechanical disengagement the current in all the clutch magnets is broken by circuit devices which will hereinafter be described, and the armatures 299 will be released and free to be drawn upwardly by the springs 273. The nose of plate 374 will again lodge behind the face of projection 116.

It is important that all the clutch levers be disengaged at the same time and at just the right interval in the accumulating cycle hence an adjustment is provided for in the form of slotted eccentric studs 480. The upper eccentric part of the studs fits into a slot in the arms 470 and after the machine is assembled, adjustment may be made with a screw-driver.

Due to the fact that all wheels might not stop at the same point when the clutches were disengaged, means for assuring proper operation are provided.

Cooperating with each detent wheel 287 (Figs. 5 and 21) is a detent roller 300, which is mounted on one arm of a three-armed lever 301 pivoted on a rod 302 extending across the carriage. It is understood that each accumulator drive gear 289 has its individual detent wheel 287. Roller 300 is held against its cooperating detent wheel by virtue of a spring 303 stretched between the lower arm of the lever 301 and the carriage frame (see Fig. 5). The tension of spring 303 is sufficient to hold the wheel and attached parts in position, but is not sufficient to prevent rotation of the wheel.

Rotatably mounted on rod 302 (Figs. 5 and 18) adjacent each lever 301 is a bell-crank 304. The horizontal arm of the bell-crank overlies a stud 305 in the horizontal arm of the lever 301 and a stud in the vertical arm of bell-crank 304 is connected to the stud 305 by a spring 306.

When the commutator shaft 230 (Fig. 5) and the associated detent bail shaft 280 are in their normal position, the detent bail 307 which is carried in arms 308 fixed to shaft 280, lies just above the face 309 of the vertical arm of bell-crank 304. Whenever, in a commutator shaft cycle, the bail 307 makes contact with the face 309 it, through the bell-crank 304, strong spring 303, three-armed lever 301 and detent roller 300, forces the wheel 287 rapidly to a position such that the roller 300 lies in the bottom of the notch, this rapid movement serving to disengage the clutch slightly ahead of the normal movement of disengagement. The resilient spring connection 306 between the lever 301 and the bell-crank 304 prevents breakage of the parts.

It will be seen from the above that whenever the clutch 240 on the commutator shaft 230 is tripped and that shaft is permitted to rotate, the accumulator driving gear shaft 250 and the detent bail shaft 280 are also rotated. However, the gear ratios are such that the shafts are rotated different amounts, in order that the half commutator representing one of the digits of a product may be effective to cause accumulation of its digits and that there may be time for the necessary switching before the other half commutator is effective.

Any method of gearing may be used between shaft 230 and shaft 250 as long as a ratio is effected so that each complete rotation of shaft 230 causes two and two-tenths revolutions of shaft 250 and two revolutions of bail shaft 280.

Now, as was stated above, each half commutator is in effect divided into twelve equal parts, one of these parts being provided with a lug to represent a digit, the number of spaces or parts of the lug displaced counter-clockwise from the vertical diameter, when the shaft is at rest, being theoretically equal to the tens complement of the digit represented. There is, of course, no need for a lug to represent zero, for this simply means no movement of an accumulator—nor is there any need to represent ten or any multiple thereof for the digits are represented, separately as 0 and 1 or 2, etc., as the case may be.

Theoretically, then, a half commutator representing 9 would be provided with a lug one space from the vertical diameter, or one space from the brushes when in normal position; one representing 8, with a lug 2 spaces removed, etc. Actually this is modified; the 9 lugs lying just off the line, the 8 lug one space removed and so on down to the 1 lug which is eight spaces from the brush line.

The modified orientation is made necessary by the construction and arrangement of the parts, particularly the accumulator clutches and accumulator detent wheels.

The accumulator clutch members 285 and 290 (Figs. 18 and 21) each have ten teeth. However, when the accumulator drive shaft 250 is at rest and the detent rollers 300 are at the bottom of a tooth space of the detent wheels 287, the clutch tooth points are directly opposite each other, wherefore the accumulator drive gears 289 are not driven until the shaft 250 has gone through one tenth of a revolution.

The clutch magnets are supplied with current for a moment only because the only action necessary is to unlatch the clutch lever 292. Because of the mechanical construction the levers will remain unlatched until mechanically restored at the end of the cycle. In order to remove the flash of the broken current from the commutator segments, a series breaker wheel 616 (Figs. 17 and 27) is placed in the common lead of the battery supply to the clutch magnets and the brush adjusted so that the current is broken at the series breaker a moment before the current is broken at the commutator. At this time, the shaft 230 will have rotated through slightly less than one-twelfth of a complete turn, shaft 250 will have rotated through slightly less than one-tenth of a complete turn.

During the registration of a "9" digit, the clutch magnet is operated at the start of the cycle and the clutches are mechanically disconnected after 132° of a revolution.

The remaining part of the half revolution of the commutator shaft is utilized for shifting connections from certain of the clutch magnets to the magnets associated with the next higher order accumulator wheel.

Switching mechanism

The actual switching of connections is under control of a stepping switch of a type well known in the telephone art. The particular switch used has twelve contact banks, each of which has fifty-one contact points. The stepping switch 310 is mounted under the rear of the machine (Fig. 9) in a manner to make the contacts readily accessible so that such adjustments as are necessary may be easily made.

In Figs. 26 and 27 of the wiring diagram, the sequence switch is shown as a half circle. The circuits for operating the magnet 320 are completed through control commutators in a manner which will be brought out in the description of the circuits used in a typical problem. The switches in the wiring diagram are shown with only twenty-six contacts 313 instead of fifty-two. This is done to simplify the diagram as the wipers 317 only pass over half the contacts of the switch during one complete cycle of the machine. The fifty-second contact is omitted to prevent both sets of wipers from wiping a contact at the same time.

Relays and mounting thereof

Interposed in the circuits between the decoding units and the commutators is a group of relays. These relays are of common telephone type and operate under control of the section of the decoding unit selected to sense the multiplier.

Figure 3:
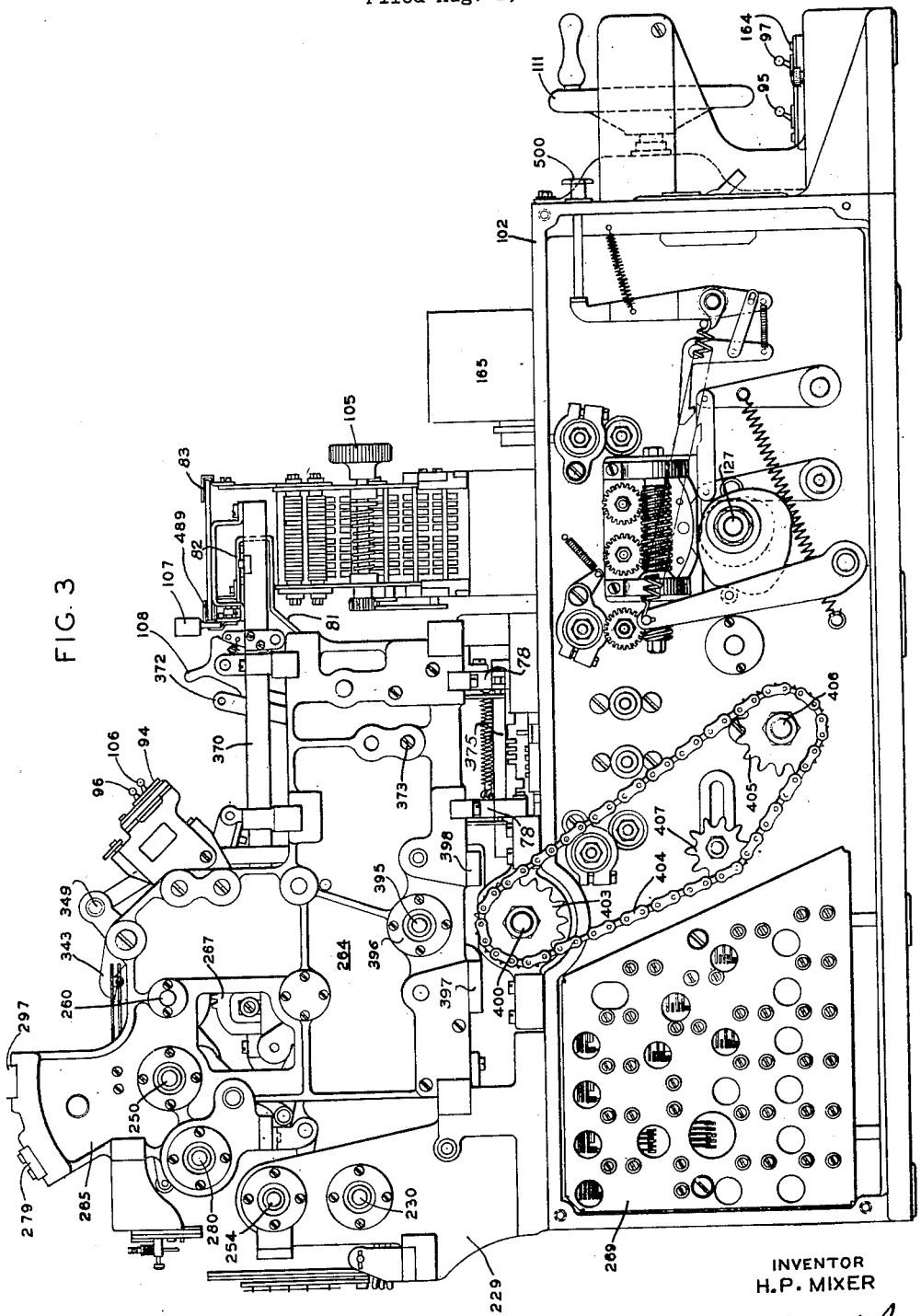
Fig. 3 is a side view of the machine taken from the left showing additional drive mechanisms as well as the relay mounting panel and the general assembly comprising the totaling and recording mechanisms.

As may be seen by reference to Fig. 3, the relays just mentioned are mounted on the inside of a plate 269, which plate is fastened to the casting 102 near the rear thereof. The plate 269 is formed with apertures adjacent each relay so that the relay contacts may be readily adjusted without removing the plate; the contacts are plainly visible in Fig. 3.

These relays are shown in the wiring diagram of Figs. 26 and 27, and their function will be made clear when an illustrative example is considered.

Accumulating mechanism

The type of accumulator used in this machine is commonly known as the crawl carry, as distinguished from the snap carry type of mechanism in which transfer of tens occurs subsequent to the accumulation. In the crawl carry type, the transfer of tens is continuous and is ordinarily caused by some form of step-down gearing. A common example of the crawl carry is that shown in Gardner Patent No. 1,828,180.

In the mechanism of the patent the transfer is effected through the medium of an eccentrically mounted gear and in taking totals from this mechanism it is necessary that the wheel of the lowest denominational order be positioned against its zero stop before the wheel of the next higher denominational order is released.

In the form of crawl carry totalizer shown in this application, the carry is through the medium of a train of planetary spur gears and as a consequence the various accumulator wheels may be positioned at the zero stops at substantially the same time.

A detailed description of the structure and operation of the accumulator will be found in Patent No. 2,214,029.

The engagement of a clutch causes the associated accumulator driving gear 289 to be rotated by the drive shaft 250 which is driven from the commutator shaft 230 as has been described above.

Due to the gear ratio set forth the rotation of an accumulator drive gear 289 causes its associated accumulator gear to be driven one and one-ninth times as far. Thus, if the digit to be registered is assumed to be "9" the accumulator gear 331 will be driven one and one-ninth times nine-tenths, or a complete turn; if "8" then one and one-ninth times eight-tenths, or eight-ninths of a complete turn; and if "1," then one and one-ninth times one-tenth or one-ninth of a complete turn.

From the above, it will be seen that an accumulator wheel during accumulating operations rotates as many tenths of a turn in an additive direction as the digit registered represents.

In addition to movement imparted to it from the associated accumulator gear 331, each accumulator wheel 332 (except that of the lowest denominational order) has imparted to it movement due to the rotation of the sun-gear 334 attached to the accumulator wheel of the next lower denominational order. For example, if the wheel of the lowest or units order were rotated nine-tenths of a turn to register a nine and no digits were inserted in the higher order wheels, then the wheel of the tens order would rotate nine one-hundredths of a turn, that of the thousands order nine one-thousandths, that of the ten-thousands order nine ten-thousandths, etc. The movement of any wheel is, then the sum of the movements imparted to it from its associated accumulator gear and the correct decimals of the movements imparted to all lower order wheels, these decimals being in each case the movement of any wheel divided by ten to that power which represents the degree of removal of the lower order wheel from the higher order, the movement of which is sought.

The stops 333, being integral with the accumulator wheels, move therewith; these stops occupy one-tenth of the periphery of the wheels and, as will be shown later, cooperate with stop arms to govern the positioning of recording members and to release total latches.

Accumulator zeroizing mechanism

The present machine utilizes a method of total taking which comprises rotating the accumulator wheels in a reverse direction until the stops 333 (Figs. 5, 10, and 11) thereon strike stop arms 343 located at definite points or until they reach the "zero position." As is customary the accumulator gears are meshed with toothed elements, in this case sectors 267, which are under spring tension such that they tend to rotate the accumulator wheels reversely until the stops come against the stop arms.

The mechanism is so constructed that a total arm governs the release of the toothed element associated with the next higher order wheel and release of the total arm associated with that wheel, thus eliminating the independently operated timing mechanism, and speeding up the return of the accumulator wheels to their zero position. Since, in the present device, the creep or crawl is effected through the medium of planetary spur gearing, the position of an accumulator gear is adjusted in accordance with the position of the wheels of lower order after those wheels have reached their true zero position and thus it is not necessary to provide time for each wheel to reach its zero position before releasing the wheel of next higher order. In most instances, the wheels will be released in immediate progression, delay being involved only when a wheel is in the "9" or high order positions. It will be obvious that if all wheels had had nines registered thereon, the higher order wheels would, due to the creep or crawl, stand very near the zero point, and that, when the stop arm was lowered into the path of the stop, it might, and probably would, stop it at its zero point, rather than at its nine point.

In order to eliminate this possibility of error, each zero stop 333 occupies a peripheral space equal to a unit, so that the stop arm 343 cannot drop and release the toothed element associated with the order until the wheel has rotated one-tenth of a turn.

The mechanism for releasing the accumulator wheels in order and for delaying such releases when desired has been fully described in the above mentioned patent, No. 2,214,029, and need not be discussed here since no new mechanism is involved.

*Total recording mechanism*

As the accumulator wheels are positioned against the zero stops, sectors which have been meshed therewith, are moved, as has been described, to positions which indicate the total to be recorded. Sectors 267 (Figs. 5 and 5A) are rotatably mounted on a shaft 360 which is, in turn, rotatably mounted in two L-shaped arms 361 which are pivoted at the end of the long leg thereof on a shaft 362 extending between the carriage end plates 264 and 265. Each sector has fastened thereto a gear 365 and disc 366. Lying above each gear 365 and in mesh therewith is a rack bar 268 having a shroud plate 368 which rides on the periphery of disc 366 and prevents the rack teeth from meshing too deeply with the gear teeth. All of these racks 268 are held against their corresponding gears through the medium of a bail 369 which is supported in upward extensions 363 of the arms 361. Pivotally connected to each rack bar 268 at the forward end thereof is a detent bar 370 which serves as a detent member and also as a link between the racks and the punch gag setting members.

Near the forward end of each bar 370 (Fig. 5) is a pin 371 against which lies a lug formed on a lever 372. The levers 372 are pivoted on a rod 373 which is supported in the end plates 264 and 265 and a spring 74 is stretched between the lower portion of each lever and the frame. Pivoted to the middle portion of levers 372 is a series of clamps 72 which hold Bowden wires 73. The upper ends of the Bowden wire casings 74 are secured by a series of clamps 75 and the lower ends of the casings are secured by clamps 76 (see Fig. 6) which are attached to a bracket 77. This bracket is part of a traveling carriage assembly which moves transversely the width of the machine sliding on two bars 78. The long loops in the Bowden wires 74 extending almost to the back of the machine make this movement possible. Two rollers 79 (Fig. 5) support the carriage, the major framework of which includes two bars 80 (Fig. 6) which are slotted to provide guides for a series of twenty code bars 375. These code bars are fastened to the movable wires 73 of the Bowden wire assembly, hence their position is controlled by the position of levers 372.

Extending upwardly from the movable carriage is a flat plate 81 which is bolted to another plate 82, bent in a series of curves and shapes to avoid other structures. Plate 82 is terminated by a hand knob 107 which extends above the top plate 83 to permit easy control and manual adjustment. Such adjustment is provided to position the punched data in any part of the punched card. Additional stop means, to be described hereinafter, are provided to position the data in either the upper or lower zone of a 90 column card.

Mounted beneath the code bars and supported in the base of the machine is a punching mechanism 380 which is in most respects identical to that used in the well known Powers key punch.

This punching mechanism (Fig. 6) comprises a gag-box containing 45 columns of gags 381, each column comprising five gag members. These gags are supported in two perforated plates in the usual manner and are pressed downwardly due to springs compressed between the upper plate and shoulders on the pins.

Lying directly beneath the gag box is a punch retaining box which likewise consists of a number of perforated plates in which punches 382 are guided. The punch box contains 45 columns of punches, each column including five punches and an auxiliary punch operating member, which will be described shortly. Lying below the punches is a die plate 383 which is reciprocated by complementary cams 451 and 452 against the punches to perforate holes in desired locations as will later be described.

The gag box, retaining box and punch box are all constructed with 45 columns of holes and 12 holes in each column making a total of 540. These are considerably more than is necessary for the 90-column card punching but they are included in the design in order to permit easy conversion to other types of cards and other codes.

Each code bar 375 has in its four notches 391, of which three are equal and one is double the size of the others. Each code bar also carries a downward projection 392. A group of five gags 381 is arranged beneath the code bar of each column in such a manner that four are evenly spaced and the fifth is one unit removed. One of the code bars is shown in its normal position in Fig. 6. It will be seen by referring to this figure, that if the code bar is moved one unit to the left, representing the number "1," the projection 392 thereon will lie above the uppermost (right-hand as seen in Fig. 6) gag, and at the same time a notch in the code bar will lie above the left-hand gag in the column. If moved two units to the left representing the number "2," the projection will still lie above the right-hand gag but at the same time, the end of a tooth or projection of the bar will be above the left-hand gag. In a similar manner, if the bar is moved three spaces to the left for the number "3," the second gag will be prevented from rising and the left-hand gag being under a notch will be free to rise and, if moved four spaces, both the second and the last gag will be prevented from moving. Lying alongside the left-hand gag is an auxiliary pin or punch 367. This pin is merely guided in the two upper plates of the punch box and does not extend sufficiently far to act as a punch. It is fastened to the left-hand one of the regular punches 382 in such a manner that whenever it is prevented from rising the punch is likewise prevented. Now, it will be seen that punches are held down in accordance with the setting of the code bar; those punches which are so held penetrate the card.

At times, particularly when the hereinafter described "significant figure" device is used, it is desirable to prevent certain of the racks 370 from departing from the zero setting position. For this purpose latch members 384 (Fig. 5) are provided, these latches being manually operable. By moving the handle 108 of a delected latch toward the front of the machine, the latch is rotated about a pivot rod 385, thus elevating the notched rearward end of the latch until the notch fits over a pin 386 on the upper end of lever 372 and preventing that lever from rocking clockwise (as seen in Fig. 5) as the cooperating detent bar 370 moves rearwardly (to the right in Fig. 5). It will be obvious from the above description, that, as an accumulator gear 331 with its associated wheel 332 moves toward the zero arm 343, a sector 267 in mesh therewith will rotate on the shaft 360 and drive gear 365 associated therewith. As the gear 365 rotates, the rack bar 268, which is in mesh therewith, moves rearwardly and carries the detent bar 370 rearwardly. The bar 372 being held in contact with pin 371 by the spring 71, follows the movement of detent bar 370 causing the lever 372 to rotate clockwise.

The code bars 372 slide in slots cut in frames 78 which are bolted to a set plate.

Movement of the gear 365, rack bar 268 and detent bar 370 pivoted thereto is caused by a strong spring 379 (Fig. 5) which extends from the arm 363 forwardly through holes in the bars 387 and 387A and is connected to a stud projecting from the detent bar 370 (Figs. 5 and 5A). It is to be noted that the bars 387 are slotted, and serve as guides for the bars 370. Mounted on arms pivoted on a rod 388 which is mounted in arms secured to the top of bar 387—A are two boxlike members 389 each of which contain ten spring pressed detent pawls 390. Each of these pawls cooperates with teeth cut in the upper edge of a detent bar 370. The rod 388 and the boxlike members may be oscillated in order to release the rack bars when desired. The mechanism for timing this release is described hereinafter.

When the lever 372 rotates clockwise, as described, it moves one of the code bars a proportionate amount to position it above the gags of a column in such a manner as to prepare the punch to perforate a card with holes in positions representing that digit of the total accumulated in the corresponding accumulator wheel.

The timing of the movement of the code bars and the punch die plate, as well as the meshing of the sectors with the accumulator wheels, the releasing of the sectors, and the operation of the restoring bail is governed by a cam shaft 395 which is driven in synchronism with the card feeding mechanisms and sensing mechanism described hereinabove. This cam shaft is the primary element of the total control mechanism.

*Mechanism for controlling the zeroizing of accumulators and the recording of totals*

The cam shaft 395 is supported in bearing blocks 396 (Figs. 5 and 5A) which are mounted on two bars 397 and 398 which extend transversely of the carriage. The cam shaft has mounted thereon near the center thereof a gear 399 (Fig. 5) which meshes with a gear 401 on shaft 400 which is mounted in bearings in the castings 101 and 102.

Mounted on the left-hand end of shaft 400 is a sprocket wheel 403 (Fig. 3). This sprocket wheel is driven through the medium of a chain 404 from a similar sprocket wheel 405 which is mounted on the shaft 406. This shaft is driven from the main sensing shaft 127 by means of gears 157, 158, and 159 (Fig. 2) as has already been described.

Adjustably positioned in a slot in casting 102 (Fig. 3) is a stud which carries an idler wheel 407 by means of which the chain 404 can be tensioned.

Mounted on the cam shaft 395 (Figs. 5 and 5A) is a plurality of cams which cooperate with cam rollers to control the various mechanisms mentioned above. At each end of the cam shaft 395 is a cam 408 on the surface of which lies a roller 409, supported by a stud extending from a lever 410. Each lever 410 (there being one on each side of the machine) is pivoted on a stud 410A extending from the adjacent side plate of the carriage and extends upwardly and rearwardly to a pivot point on a link 411. Links 411 extend toward the front of the machine and are pivotally connected at their rearward ends to plates 412, which plates are rotatably mounted on the sector shaft 360. Plates 412 are generally triangular in shape and support a bail bar 413 between them at their free ends. It will be seen in Figs. 5 and 5A that when the cams 408 rotate to a position such that the low parts thereof are presented to the rollers 409, the arms 410 move clockwise about their pivot and pull the link 411 rearwardly, thus rotating the plates 412 about the shaft 360 in a clockwise direction thus moving the bar 413 out of the way of the sectors 267 which may then, if not otherwise prevented, rotate in a clockwise direction under urge of the strong springs 379 exerted through the rack bars and gears.

A timing diagram is shown in Fig. 53 of Patent No. 2,214,029 which indicates the relative motion of the register head segment, the rack bail and the segment restoring mechanism in relation to some of the other more important elements.

Sectors 267 are moved into mesh by a cam slot in lever 417 just prior to the start of the total taking operation and are moved out of mesh by the same mechanism after the product has been punched in the card.

Another cam on shaft 395 cooperates with roller 420 to operate lever 421 (Fig. 5A), raise link 422 and lift the boxlike members 389 (Fig. 5). Within these members are resiliently mounted a plurality of pawls 390 which hold the detent bars 370 just prior to and during the punching operation.

Still another cam 428 is secured to shaft 395 and cooperates with a roller 424 mounted on an arm 425 similar to the arm 421. Extending upwardly from the left-hand end of the arm 425 is a link 426 (Fig. 5A) which is fastened to the restoring bail 349 which bail is, as has been stated, supported in arms pivoted on the stop arm shaft 344. When link 426 is moved upwardly the bail 349 is moved out of the path of the horizontal arms 348 of the stop arm holding members 343. Subsequently, the bail is moved downwardly under action of the cam and all of the holding members as well as the stop arms controlled thereby are restored to normal position.

Adjacent the gear 399 at the left-hand side thereof is a cam 430 (Fig. 5) which cooperates with a cam roller 431 mounted on an arm 432 shaped similarly to the arms 421 and 425 and is similarly pivoted. Extending upwardly from the forward end of the arm 432 is a link 433 which is pivoted to a lever 434 which is, in turn, pivoted on the accumulator shaft 260. The lever has a forked portion at its rearward end which cooperates with a stud 435 on the forward extension of one of a pair of arms 436. These arms are fastened to the shaft 302 on which the detent levers 301 are rotatively mounted (see Fig. 18). The arms 436 (Fig. 5) are mounted on opposite ends of the shaft 302. Each arm has a rearward extension 437, and between these extensions a bail 438 is supported. This bail lies immediately in back of the downward extensions of the detent levers 301 so that whenever the arm 436 is rotated in a clockwise direction, spring tension on lever 301 is counteracted removing the detent action of roller 300 and the accumulator wheels are free to rotate.

By referring to Fig. 5, it will be seen that as the cam shaft 395 revolves, the first operation in the sequence or cycle is the ascent of cam roller 416 and the consequent oscillation of the arm 417 about its pivot point, this in turn causing movement of the cam slot in the upper end of that arm and the elevation of the sectors 267 bringing them into mesh with the accumulator gears 331.

At about the same moment, the cam rollers 420, 424 and 431 have presented to them respectively a low portion, a low portion, and a high portion of their respective cams 418, 428, and 430 and consequently the arms 421 and 425 are raised and arm 432 is lowered and serves to release the detent rack 370, the accumulator wheel detents 300 and raise the restoring bail 349.

Shortly after this time the cam rollers 409 have presented to them the low spots of the cams 408 and consequently arms 410 are lowered (Fig. 5) and swing the links 411 and plates 412 about their pivot point on shaft 360 until the bail 413 is below and to the left of shaft 360, thereby removing the bail from the path of the sectors 267 and permitting them to rotate under control of the accumulator wheels.

The cam shaft 395 is driven by the shaft 400, which is in turn driven by the main sensing shaft 127 through gears 133, 157, 158, and 159, as described. Now, as has been explained, the sensing shaft 127 is released to rotate through 90° and then stopped and is subsequently again released to complete a revolution. The cam shaft 395 is thus permitted to perform a complete revolution in two steps during the first of which the releasing actions just described occur. As the revolution of the cam shaft is completed or the second step occurs, the various members are restored to their normal positions, awaiting subsequent accumulating operations.

The release of the main sensing shaft 127 for completion of a revolution may at times be under manual control, but is ordinarily under control of a circuit which is completed through contacts closed by the action of the stop arm of the highest denominational order. The contact arrangement mentioned is shown and described in detail in Patent No. 2,214,029 and need not be described here.

*Punch control mechanism*

As was stated when the card handling mechanism was described, cards ejected from the sensing chamber are urged rearwardly by a pair of rolls 206 and 207 (Fig. 4) and thus fed into the punch chamber. When the card reaches the punch chamber it is urged against one of two card stops depending whether the punching is to be done in the upper or lower zone. The rolls 445 which cause the card movement are driven through the medium of worms 447 and worm wheels 448 (Fig. 2), the worms of which are fastened to the main shaft 109.

The two card stops 444 and 472 are spaced one-half the width of a card apart and are mounted at their lower extremities on pins 471 and 473 which are secured in a short lever 470 and a bell-crank 475. The lever 470 and bell-crank 475 are secured to stud shaft 474 pivotally mounted in the free end of a lever 462. A link 476 is secured to bell-crank 475 and provides a means of rotating the lever and bell-crank to interpose either stop arm in the path of the card as it is positioned for punching. Selection of the proper card stop is performed by the rod 476 which is driven by a lever 84 operated manually from the front panel 87 (see Figs. 15A and B).

The lever 84 may be set in four positions corresponding to "upper normal" "upper verify" "lower normal" "lower verify." A detent wheel segment 85 formed on lever 84 cooperates with a spring-pressed roller 86 and serves to hold the lever in its set position. It should be noted that the card stops 444 and 472 are provided with offsets or steps at their upper ends. If the stops are elevated the full amount, the cards will have the holes punched in the proper place, but, if the stops are elevated so that only the offset portions rise above the punch plate, the card will move further and the holes will be punched slightly off center. This latter condition is termed "verifier punching" and is used to check up on the accuracy of cards which have already been punched once. Verifier practice of this type is disclosed in the patent to L. E. Broughan, 1,984,516, issued December 18, 1934.

As the main shaft 127 rotates, it drives the cam shaft 406 through the medium of gears 157, 158, and 159 already described. As the cam shaft rotates, a pair of complementary cams 451 and 452 thereon oscillate a bifurcated lever 453, which has cam rollers 454 and 455 lying on opposite sides of it and cooperating respectively with cams 451 and 452. The lever 453 is fastened on a shaft 456 which extends from casting 101 to casting 102 and lies slightly above and forward of the shaft 406. Toward each side of the machine an arm 457 is fixed to the shaft 456 and extends rearwardly. Each of these arms is connected by a link 458 with a side member of the punch box. Consequently, as the shaft rotates it elevates and depresses the punch box to cause perforation of the card in a manner already described.

At the time when punching has been completed, a cam 459 rotates to such position that a cam roller 461 on an arm 460 is moved outwardly by the cam and in so moving rocks the shaft 443 on which it is mounted, thus rocking an arm 462 in a clockwise direction and lowering the card stop 444. The card being thus released is driven by the pressure and skid rolls 447 and 446 to a position in which its leading edge lies between a pair of punch eject rolls 463 and 464, which rolls are constantly driven by means of the worm 465 (Fig. 2) and worm wheel 466 and the spur gears 467 and 468, the worm 465 being fixed to the main shaft 109. Thus the cards are transported rearwardly and guided in an obvious manner to the receiving magazine 469 where they remain until removed by the operator. It is to be noted that the timing of the machine is such that one card is being sensed while another is being punched, the release of the main sensing shaft serving to initiate and control both operations. There is thus provided an overlap which cuts down to a considerable degree, the time required for sensing and punching a card.

With the bell-crank 475 in the position shown (Fig. 6), any upward movement of arm 462 by the cam 459 will cause the card stop 444 to be raised due to the pin 473 of the card stop 444 being held from rocking by the lowered end of arm 475. Should the bell-crank 475 be rocked to the right, any operation of arm 462 will raise the card stop 473. The card stop 444 holds the card in the punch chamber to permit punching of a product in the upper level while card stop 472 permits the card to be fed rearward until the lower zone is under the punches.

Circuits

The foregoing portions of the specification described in detail the mechanical elements of the invention. In the instant portion the interconnection of these mechanical elements, through the medium of electrical circuits, is considered.

In describing the circuits, an illustrative example will be assumed and the circuits utilized in working out that problem will illustrate the general operation of all circuits.

Let it be assumed now that the two factors 202, 456 and 709 are to be multiplied together, these factors being punched respectively in the 57th through the 62nd column (lower zone) and the 6th through the 8th columns (upper zone) of a record card (Fig. 20).

To prepare the machine for computing this problem, the left-hand one of the decoding mechanisms will be moved to a position such that its units column, or first row from the right, of decoding rods 215 lies above the 8th column of the reading retaining pins 147.

The normal procedure would then be to move the right-hand one of the decoding mechanisms to a position such that its unit column, or first row from the right, of sensing pins 219 would lie immediately above the 62nd column. However, this is impossible since the decoding mechanism is ten units wide and, therefore, will strike the left-hand mechanism when the units column of the right-hand mechanism lies in the 64th column.

It will be noted that the decoder contact stacks are shown in the wiring diagrams in horizontal arrangement with the "9" set of contacts on the left. This corresponds to the left-hand set of contacts as shown in Fig. 14. The wiring diagrams comprising the left-hand column of Fig. 23 correspond to the left-hand decoder unit, the "485" stacks being used to sense the lower left-hand portions of the card and the "486" stacks used to sense and decode data found in the left-hand portion of the upper zone of the card. In a similar manner the diagrams in the second column of Fig. 23 correspond to the right-hand decoder unit, the "487" stacks being for the lower right-hand card zone and the "488" the upper right-hand zone.

In accordance with the positioning of the units as set forth above, the pins 219 controlling stacks 486—H, I, and J will be positioned over the reading retaining pins for columns 6, 7, and 8, respectively. The stacks 487—E, F, G, H, I, and J, corresponding to the left-hand columns of the right-hand decoder are positioned over columns 57 to 62, respectively. Each of the contact stacks is connected through the zone switches 512 and 513 shown in Figs. 4, 8, and 19, and on the wiring diagrams in Figs. 26, 30, 34, 37, 40, and 42. Also, the common leads from the decoding stacks are connected to two banks of switches 95 and 97 so that any decoding column may be disabled by simply opening its switch. For the problem outlined above, the first three multiplier switches on the left of switch bank 95 (Fig. 26) are closed since there are only three digits in the multiplier. Switching on other adjacent switches will not change the result if there be no data punched in the corresponding card columns.

In the multiplicand section the first six switches of bank 97 counting in sequence from the left-hand end are thrown to the "on" position with the remaining circuits left open.

The final product may be punched anywhere on the card where there is no previously punched data. Let it be assumed that the product is to be located in the 20th through the 28th columns of the record card in the lower zone (Fig. 20). To so position the punches the zone control lever 84 (Figs. 8, 15A, and 15B) is placed in the "lower normal" position and the knob 107 (Figs. 1 and 5) is moved transversely until the scale 489 associated therewith indicates "28," the column in which the units digit will be punched. The machine is now ready to sense the factors from the columns and to punch the product in the columns desired. Cards bearing factors in the above columns are placed in the magazine 165 and a weight placed on top of them. The bottom card of the stack will have punched therein the factors as previously mentioned.

In order to initiate operation of the machine, the starting button 500 (Figs. 2 and 8) is pressed. The switch part of this button is indicated in the wiring in Fig. 27. This completes a circuit from battery through the winding of stepping magnet 320, through the starting button 500, over conductor 502 to the 26th or last contact of bank A of the stepping switch 310, through wiper 317 of that bank to ground by way of conductor 490 and one of the contacts of relay 520.

The completion of this circuit energizes magnet 320 which attracts its armature to cause the ratchet pawl 323 to slide over a tooth of the ratchet wheel 318. When the button 500 is released, this circuit is broken and the magnet armature is restored to its normal position, stepping the ratchet wheel and consequently all the wipers 317 to their second contact points.

Since at this time no card has reached the sensing chamber, the sensing mechanism has not been operated, and consequently none of the sensing rods 219 have been raised. Therefore, the circuits to the stepping switch contacts will remain open and the ground which is normally supplied to the stepping switch magnet will remain connected thereto and the magnet will continue to step the wipers ahead due to a common form of stepping or vibrating circuit which is as follows:

From battery (Fig. 27) through the winding of stepping magnet 320, thence over the contacts 330 associated with the stepping magnet, second contact point of bank 310A, strap 498, wiper 317A, conductor 490, contacts associated with the series relay 520 to ground.

It will be seen that each time the magnet operates it will break this circuit at its own contacts 330, thus stepping the wiper ahead whereupon the circuit will immediately be again completed through the next stopping switch contact, attracting the armature and breaking the circuit. This continues until the wipers 317 have reached their 24th contacts. At this time, due to the fact that the contacts in bank 310A beyond the 23rd contact, are not included in the strapping, the stepping switch will stop and a circuit will be completed to energize the tripping magnet 141 of the sensing shaft clutch (Figs. 2 and 31). This circuit may be traced as follows:

From battery over conductor 514 (Fig. 31) through the winding of tripping magnet 141, thence over conductor 515 to brush 516, which cooperates with a commutator 517 mounted on the shaft 406 (see Fig. 2) which shaft rotates in synchronism with the main sensing shaft 127, thence through the conducting portion of that commutator to a second brush 518 cooperating therewith and over conductor 519 (Figs. 31 and 27) to the 24th contact of switch bank 310A, thence through the wiper 317A of that bank, strap 498, conductor 499 to ground through the contacts of relay 520, thereby causing the energization of the tripping magnet 141, thereby withdrawing the tripping lever 140 and releasing the main sensing shaft 127 as well as of the commutator shaft 406. After the shaft 406 has traveled a short distance, an insulating portion of the commutator 517 comes between the brushes 516 and 518 and causes deenergization of magnet 141. The sensing shaft 127 and the mechanism driven thereby moves through 90° of rotation due to the construction of the clutch as previously described.

Just after the breaking of the tripping magnet circuit at commutator 517, a circuit is completed through an additional commutator 524, which is likewise mounted on the shaft 406 (see also Fig. 2). This circuit leads from battery (Fig. 27), through the winding of stepping magnet 320, thence over conductor 522 (Fig. 31) to brush 523 which bears on commutator 524, through the commutator to brush 525 and to ground. As the shaft rotates an impulse will be sent to the stepping magnet 320 of switch 310, the wipers of which will then move from their 24th to their 25th contacts.

The main sensing shaft 127 will come to rest after 90° of rotation, and, as has been previously explained, at this time the picker knife will have moved toward the sensing chamber but will not have moved a card with it. Also at this time, due to rotation of the cam shaft 395 (Fig. 5) the various total and punch control mechanisms will have been released and the totalizer wheels freed for rotation to their zero positions, thus insuring that all accumulator units will be normalized at the beginning of each run of cards.

When the wipers are on their 25th contacts, a circuit will be completed, from battery (Fig. 31) over conductor 514, through magnet 141, thence over conductor 519 and the two brushes 516 and 518, the conducting segment of commutator 517 (which has now moved through 90°), over conductor 519, through contacts 439 and 440, which are closed as described hereinbefore by the last zero stop arm 343 (Fig. 3), conductor 526 to the 25th contact of switch bank 310A, thence over the wiper 317A, strap 498 to ground. Completion of this circuit again energizes tripping magnet 141 and releases the main shaft 127 and associated portions of the mechanism for an additional 270° of rotation. As before, since the conducting portion of the commutator 517 is very short, a short impulse is transmitted to magnet 141. Shortly after this impulse has been transmitted, a circuit is completed through commutator 524 (Fig. 31) over conductor 522, which is identical with that previously described, and which serves to momentarily energize stepping magnet 320 so that the wipers thereof are caused to move to their 26th and last contacts.

During the 270° of rotation of the main sensing shaft 127, the picker knife moves toward the front of the machine. The bottom card of the stack in the magazine falls against the edge of the picker knife which then moves rearward and comes to rest with the card in position to be fed between the feed rolls. Also, during this 270° rotation, the accumulator units and the totaling and recording mechanism are restored to their normal positions. After the described rotation the machine comes to rest with the stepping switch wipers lying on their first and 26th contacts, there being no circuits completed at this time.

The starting button 500 is again operated and the circuit completed through the magnet 320 of the stepping switch and over the conductor 502 to ground (Fig. 27) as previously described.

Again, the stepping switch magnet is energized and the wipers moved to their second contacts, and, as described above, the vibrating circuit takes control and the switch wipers move step-by-step to the 24th contact points where they come to rest. At the time when the switch wiper of the bank 310A reaches its 24th contact, the circuit to the tripping magnet 141 is completed, thus permitting the main sensing shaft 127 to rotate through 90°. Immediately upon the starting of the rotation of the shaft, the circuit to the stepping magnet is broken at commutator 524, causing the wipers to step to their 25th contacts. During this 90° of rotation of the shaft 127, the card, which is under control of the picker knife, is moved rearwardly up to and almost in between the feed rolls 180 and 181. When the wiper 317A of the switch bank 310A reaches its 25th contact point, a circuit which has already been described is completed through the commutator 517 and the tripping magnet 141 to again energize the tripping magnet to again release shaft 127 for 270° of rotation. During the 270° of rotation, the card is fed into the sensing chamber, and against the card stops; the sensing box is raised and those pins 118 (Fig. 4) which find holes in the card pass through it and operate reading retaining pins 147 which lock in their raised positions and elevate corresponding decoder pins 219, which close contacts in the decoding mechanism. Due to the fact that the circuits to the decoding mechanism pass through contacts 2 to 21 of the switch banks of switch 310, these circuits are not closed at this time, for it will be remembered that the wipers all lie on their 25th contacts. As discussed below, almost immediately upon release of the shaft 127 for its 270° rotation, a circuit is completed through commutator 524 (Fig. 31) to momentarily energize the stepping magnet 320 and step the switch to its 26th contact. At this time, the machine again stops and the button 500 is again depressed in order to cause a third cycle of the machine after which cycle continuous machine operation under control of the cards will be initiated.

When the starting button is depressed the circuit previously described is completed to energize the stepping magnet and cause all wipers 317 to move to the second contacts of the corresponding contact banks. It will be remembered that the card has been sensed and the various elevated reading retaining pins locked in position holding the sensing wires 217 elevated and closing contacts in the decoding device.

In the description of the decoding device, it will be remembered that there are ten banks of contact stacks and ten stacks per bank, each of the stacks corresponding to the index points in ten columns of the upper and lower zone of a 90-column card. Each of the units is, therefore, capable of sensing a multiplication factor of ten digits.

If the two units are positioned over a card such as shown in Fig. 20 and the sensing head raised as described above, the following pins 219 will be raised.

In the multiplier or left-hand unit the stack 486—J will have the "9" pin 219 elevated; in stack 486—I no pin will be elevated due to a zero in the multiplier factor. Zeros are not sensed from the card. In the stack 486—H, the "7—8" pin will be raised.

In the multiplicand or right-hand unit, the stack 487—E which is over the units column of the factor in the card will have the "9" and "5—6" pins elevated. The tens digit "5" will cause the elevation of pin "5—6" in bank 487—F. In the 487—G bank the "9" and "3—4" pins are elevated. In the 487—H bank the "9" and "1—2" pins are elevated. In the 487—I bank no pin will be raised due to a zero in the place of the factor, and in bank 487—J the "9" and "1—2" pins are elevated.

With all the wipers 317 at rest on their second contact points as described, the following six circuits will be prepared for completion:

(1) From battery (Fig. 27) to conductor 505 and through the winding of magnet 298R; thence over conductors 527 and 543 to the second contact of contact bank 310F of stepping switch 310; through the wiper 317F, strap 528 to conductor 529 and thence to the 6th from the left or units switch (Fig. 26) of the multiplicand, and group of switches 97 to conductor 540 (through Figs. 30 to 34); thence to the contacts 541 on the zone switch 512—E which are shown open. To handle the problem as outlined above, the multiplicand zone switch should be set on "3" with contacts 541 closed. From contacts 541 the circuit continues over conductor 542 (Fig. 33) to decoding stack 487—E. Since both the "9" and "5—6" pins are elevated, the circuit continues through contacts 544 and 545, thence over conductors 546, 547, and 548 (Fig. 36) to contacts 549 (Fig. 37) on the zone contact switch 512F. As before these contacts will be closed because of the switch setting to solve this problem. From the zone switch the circuit continues over conductor 550 (Figs. 34, 30, and 31) to the brushes of a commutator group which represents the product six by any one of the arabic digits.

Since the commutator shaft 230 is now at rest, this circuit is prepared but not completed and it is set up awaiting rotation of the shaft 230.

(2) From battery through the winding of magnet 298P (Fig. 27) over conductors 503 and 504, to the second contact of the switch bank 310G, through the wiper 317G, strap 506, conductor 507 to the fifth multiplicand switch in the switch bank 97 which must be closed. From the switch the circuit continues over conductor 508 through Figs. 30, 34 and 37, and the contact points 509 of the zone switch 512—F, thence over conductor 510 to decoding contact stack 487—F in Fig. 36. In this stack only the "6—5" pin has been raised to indicate the digit five, hence the circuit continues through contacts 511 which remain closed and contacts 551 which were closed by the pin 219, over conductors 552, 553, and 554 (Fig. 33) to the zone switch contacts 555 (Fig. 34) on zone switch bank 512—E, thence over conductor 556 (Figs. 34, 30, and 31) to the brushes of a commutator group representing the products of five by the nine arabic digits.

(3) From battery to conductor 505 (Fig. 27), thence through the winding of magnet 298—N, over conductors 557 and 558 to the second contact point of bank 310H of stepping switch 310 (Fig. 26), brush 317H, strap 559, conductor 560 to the fourth multiplicand disabling switch 97 as before, thence over conductor 561 through Figs. 26, 30, 34, and 37 to contact 562 on zone switch bank 512—G, thence over conductor 563 to the decoding contact stack 487—G (Fig. 36) where the "9" and "4—3" pins have been raised. The circuit continues through contacts 564 and 565 of stack 487—G and thence over conductors 566, 567, and 568 (Figs. 33 and 34) to contacts 569 on zone switch bank 512—D, thence over conductor 570 (through Fig. 30 to Fig. 31) to the brushes of the group of commutators which represent the products of four and any of the nine digits.

Figure 39:
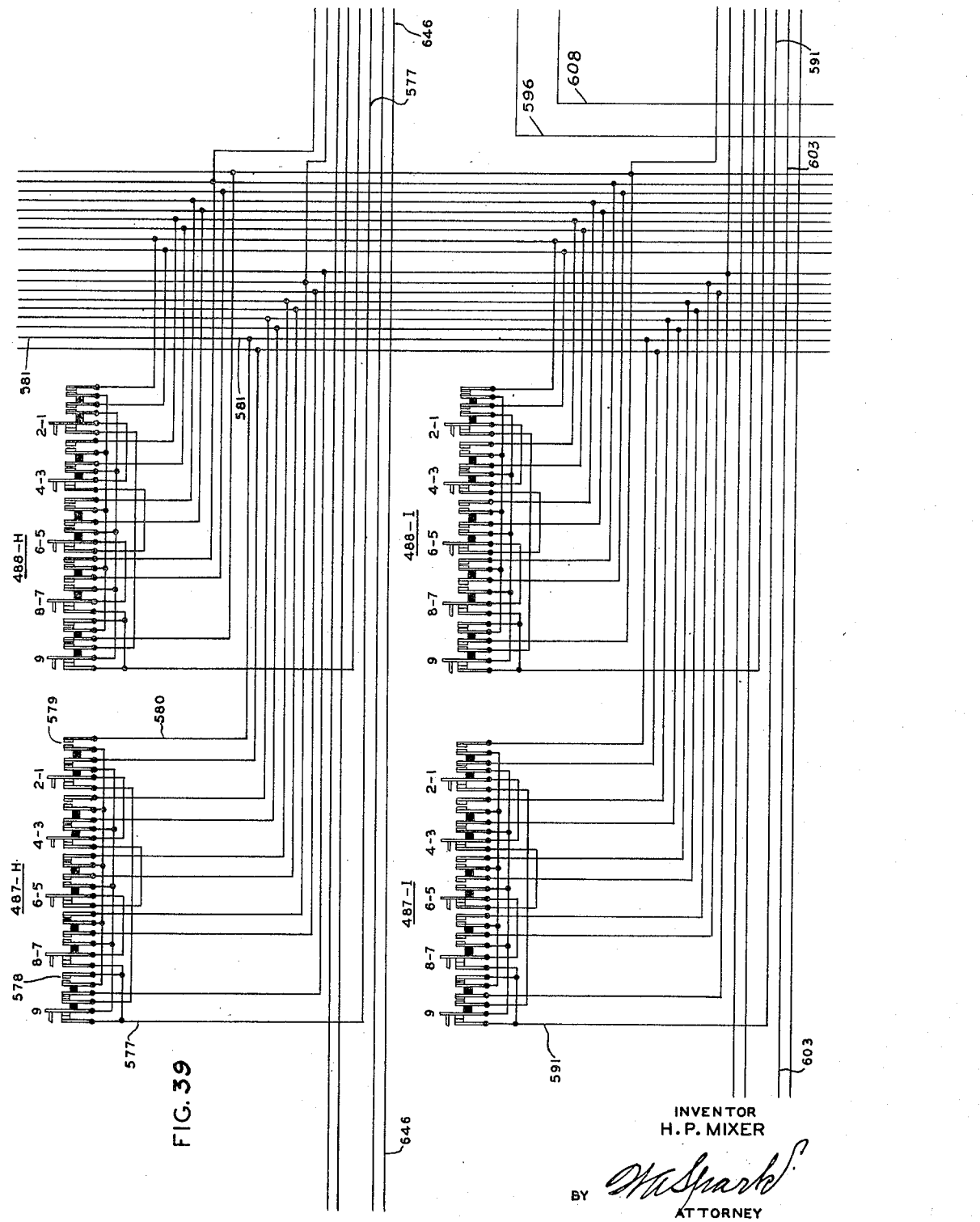
Figure 40:
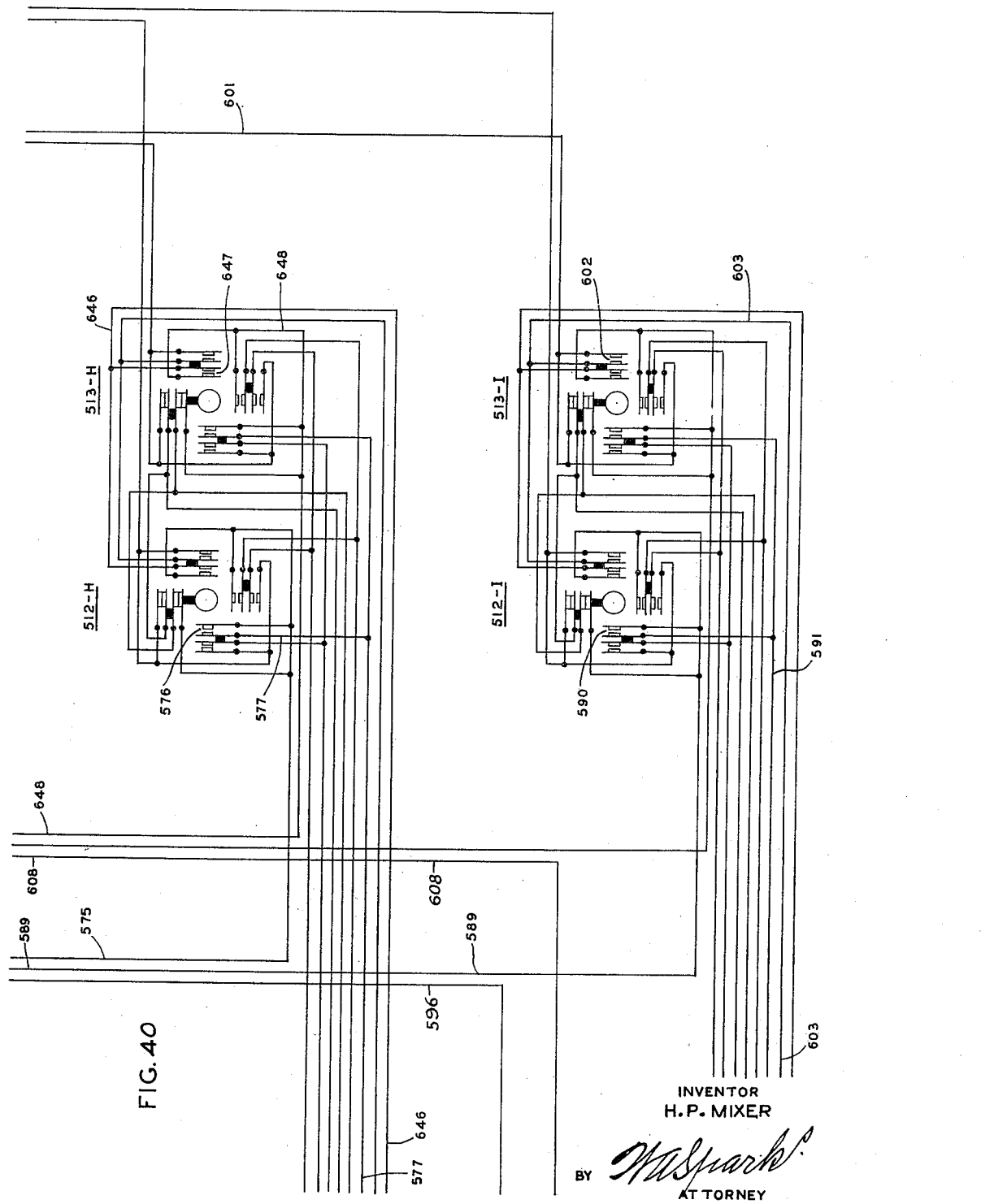
Figure 41:
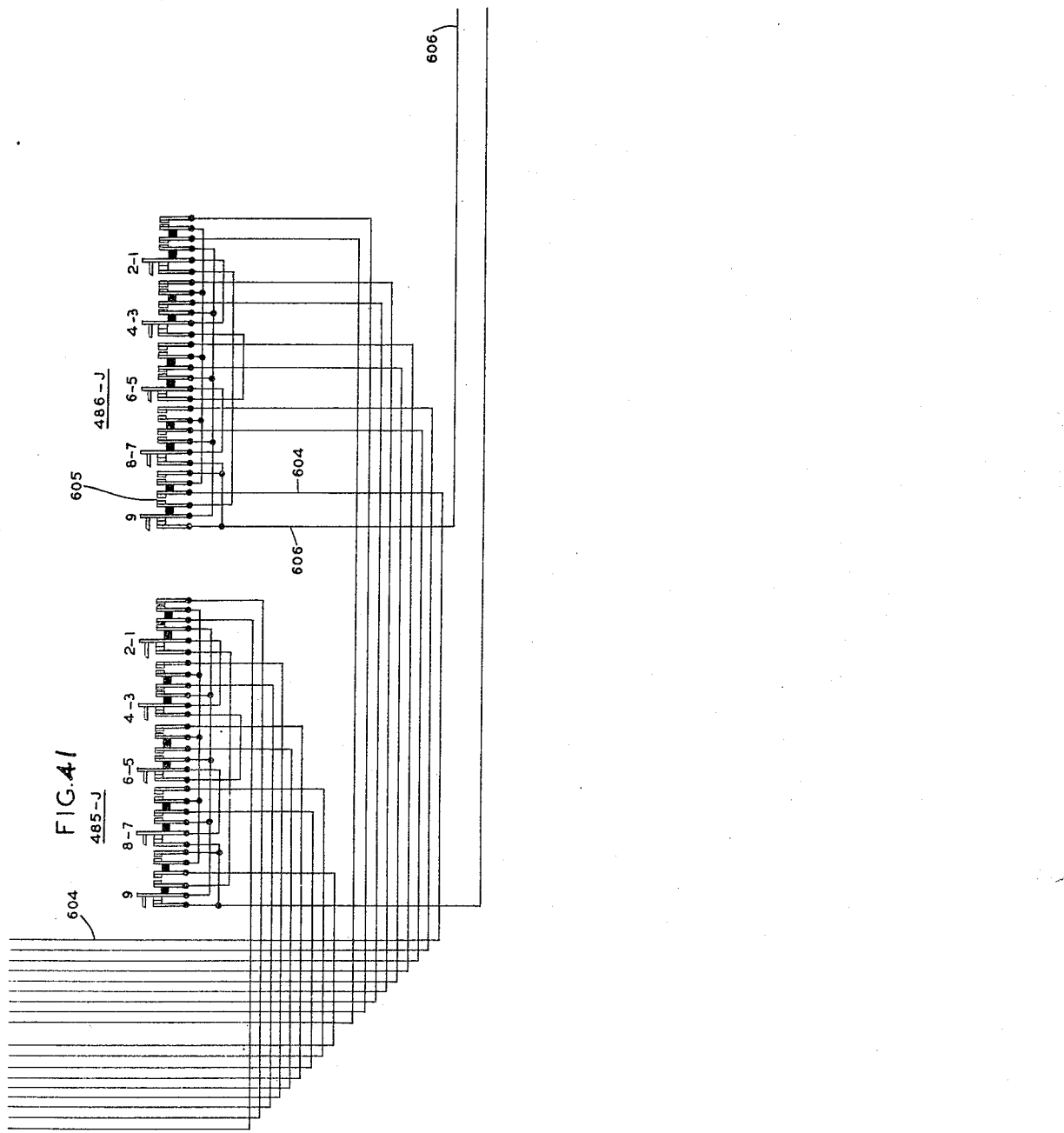
Figure 42:
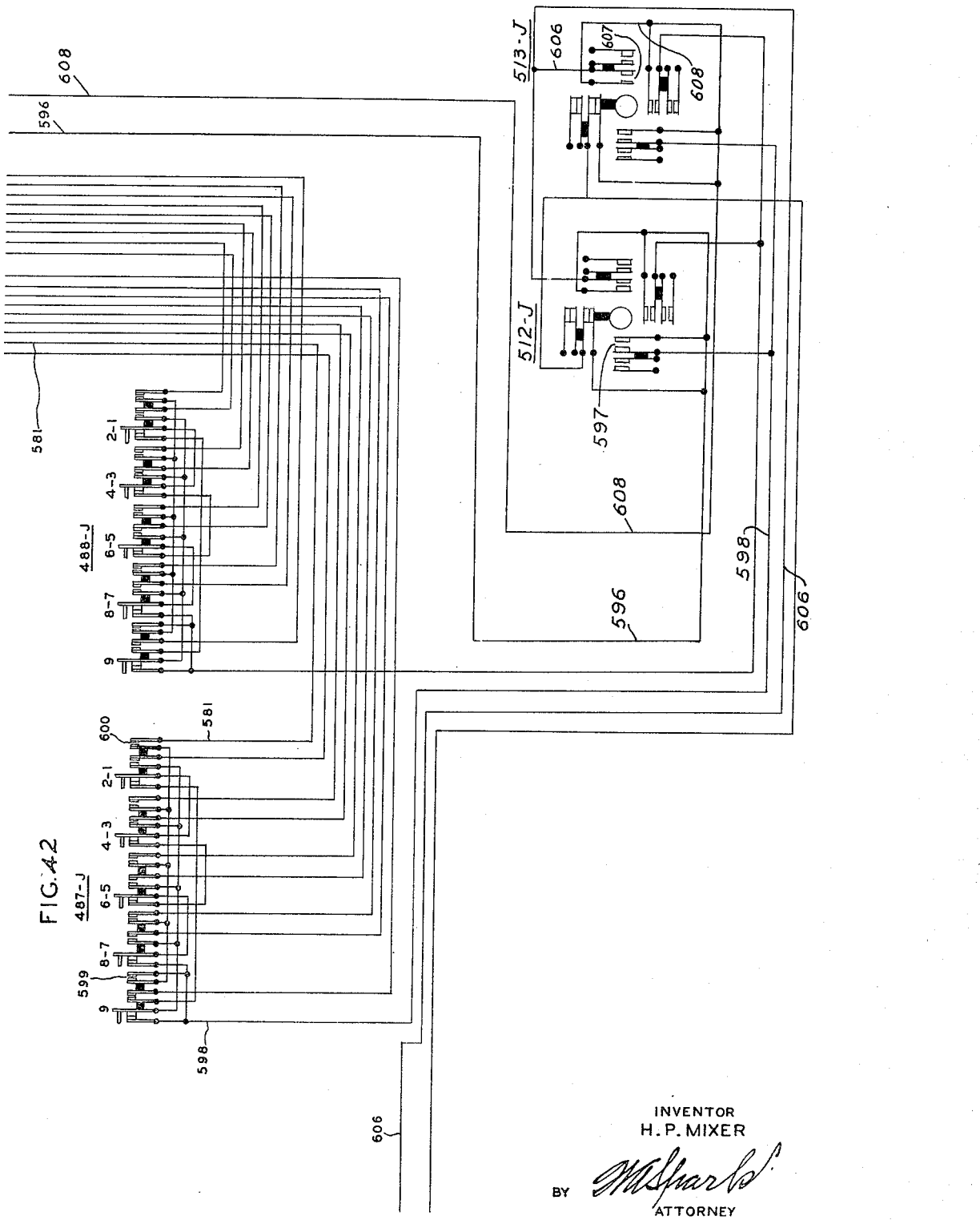

(4) From battery over conductor 505 (Fig. 27), thence through the winding of clutch magnet 298—M and conductors 571 and 572 to the second contact of the bank 310—I of the stepping switch 310 (Fig. 26) and thence through the wiper 317—I, strap 573, conductor 574, to the third switch from the left in the multiplicand switch bank 97, thence over conductor 575 (through Figs. 30, 34, 37, and 40) to contacts 576 on bank 512—H of the zone switch, thence over conductor 577 to decoding stack 487—H (Fig. 39). This stack is positioned over that portion of the card which has a digit two punched therein, therefore, the "9" pin and the "2—1" pin are elevated. The circuit continues through contacts 578 and 579, thence over conductors 580 and 581 (through Figs. 36, 33, and 39), thence by conductor 582 to contacts 583 (Fig. 30) on zone switch bank 512—B and thence over conductor 584 to the brushes (Fig. 31) of the group of commutators which represent the products of two and any one of the nine digits.

(5) From battery over conductor 505 (Fig. 27) through the winding of clutch magnet 298—L, thence over conductors 585 and 586 to the second contact point of bank 310—J of the stepping switch 310 (Fig. 26), wiper 317—J, strap 587, conductor 588 to the second switch in the bank of multiplicand switches 97, thence over conductor 589 (through Figs. 30, 34, 37, and 40) to contacts 590 which are part of bank 512—I of the zone switch, thence over conductor 591 to the decoding contact bank 487—I.

This circuit, however, remains incomplete for in this column the digit represented is zero and in order to represent a zero, no hole is punched in the card. Consequently, none of the decoding pins have been operated and, therefore, a circuit is not completed through the commutators.

(6) From battery over conductor 505 through the winding of clutch magnet 298—K (Fig. 27), thence over conductors 592 and 593 to the second contact point of bank 310—K (Fig. 26), wiper 317—K, strap 594, conductor 595 to the end switch of the multiplicand bank 97, thence over conductor 596 (through Figs. 30, 34, 37, 40, and 42) to contacts 597 on bank 512—J of the zone switch, thence over conductor 598 to decoding stack 487—J (Fig. 42) where a "two" has been sensed from the data card; through contacts 599 and 600, over conductor 581 which is the same conductor as used by the other "two" which came through clutch magnet 289M. The remainder of the circuit is the same as that circuit and leads to the same series of brushes on the commutator which represent the product of two and any one of the nine digits.

At the same time when the six circuits described above are prepared for operation, in the manner described, there is another circuit which is completed, this circuit being under control of the left-hand decoding unit which has been selected to sense the multiplier. This circuit leads from the battery (Fig. 27) through the winding of the relay 520, winding of relay 539, over conductor 601 (Figs. 27, 26, 30, 34, 37, and 40) to the contacts 602 in the bank 513—I (Fig. 40) of the zone switch which in this case will be closed by the proper manual setting of the dial to handle this particular problem. The circuit continues over conductor 603 (to Fig. 38) thence over conductor 604 (to Fig. 41) to decoder stock 486—J where a nine digit has been sensed and the nine pin raised, thence through contacts 605 in the nine set and through the normally closed contacts of the other four sets to conductor 606, thence to Fig. 42 and contact 607 in contact bank 513—J of the zone switch, thence over conductor 608 (through Figs. 40, 37, 34, 30, to 26) to the left-hand disabling switch of the multiplier switch bank 95, thence over conductor 609 to the second contact point of the Multiplier Bridge 310L, wiper 317—L, strap 610, to ground, thereby completing the circuit and causing the relays 520 and 539 to function. The energization of relay 520 closes a circuit from ground through the inner armature contact and over conductor 611 to a brush associated with a control commutator 612 mounted on the shaft 230. As may be seen by reference to Fig. 17, this commutator lies in such position that the conducting sector is presented to the brushes and consequently the current is extended through the other brush to a conductor 613 and thence through the winding of the clutch magnet 263 to battery and ground.

Closure of the middle contact of the relay 520 completes a circuit from ground over conductor 614 through the winding of a control relay 615 to battery. Due to the two last mentioned circuits, tripping magnet 263 and control relay 615 are operated (Fig. 31). Operation of magnet 263 releases the commutator shaft clutch plate 676 for rotation. Relay 615 is held operated over a locking circuit from battery through the winding of the relay, innermost contact conductor 617 to a brush 619 of control commutator 620 mounted on the auxiliary shaft 406; through the conducting portion of the commutator to a brush 621 to ground.

Operation of relay 539 connects ground through a plurality of conductors to brushes cooperating with commutators representing the products of nine by the various digits. The circuit from ground to the contact of relay 539 as shown in Fig. 27 is connected through two brushes 670 and 671 which bear on commutator 616 mounted on shaft 230. This commutator is not essential to the operation of the machine but is included as a circuit breaker. The phase angle of the commutator is adjusted so that the circuit is interrupted just prior to the interruption of contact at the various multiplying commutators. In this manner all the wear due to sparking is concentrated at one point. The circuits completed by operation of relay 539 are as follows:

From ground (Fig. 27) through brushes 670 and 671 and their commutator 616, over conductor 622, thence through the contacts of relay 539 to conductor 623, and thence over the branch conductors 631, 632, 633, 634, 635, 636, 637, 638, and 639 to all commutators representing a product of nine as multiplier and any digit as a multiplicand.

It will be seen that battery has been extended to one set of brushes of groups of commutators having as one factor of the product they represent either two, four, five, or six and that ground has been extended to the other brush of the commutator having as a factor of the product, nine, or, in other words, circuits stand prepared for completion by the commutator segments of those commutators 2c, 4c, 5c, and 6c (see Fig. 17) designed as (2x9), (4x9), (5x9) and (6x9).

The release of the clutch disc 676 operates clutch 240 to cause the commutator shaft 230 to be rotated, and as it rotates, commutator 2C designated (2x9) (Fig. 17) will first present a conducting segment to its brushes. As it does so, the circuits described under (4) and (6) above will both be completed from conductor 584 (Fig. 31) through the commutator 2c over conductor 632 to ground. Therefore, the magnets 298K and 298M will be energized and shortly thereafter will cause the corresponding clutch members 285 and 290 to engage and drive the accumulator wheels of the fourth and sixth denominational orders.

When the magnets 298K and 298M operate, they unlatch their clutch levers 292 which thereafter remain in their unlatched or operating position until restored mechanically. Springs 272 (Fig. 18) hold the levers in place independent of the subsequent magnet action.

The commutator shaft continues to revolve until the commutator 4C designated as (4x9) (Fig. 17) next presents its conducting segment to the brushes. When this occurs the circuit described under (3) above is completed, from conductor 570 through the above commutator over conductor 634 thus causing magnet 289—N to release its clutch arm. The clutch is thereafter held operated as described above.

Next the commutator 5C designated as (5x9) presents its conducting segment to the brushes. When it does so, the circuit described under (2) above is completed from conductor 556 through the commutator over conductor 635, and magnet 298—P is energized and its associated clutch is engaged.

The shaft 230 continues to revolve and the commutator 6C, designated as (6x9), next presents its conducting segment to the brushes, and the circuit described under (1) above is completed from conductor 550 through the commutator to conductor 636, causing energization of magnet 298—R and engagement of its clutch.

No other circuits through the commutator having been prepared for completion, the commutator shaft 230 and the clutch shaft 250 continue to revolve until the gear wheels 289 (Fig. 18) have turned the accumulator wheels 331 an amount corresponding to the last digit of the product of the factors as mentioned above. Then all of the clutches are disengaged at once by a series of mechanical arms 470 (Figs. 18 and 21) set on a transverse bar 471 and operated by a series of links, 473, 475, and 476 which are tripped at the proper interval by cam 479 turning on shaft 280. The timing of this disengagement occurs slightly before the commutators have rotated through ten unit spaces in order to insure that the clutches be freed and placed under control of the detent levers 301 (Fig. 5). While the wheels 331 are rotated amounts corresponding to the numbers as indicated by the commutator segments, the accumulator wheels 332 will have been rotated an amount equivalent to the following numbers:

First order wheel _____ 4.0
Second order wheel _____ 5.4
Third order wheel _____ 6.54
Fourth order wheel _____ 8.654
Fifth order wheel _____ .8654
Sixth order wheel _____ 8.08654
Seventh order wheel _____ .808654
Eighth order wheel _____ .0808654

The whole number in each case is the digit inserted in the particular wheel while the decimal represents the creep from the wheels of lower order.

As the commutator shaft continues to rotate and, in fact, immediately after the breaking of the locking circuit, a circuit is completed through a commutator 618 to operate the stepping magnet 320. This circuit is as follows:

From battery (Fig. 26) through the magnet 320 of stepping switch 310, thence over conductors 522 and 624 (Figs. 27 and 31) through a brush of the commutator 618, thence through the conducting segment of the commutator to brush and over conductor 625 to ground.

At this time, the stepping switch is energized and then, since the commutator conducting segment is very short, deenergized, thus stepping the wipers 317 of all the switch banks to their third contact points.

When the stepping switch operates, the various circuits prepared and described under (1) through (6) above are altered in that each circuit is prepared for completion through the clutch magnet of next higher denominational order. For example, circuit (1) which originally led through the magnet 298R and the bank 310F of the stepping switch now leads through the magnet 298P and the third contact of the bank 310F of the stepping switch, and in like manner all the other circuits are shifted.

As the commutator shaft continues to rotate, the first commutator to present its second conducting segment to the brushes is that designated in Fig. 17 as 6c. When the conducting segment (6x9) of this commutator reaches its brushes, the following circuit will be completed:

From battery (Fig. 27) over conductor 505 to magnet 298P, thence over conductors 503, 504, and 626 to the third contact point of switch bank 310F of the stepping switch, wiper 317F, strap 528, conductor 529, and the associated switch in bank 97, of the multiplicand group (Fig. 26), conductor 540 (Figs. 30 and 34), thence to the zone switch 512—E and thence through stack 487—E of the decoding unit and conductor 546 in a manner already described to the common brushes of the sixth group of commutators and through the conducting segment (6x9) of the commutator designated as 6c to conductors 636 and 623, to the contacts of relay 539, through commutator 616, to ground.

At this time, then, magnet 298P will be energized and will release the clutch lever into its operated position as previously described.

As the commutator shaft continues to rotate, the (5x9) segment of commutator 5c, will present its second conducting segment to its brushes and a circuit will be completed from the magnet 298N through the third contact of bank 310G of the stepping switch, and thence to a conductor 507 and over the circuit described under (2) through the commutator 5c over conductors 635 and 623 to ground as before, causing energization of magnet 298N and release of its clutch lever.

The next commutator which presents a conducting segment to its brushes will be that representing the product of 4x9. When the conducting segment (4x9) of commutator 4c comes between its brushes, a circuit will be completed through the magnet 298M, third contact points of switch bank 310H, and thence to conductor 560 from which it follows the circuit described under (3) through the commutator 4c over conductors 634 and 623 to ground. This causes energization of the magnet 298M and the release of its clutch lever.

Next, two circuits are completed in parallel, due to the presentation of the conducting segment (2x9) of the commutator 2c to its brushes. These two circuits lead from battery to conductor 505 and thence through the windings of magnets 298L and 298J to conductors 585 and 679, respectively, thence over conductors 586 and 627 and thence to the third contact points of the banks 310I and 310K, respectively, thence over the wipers 317 of these switch banks, conductors 574 and 595, respectively, to the multiplicand switches 97, conductors 575 and 596, and thence through the stacks 487—H and 487—J of decoding mechanism, as described above. Since the conductors are in multiple from all banks of the decoding mechanism, it will be obvious that here the two parallel circuits which were being traced, join and from here they lead over the conductor 581 to the "two" group of commutators and thence through the segment 2x9 of the commutator 2C of that group to conductors 632 and 623 to ground by way of the contacts of relay 539 and the commutator 616. Thus the magnets 298J and 298L energize at the same moment and unlatch their operating clutch levers at the same time.

It is to be noted that magnet 298K does not become energized during the second 180° rotation of the commutator shaft 230. This is due to the fact that this magnet is connected into a circuit which leads to the contact stack 487—I of the decoding mechanism and, since the card, which had been sensed, has a zero in that column no pin was raised and no contacts closed. Therefore, the circuit is not completed.

The commutator shaft 230 and cam shaft 280 continue to revolve until the cam 479 lifts roller 478 (Fig. 21), thereby moving all the disengaging arms 470, in the same manner as described above and shortly thereafter the circuit to the stepping magnet 320 is again completed and the commutator shaft 230 completes its revolution and the tripping lever 678 controlled by the magnet 263 (Fig. 31), the circuit for which is opened by commutator 612, at this time is released, thereby stopping shaft 230 in its normal position. At the time when the clutch levers are disengaged, all the clutches associated with the magnets 298J through 298P are disengaged, and shortly thereafter detent levers 301 position the wheels.

During the second half rotation of the commutator the first order wheel had added to its previous reading nothing; the second order wheel, 5; the third order wheel, 4.5; the fourth order wheel, 3.45; the fifth order wheel, 1.345; the sixth order wheel, .1345; the seventh order wheel, 1.01345; and the eighth order wheel, .101345. The wheels now stand in the following positions.

| | | |
|---|---|---|
| 1st order wheel | 4.0 | units from zero |
| 2nd order wheel | 0.4 | units from zero |
| 3rd order wheel | 1.04 | units from zero |
| 4th order wheel | 2.104 | units from zero |
| 5th order wheel | 2.2104 | units from zero |
| 6th order wheel | 8.22104 | units from zero |
| 7th order wheel | 1.822104 | units from zero |
| 8th order wheel | 0.1822104 | units from zero |

If a total were now taken, it would give the product of 202,456 as the multiplicand by 9 as a multiplier. However, our assumed problem had a three digit multiplier, namely, 709, and the machine will continue until that product is completed. As the stepping switch 310 operates under control of commutator 618 all of the switch wipers 317 move to their fourth contact points. During the interval when the wipers are between their third and fourth contact points the circuit to relay 520 is broken at the contacts of the bank 310A. Consequently, this relay deenergizes and in deenergizing breaks the circuit which extends from ground through its outer contacts to the winding of relay 615. Relay 615, however, remains operated due to the locking circuit from ground through the commutator 620 and its inner locking contact.

With all the wipers of switch 310 on their fourth contact and a zero sensed in the card under decoding contact bank 486—I, there will be no completed circuit through this bank and, therefore, none of the relays 531 to 539 will receive current and relay 520 will remain at normal. With the armature of relay 520 in its unoperated position the following circuit is established:

From battery (Fig. 27) through relay winding 320, contacts 330, the strapped contacts of contact bank 310—A, wiper 317—A, strap 498, conductor 490, outer contacts of relay 520, to ground. This circuit energizes the winding 320, moving the armature 319 together with the ratchet pawl 323 and opening the contacts 330, thereby breaking the circuit and allowing the armature 319 to fall back again. But, as the armature returns to normal, the ratchet wheel 318 is moved one tooth, thereby spacing all wipers 317 one contact point to the fifth contact.

It should be noted here that all the contacts banks (310—B to 310—K, inclusive) which are connected to multiplicand decoding stacks have their third and fourth contact points connected together, also their fifth and sixth, and so on to and including the nineteenth and twentieth. The multiplier bank 310—L, however, has its second and third contact points connected together, also its fourth and fifth, and so on to and including the twentieth and twenty-first.

Therefore, when the stepping switch moves from the fourth to the fifth contacts, a zero will still be sensed through the multipler switch bank and the circuit is substantially the same as before. This results in another stepping action, the same as described above, which moves the wipers to the sixth point at which position a "seven" is sensed in the multiplier stack circuit.

As soon as a circuit is made through a decoding unit, relay 520 will be operated and the stepping circuit will be opened. Such a circuit is now formed with the wipers 317 all on their sixth contact points.

From the above the ease of registering a zero is seen. It involves nothing more than the operation of the stepping switch, 310. When the switch wipers reach their sixth contacts, a circuit is completed from battery through the winding of relay 520 (Fig. 27) to conductor 628, thence through the winding of the relay 537 to conductor 629 (Figs. 27, 26, 30, 34, and 37) to contacts 630 on bank 513—G of the zone switch, thence over conductor 640 (Figs. 37, 36, and 35), conductors 641, 642, and 643 (Fig. 38) to the 8—7 contacts in decoding bank 486—H which have been closed because a "7" has been sensed by this stack. The circuit continues over conductor 644 through contacts 645, over conductor 646 to contacts 647 in contact bank 513—H of the zone switch (Fig. 40), thence over conductor 648 (Figs. 40, 37, 34, 30, and 26) to the third switch from the left in the multiplier bank of disabling switches 95, thence over conductor 649 to the sixth contact on bank 310—L of stepping switch 310, wiper 317—L, strap 610, to ground.

Relays 520 and 537 are operated and as before relay 520 causes completion of two circuits from ground and places magnet 320 under control of the commutator 618 of the shaft 230. One of the circuits which is completed is that which leads over conductor 614 to the winding of relay 615. This circuit is, however, without effect, since relay 615 is held operated due to its locking circuit, which has been described. The other circuit is that leading over conductor 611 to a brush of commutator 612, thence over conductor 613 through the winding of magnet 263 to battery and ground, operating the magnet and releasing the commutator shaft 230 for a revolution. The sequence of operations described when the units portion of the digit nine as a multiplier was considered are repeated with the exception that the circuits completed are now governed by the operation of relay 537 rather than that of 539.

When the relay 537 operated, its contacts completed two circuits, one from ground through the inner contact of the relay 537 and over conductor 650 to conductors 651, 652, 653, 654, and 655 to the commutators representing respectively the products of 7x9, 7x8, 7x6, 7x5, and 7x4, the other circuit is from ground, outer contact of the relay and over conductor 656 to conductors 657, 658, 659, and 660 to the commutators representing respectively the products of 7x7, 7x3, 7x2, and 7x1. The reason for utilizing two contacts on relay 537 is to prevent feed-back through circuits having therein commutators which represent products containing the same tens digit, as for example, 42 and 49, or 28 and 21. The same procedure is followed in connection with other relays, such as 532, 533, 534, and 535, which it will be seen all have more than a single contact, some having as many as five.

Circuits will now be prepared for completion through the magnets 298N, 298M, 298L, 298K, 298J, and 298I. These circuits are similar to those described under the headings (1) through (6) above, but differ in that they lead through the decoder contacts to the seven commutator, and also differ in that they are grounded at the other side of the commutators through brushes associated with the conductors 650 and 656, associated with the contacts of the relay 537, rather than through those associated with the relay 539.

In order that they may be perfectly clear, one of the circuits will be traced in detail.

This circuit leads from battery, through the winding of magnet 298N, thence over conductors 557 and 558 to the fifth and sixth contact points of the bank 316—F of the stepping switch, thence over wiper 317—F, strap 528, conductor 529, through the sixth multiplicand switch of bank 97, over conductor 548 to the zone switch bank 512—E as before, thence over conductor 542 to decoding stack 487—E in which the "9" and "5—6" pins have been raised, over conductor 544, "9" contact, conductor 545 "6—5" contact, thence over conductors 546, 547 and 548 to contact 549 in bank 512—F of the zone switch, thence over conductor 550 to the commutator segments representing products of six and any of the nine digits.

Circuits are also completed as has been described to all commutators representing products of seven by any digit. Due to this cross grouping a single circuit is actually prepared; this circuit being the one which extends on both sides of that commutator which represents the product of 6x7. At this time the circuits are, of course, also prepared for completion through those commutators representing the products of 5x7, 4x7, and 2x7.

As the commutator shaft rotates, the circuits which have been prepared are completed in the following order:

When the conducting segment of commutator 4C reaches its brushes, the circuit prepared for completion through it will be completed and cause operation of the magnet 298L which will immediately release its clutch lever to enter the units digit of the partial product in the accumulator.

As the commutator shaft continues to rotate, a circuit through the conducting segment 7x5 of commutator 7B will be completed causing energization of the magnet 298M.

Continuing rotation of the shaft causes completion of circuits prepared for completion through the segments 2x7 of commutator 2C, and magnets 298I and 298K will be energized.

Finally, the circuit which has been prepared for completion through the segment 7x6 of commutator 7B will be completed and will energize magnet 298N.

As the commutator shaft continues its rotation, at a definite point therein, the clutch levers will be mechanically restored to normal and magnets 298I through 298N will deenergize.

In the same manner as during the first cycle of the machine, shortly after the deenergization of the clutch magnets a circuit is completed from ground (Fig. 31), through the brushes of commutator 618 to conductors 624 and 522 (Figs. 31, 27, and 26), through the winding of stepping magnet 320 to battery. This causes energization of the stepping magnet which subsequently deenergizes at its own contacts 330 and permits the spring to step wipers of the switch ahead to their seventh contact point. This stepping of the switch connects the clutch magnet of the next higher denominational order to each of the multiplicand columns of the decoding unit, so that circuits which were previously completed to the magnet 298N are now completed to the magnet 298M, those which were previously completed through the magnet 298M to the magnet 298L, etc.

The commutator shaft continues its rotation breaking the circuits to the stepping magnet at commutator 618 and thereby preventing further stepping at this time and shortly thereafter the circuit is completed through the commutator representing the product of 6x7 and through the magnet 298M to energize that magnet. This circuit may be traced as follows:

From battery over conductor 505 (Fig. 27), thence through the winding of relay 298M to conductors 571 and 572, thence to the seventh contact point of the bank 316—F of the stepping switch, thence over wiper 317—F, strap 528, conductor 529, through the sixth multiplicand switch of bank 97, over conductor 548 to the zone switch bank 512—E as before, thence over conductor 542 to decoding stack 487E where a "9" and a "5—6" pin have been raised, through the associated contacts, thence over conductors 546, 547, and 548 to bank 512—F of the zone switch, thence over conductor 550 to the commutator segments representing products of six and any of the nine digits, thence through the conducting segments of the commutator 6x7 and the brushes cooperating therewith to conductors 653 and 650 to ground through the inner contacts of relay 537 thus energizing magnet 298M.

As the commutator continues to revolve, similar circuits are completed in order through magnet 298L and commutator 3x7, through magnet 298K and commutator 4x7, and then through magnets 298J and 298H and commutator 2x7. These magnets, of course, release their associated clutch levers in the order specified and shortly thereafter, when the accumulator wheels have been turned the correct amounts, the clutches are all disengaged mechanically and the ball and detent levers operate to assure that the accumulator gears are properly positioned.

During the first half rotation of the commutator occurring while these circuits are set up, the numbers 2, 5, 8, 4, 0, 4, are added in the hundreds, thousands, ten thousands, hundred thousands, millions, and ten millions order wheels of the accumulator, thus adding to the wheels the following figures:

Units order_____ 0.0
Tens_____ 0.0
Hundreds _____ 2.00
Thousands _____ 5.20
Ten thousands order_____ 8.530
Hundred thousands order_____ 4.8520
Millions order_____ .48520
Ten millions order_____ 4.048520

Since the wheels already stood at units 4, tens 0.4, hundreds 1.04, thousands 2.104, ten thousands 2.2104, hundred thousands 8.22104, millions 1.822104, ten millions at .1822104 and hundred millions at .01822104, they now stand at Units _____ 4.0
Tens _____ 0.4
Hundreds _____ 3.04
Thousands _____ 7.304
Ten thousands_____ 0.7304
Hundred thousands_____ 3.07304
Millions _____ 2.307304
Ten Millions _____ 4.2307304
Hundred millions _____ .42307304

It will be understood, of course, that the multiples of ten are discarded since the position of the accumulator wheel with respect to its zero stop is the same no matter how many full rotations of the wheel are to be considered.

Now, during the second half rotation of the commutator shaft, the following numbers will be added to the accumulators:

| | |
|---|---|
| Units order | 0.0 |
| Tens order | 0.0 |
| Hundreds order | 0.0 |
| Thousands order | 4.000 |
| Ten thousands order | 3.4000 |
| Hundred thousands order | 2.34 |
| Millions order | 1.234 |
| Ten millions order | .1234 |
| Hundred millions order | 1.01234 | after which the wheels will stand respectively at

| | |
|---|---|
| Units | 4 |
| Tens | 0.4 |
| Hundreds | 3.04 |
| Thousands | 1.304 |
| Ten thousands | 4.1304 |
| Hundred thousands | 5.41304 |
| Millions | 3.541304 |
| Ten millions | 4.3541304 |
| Hundred millions | 1.43541304 |

This means that the wheels now stands respectively: units—.4 of a turn or 4 units from its zero point; tens—.04 turn; hundreds—0.304 turn; thousands—0.1304 turn; ten thousands—0.41304 turn; hundred thousands—0.541304 turn; millions—0.3541304 turn; ten millions—0.43541304 turn; and hundred millions—0.143541304.

Shortly after the deenergization of the various magnets 298H through 298M, commutator 618 again reaches a point at which the circuit for operating the magnet 320 over conductors 522 and 624 is completed. The magnet 320 operates and then releases, moving all the wipers to their eighth contact points. With the wipers in this position, no circuits are completed through the decoding contacts because the seven multiplier disabling switches 95 (Fig. 26), counting from the right, are in their open position and no circuits are possible even though there may be data holes in the sensed card in this region.

As a result of this, no circuits can be completed through relays 531 to 539 and, consequently, relay 520 is deenergized and breaks two circuits leading respectively to the clutch control magnet 263 and to the relay 615. A circuit is also made by the armature of relay 520 which connects conductor 490 to ground. The release of magnet 263 releases arm 678 and stops disc 676, thereby releasing clutch 240 and stopping shaft 230.

As was described above the circuits to the decoding stacks have been disabled by opening the seven right-hand switches of bank 95. The effect of this is the establishment of a vibrating circuit including the relay 320, the control bank 310A and the outer contacts of relay 520. As has been previously described the wiper arms will be stepped along until they reach the 24th contact points.

With the stepping switch in this position, a number of circuits are completed as follows:

From battery (Fig. 31) through conductor 514 to the winding of trip magnet 141, thence through conductor 515, brush 516 and commutator 517 (since this commutator now presents a conducting segment to the brush), brush 518, conductor 519 to the twenty-fourth contact of the switch bank 310A, and through its wipers, 317A, strap 498, first contact, to ground by way of conductor 490 and the outer contacts of relay 520.

At this time, due to the energization of the magnet 141, clutch 135 for the main sensing shaft 127 is operated, permitting the shaft to rotate 90°. During this 90° of rotation, the card which has just been sensed is ejected from the sensing chamber and moved into the punching chamber and a new card is fed to the sensing chamber and positioned for sensing. Also the bail 413 (Figs. 5 and 5A) is elevated, and the sectors 261 are elevated and caused to mesh with the accumulator gears 331 and the bail or restoring bar 413 is moved out of the path of the sectors. Due to the elevation of the bail and the movements of the sectors and the restoring bar the accumulator wheels are permitted to move to their zero stops in the manner described under the heading "Accumulator zeroizing mechanism."

The 90° of rotation mentioned is under control of the clutch tripping lever 140 which it will be recalled restores to its normal position almost immediately after operation, due to the fact that the circuit to the magnet 141 is broken very shortly after the rotation of the shaft 127 begins, since it is led through commutator 517; also shortly after the release of the shaft 127 for its 90° of rotation, a circuit is completed through commutator 524 for energizing the stepping magnet 320. This circuit leads from battery through the winding of magnet 320 and thence over conductor 522 (Figs. 27 and 31) to brush 523, and thence through the commutator 524 to brush 525 and ground.

This circuit is completed momentarily and the impulse due thereto causes the stepping magnet to energize and deenergize, stepping the wipers to their twenty-fifth contact points.

When wipers 317 reach their twenty-fifth contact, a circuit is prepared for energizing the clutch magnet 141 to permit the shaft 127 to rotate through the next 270°. This circuit, however, is not completed until the contacts 439 and 440 are closed.

It will be remembered that these contacts are controlled by the zero stop arm 343 (Fig. 3) of the highest denominational order, contacting pin 441 so that it will be at the time that the last stop arm is released that this circuit is completed. When completed, the circuit may be traced from battery through the conductor 514 (Fig. 31) and the winding of the tripping magnet 141, thence over conductor 515, thence through the brushes 516 and 518 and conducting segment of the commutator 517 to conductor 519 (Figs. 31 and 37), and thence through the contacts 439 and 440 to conductor 526 and through the twenty-fifth contact and wiper of switch bank 310A, strap 498, first contact, conductor 490, outer contact of relay 520 to ground. This energizes the clutch magnet 141 to connect shaft 127 for its second period of rotation during which it rotates through 270° and causes restoration of the various bails of the totaling mechanism to normal and likewise punching of the product in the card from which the factors were read.

It will be understood that when the accumulator wheels are permitted to rotate to zero they allow the sectors and associated racks to move proportional amounts to position the code bars above the punch gags to govern the correct punching of the product.

A short time ago the amounts standing on the accumulator wheels were set forth and it will be understood from the discussion of the accumulator and the zeroizing means therefor that the carry from the lower order wheels is removed from the higher order wheels as the accumulators come to zero. Therefore, the proper punch gags will be set to punch as a total or product the following number 143,541,304, which will be seen to be the product of the two assumed numbers 202,456, and 709.

Near the end of the 270° of the main sensing shaft 127, a circuit is completed through the commutator 620 (Fig. 31) which commutator is mounted on the shaft 406 which, as has been stated, is geared to shaft 127 with a 1 to 1 ratio.

This circuit is traced from ground (Fig. 31) brush 621 of commutator 620, brush 619, conductor 617, inner make contact of relay 615 (which is held operated by commutator 620 after relay 620 is deenergized), conductor 614, through commutator 656, conductor 622 (Figs. 31 and 37) to battery through the winding of magnet 320, causing the magnet to operate and step the wipers to their normal or start position.

The circuit is now in condition for controlling the computation of factors from another card.

*Half cent carry*

At times it is desirable to record only a portion of the product, checking the answer to the nearest figure; for example, a three digit figure might be multiplied by a two digit figure, which would normally give five digits in the product, but it might be desirable to record but three digits checking the last or units one of these three to the nearest figure.

The circuit for the half-cent carry in this machine is the same as that disclosed in Patent No. 2,214,029 except that individual switches are used instead of a plug board arrangement. The individual switches give the same result as the plug board except in cases where there may be two or more multiplications for each card and the half-cent carry mechanism is to be used in several denominational orders. It will be obvious that any number of switches 106 may be operated to add a "5" in any order desired.

*Calculations involving addition*

There are many problems in accounting work which involve the inclusion of a base charge in addition to a rate charge. Such is the case in most communities where electric power or gas is sold on a metered basis to the consumer. Let it be assumed that a base charge of $.85 per month is made regardless of the amount of current used and that a customer uses 23 kilowatt hours at the rate of 5½ cents per kilowatt hour. Since the computation of such a charge will usually involve fractions of a cent, the half cent carry switch will be used to "round out" the amount. The formula for computing the total customer's bill is, therefore, $$85. + (23. \times 5.5) + 0.5 = 212. \text{ cents}$$

To make this calculation on the machine, master cards are used to set up a constant factor, in the machine, which will be the same for all customers. The factor in this case is—850055.

It should be pointed out that only six spaces or columns are used when ten are available. All ten may be used when the three and four digit numbers are involved but for the present problem six are sufficient.

The customer's card is punched with the meter reading only (23) and the "one" switch of bank 713 (Fig. 25) is closed after said bank has been connected to the proper decoding stack. Determination of the proper stack is made by counting the columns between the decimal points of the quantities in the master card and then wiring the "one" switch in that bank which is the same number of columns to the right of the sensed data. If the master card is punched with two zeros separating the 85. and the 5.5 then there will be three columns between the decimal points and the "one" switch must be set three columns away from the sensed 23 from the customer's card. The proper half cent carry switch is closed and the resulting multiplication may be represented as follows:

```
            2 3 0 0 1 0—customer's card
            8 5 0 0 5 5—master card 1 1 5 0 0 5 0
      1 1 5 0 0 5 0
    1 1 5 0 0 5 0
  1 8 4 0 0 8 0
                5 — — — —half cent carry 1 9 5 5 2 1 2 0 0 5 5 0
```

Blocking levers 108 are employed to retain the punch gags from operating in all but the three rows indicated, hence the correct amount 212 cents or $2.12 will be punched in the customer's card in another field and he will be billed for that amount.

The inclusion of the "one" factor in the number 230010 is done electrically by the switch bank 713 and since zeros are not punched in the card, only two columns are needed in the customer's card. This represents a great saving of space and time as one card may then be used for several months billing.

A complete set of numbers from "one" to "nine" is included in bank 713 since there may be other combinations of numbers which will save operating time. For example, in the problem listed above, the number 17 may be substituted instead of 85 and a "5" switch closed in bank 713 instead of a "1" without changing the result.

The circuits herein described are exemplary only, but it will be understood that similar circuits may be utilized in the solution of other problems.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention, as hereinbefore set forth, and as hereinafter claimed.

What I claim as new, and desire to secure by Letters Patent, is:

1. In a machine of the class described, in combination, sensing pins for reading coded digital representations of a factor from a punched data card; retaining means for holding said sensed data for subsequent multiplication by other factors sensed from other cards, said retaining means comprising a series of notched contact pins positioned by card sensing pins and a series of latches disposed between rows of said contact pins and arranged for normal engagement with the notches; control means for changing from an old constant factor to a new constant factor when a punched data card with a predetermined control hole and a new constant factor punched therein is sensed, said control means comprising resilient end points on said contact pins for displacement by those sensing pins which have entered data holes, a sensing pin operating through said control hole and means operated by said pin for momentarily disengaging the latches.

2. In a machine of the class described, in combination, sensing pins for reading coded digital representations of a factor from a punched data card; retaining means for holding said sensed data for subsequent multiplication by other factors sensed from other cards, said retaining means comprising a series of notched contact pins positioned by card sensing pins, and latches for normally engaging said notched contact pins; control means for changing from one constant factor to a new constant factor when a punched data card having a predetermined control hole and a new constant factor is sensed, said control means comprising a sensing pin for operating through the control hole and a releasing bail controlled by said sensing pin and adapted to momentarily disengage said latches; and resilient means for urging said contact pins into a position corresponding to the new constant factor as soon as said latches are disengaged.

3. In a machine of the class described, in combination, a sensing mechanism for reading factors from master and detail cards, a decoding mechanism for translating and transferring said sensed data to a multiplying circuit, said master card containing data which includes a multiplying factor and an addition factor separated from each other by a plurality of unoccupied denominational orders, and electrical switching means for adding a digit to each factor sensed from the detail cards, said digit being added in an unoccupied denominational order separated from the orders in which the sensed detail factor occurs by a plurality of unoccupied orders, whereby part of the resultant product of the detail and master factors contains the sum of the addition factor and the product of the multiplying factor by the factor sensed in the detail card.

4. In a machine of the class described, in combination, a sensing mechanism for reading factors from master and detail cards, a decoding mechanism for translating and transferring said sensed data to a multiplying circuit, a retaining mechanism for holding the data sensed from a master card in the decoding mechanism for a plurality of machine cycles, said master card containing data which includes a multiplying factor and an addition factor separated from each other by a plurality of unoccupied denominational orders, and electrical switching means for adding a digit to each factor sensed from the detail cards, said digit being added in an unoccupied denominational order separated from the orders in which the sensed detail factor occurs by a plurality of unoccupied orders, whereby part of the resultant product of the detail and master factors contains the sum of the addition factor in the master card plus the product of the multiplying factor in the master card by the factor sensed in the detail card, said electrical switching means comprising a series of short circuiting switches connected in parallel with contacts in the decoding mechanism.

HAROLD P. MIXER.